US009621299B2

(12) United States Patent
Ishihara et al.

(10) Patent No.: US 9,621,299 B2
(45) Date of Patent: Apr. 11, 2017

(54) COHERENT COMMUNICATION SYSTEM, COMMUNICATION METHOD, AND TRANSMISSION METHOD

(71) Applicant: NIPPON TELEGRAPH AND TELEPHONE CORPORATION, Tokyo (JP)

(72) Inventors: Koichi Ishihara, Yokosuka (JP); Masato Mizoguchi, Yokosuka (JP); Tomoki Murakami, Yokosuka (JP); Tomoyoshi Kataoka, Yokosuka (JP); Yoshiaki Kisaka, Yokosuka (JP); Tadao Nakagawa, Yokosuka (JP); Etsushi Yamazaki, Yokosuka (JP); Seiji Okamoto, Yokosuka (JP); Kengo Horikoshi, Yokosuka (JP); Masahito Tomizawa, Yokosuka (JP); Riichi Kudo, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/759,329

(22) PCT Filed: Jan. 15, 2014

(86) PCT No.: PCT/JP2014/050553
§ 371 (c)(1),
(2) Date: Jul. 6, 2015

(87) PCT Pub. No.: WO2014/112516
PCT Pub. Date: Jul. 24, 2014

(65) Prior Publication Data
US 2015/0341138 A1 Nov. 26, 2015

(30) Foreign Application Priority Data
Jan. 15, 2013 (JP) .................................. 2013-004780
Jul. 2, 2013 (JP) .................................. 2013-138928

(51) Int. Cl.
H04B 17/00 (2015.01)
H04J 14/08 (2006.01)
(Continued)

(52) U.S. Cl.
CPC .......... *H04J 14/08* (2013.01); *H04B 10/0775* (2013.01); *H04B 10/2513* (2013.01);
(Continued)

(58) Field of Classification Search
CPC .......... H04J 14/08; H04J 3/14; H04B 10/516; H04B 10/61; H04B 10/2513;
(Continued)

(56) References Cited

U.S. PATENT DOCUMENTS

2007/0054701 A1* 3/2007 Hovers ................ H04B 7/0695
455/562.1
2010/0040171 A1* 2/2010 Qu ........................ H04L 1/0003
375/298
(Continued)

FOREIGN PATENT DOCUMENTS

CN 102326344 A 1/2012
JP 2008-294752 A 12/2008
(Continued)

OTHER PUBLICATIONS

H.Masuda, et al., "13.5-Tb/s(135 x111-Gb/s/ch) No-Guard-Interval Coherent OFDM Transmission over 6,248 km using SNR Maximized Second-order DRA in the Extended L-band", OSA/OFC/NFOEC 2009, PDPB5.
(Continued)

Primary Examiner — Juan A Torres
(74) Attorney, Agent, or Firm — Harness, Dickey & Pierce, P.L.C.

(57) ABSTRACT

The estimation of an amount of chromatic dispersion using a training signal sequence is possible. A transmission
(Continued)

method includes: a training signal sequence generation step of generating, as training signal sequences, a plurality of signal sequences having power concentrated in a plurality of frequency bands, the power concentrated at different frequency bands; a training signal sequence selection step of selecting at least one training signal sequence from among the plurality of training signal sequences generated in the training signal sequence generation step, a signal multiplexing step of generating a signal sequence obtained by time-division multiplexing the training signal sequence selected in the training signal sequence selection step with a transmission data sequence, and an electrical-to-optical conversion step of transmitting the signal sequence generated in the signal multiplexing step as an optical signal.

22 Claims, 28 Drawing Sheets

(51) Int. Cl.
*H04B 10/077* (2013.01)
*H04J 3/14* (2006.01)
*H04B 10/2513* (2013.01)
*H04B 10/61* (2013.01)
*H04B 10/69* (2013.01)
*H04B 10/516* (2013.01)

(52) U.S. Cl.
CPC ..... *H04B 10/25133* (2013.01); *H04B 10/516* (2013.01); *H04B 10/61* (2013.01); *H04B 10/6161* (2013.01); *H04B 10/697* (2013.01); *H04J 3/14* (2013.01)

(58) Field of Classification Search
CPC .......... H04B 10/0775; H04B 10/25133; H04B 10/6161; H04B 10/697

USPC .......................................................... 398/35
See application file for complete search history.

(56) References Cited

U.S. PATENT DOCUMENTS

| 2011/0026927 | A1 | 2/2011 | Tanaka et al. |
| 2011/0194855 | A1 | 8/2011 | Batshon et al. |
| 2012/0070159 | A1* | 3/2012 | Ishihara ........... H04B 10/07951 398/202 |
| 2012/0099864 | A1* | 4/2012 | Ishihara ................... H04B 3/06 398/65 |

FOREIGN PATENT DOCUMENTS

| JP | 2010-245780 A | 10/2010 |
| WO | WO-2010/134321 A1 | 11/2010 |
| WO | WO-2011/007803 A1 | 1/2011 |
| WO | WO 2012-060052 A1 | 5/2012 |

OTHER PUBLICATIONS

Jianjun Yu, et al., "17 Tb/s (161x114 Gb/s) PolMux-RZ-8PSK transmission over 662 km of ultra-low loss fiber using C-band EDFA amplification and digital coherent detection", ECOC 2008, Th.3. E.2, Brussels, Belgium, Sep. 21-25, 2008.
R. Kudo et al., "Coherent Optical Single Carrier Transmission Using Overlap Frequency Domain Equalization for Long-Haul Optical Systems", J. Lightwave Technology, vol. 27, No. 16, pp. 3721-3728. Aug. 15, 2009.
International Search Report for PCT/JP2014/050553, ISA/JP, mailed Feb. 18, 2014.
Chinese Office Action for CN201480004694.4, mailed Aug. 22, 2016, with English translation thereof.
Supplementary European Search Report for EP14740258.0, mailed Sep. 21, 2016.

* cited by examiner

COHERENT COMMUNICATION SYSTEM, COMMUNICATION METHOD, AND TRANSMISSION METHOD

CROSS-REFERENCE TO RELATED APPLICATIONS

This application is a 371 U.S. National Stage of International Application No. PCT/JP2014/050553, filed Jan. 15, 2014. Priorities are claimed on Japanese Patent Application No. 2013-004780, filed Jan. 15, 2013 and Japanese Patent Application No. 2013-138928, filed Jul. 2, 2013, the contents of which are incorporated herein by references.

TECHNICAL FIELD

The present invention relates to a coherent communication system, a communication method, and a transmission method in optical communication in which a transmission apparatus transmits a specific frequency band signal, a reception apparatus receives the signal, an amount of chromatic dispersion in an optical fiber transmission path is detected, and chromatic dispersion compensation is performed based on the calculated value to compensate for distortion of a transmission signal caused by the chromatic dispersion.

BACKGROUND ART

In the field of optical communication, a digital coherent communication system that combines a coherent detection scheme with digital signal processing, which dramatically increases frequency use efficiency, is attracting attention. The digital coherent communication system is known to be able to not only improve reception sensitivity but also compensate for waveform distortion of a transmission signal caused by chromatic dispersion and/or polarization mode dispersion in optical fiber transmission by receiving the transmission signal as a digital signal as compared to systems built using direct detection, and introduction thereof is being studied as a next-generation optical communication technology.

Digital coherent schemes represented by Non-Patent Document 1 and Non-Patent Document 2 adopt a method for compensating for quasi-static chromatic dispersion by means of a fixed digital filter (for example, the number of taps is 2048 for the dispersion of 20000 ps/nm and a signal of 28 Gbaud) and compensating for fluctuating polarization mode dispersion by means of an adaptive filter with a small number of taps (for example, about 10 to 12 taps for the polarization mode dispersion of 50 ps) using a blind algorithm.

PRIOR ART DOCUMENTS

Non-Patent Documents

Non-Patent Document 1: H. Masuda, et al., "13.5-Tb/s (135×111-Gb/s/ch) No-Guard-Interval Coherent OFDM Transmission over 6,248 km using SNR Maximized Second-order DRA in the Extended L-band", OSA/OFC/NFOEC 2009, PDPB5.

Non-Patent Document 2: Jianjun Yu, et al., "17 Tb/s (161×114 Gb/s) PolMux-RZ-8PSK transmission over 662 km of ultra-low loss fiber using C-band EDFA amplification and digital coherent detection", ECOC 2008, Th.3.E.2, Brussels, Belgium, 21-25 Sep. 2008.

SUMMARY OF INVENTION

Problems to be Solved by the Invention

However, in the digital coherent schemes of Non-Patent Document 1 and Non-Patent Document 2, it is necessary to separately measure the chromatic dispersion in advance and manually input tap coefficients of a fixed digital filter to each receiver of wavelength division multiplexing (WDM) channels.

The present invention has been made in consideration of such circumstances, and an object thereof is to provide a coherent communication system, a communication method, and a transmission method that enable estimation of an amount of chromatic dispersion using a training signal sequence to compensate for chromatic dispersion generated in optical fiber transmission in a communication system based on coherent detection using an optical signal.

Means for Solving the Problems

In order to solve the above problems, the present invention is a coherent communication system including: an optical signal transmission apparatus; and an optical signal reception apparatus, wherein the optical signal transmission apparatus includes: a training signal sequence generation unit that generates, as a plurality of training signal sequences, a plurality of signal sequences having power concentrated in a plurality of frequency bands, the power concentrated in different frequency bands; a training signal sequence selection unit that selects at least one training signal sequence from among the plurality of training signal sequences generated by the training signal sequence generation unit; a signal multiplexing unit that generates a signal sequence obtained by time-division multiplexing the training signal sequence selected by the training signal sequence selection unit with a transmission data sequence; and an electrical-to-optical conversion unit that transmits the signal sequence generated by the signal multiplexing unit as an optical signal, and the optical signal reception apparatus includes: an optical-to-electrical conversion unit that converts the optical signal transmitted from the optical transmission apparatus into an electrical signal; an analog-to-digital conversion unit that converts the electrical signal converted by the optical-to-electrical conversion unit into a digital signal sequence; a plurality of frequency band pass filter units that correspond to the plurality of signal sequences and pass part of frequency band components of the digital signal sequence converted by the analog-to-digital conversion unit; and a plurality of power calculation units that are provided so as to correspond to the plurality of frequency band pass filter units and calculate power values of digital signal sequences output by the corresponding frequency band pass filter units.

Preferably, in the coherent communication system, the training signal sequence generation unit generates at least one signal sequence in which power is concentrated at a frequency lower than a cut-off frequency in a band limit filter in the optical signal transmission apparatus, the optical signal reception apparatus, or a propagation path as a training signal sequence, and the training signal sequence selection unit selects at least one training signal sequence from the plurality of the training signal sequences generated by the training signal sequence generation unit based on presence or absence of the band limit filter in the optical signal transmission apparatus, the optical signal reception apparatus, or the propagation path.

Preferably, in the coherent communication system, the training signal sequence selection unit selects at least one training signal sequence from the plurality of the training signal sequences generated by the training signal sequence generation unit based on at least one of frequency characteristics of the optical signal transmission apparatus or the optical signal reception apparatus, narrowing in a propagation path, frequency characteristics of a transmission channel of the propagation path, an amount of chromatic dispersion, a transmission distance, and estimation precision of the amount of chromatic dispersion.

Preferably, in the coherent communication system, the training signal sequence generation unit generates a signal sequence in which an interval of frequencies at which power is concentrated is larger than a predetermined interval as a training signal sequence.

Preferably, in the coherent communication system, the training signal sequence selection unit selects a plurality of training signal sequences, the signal multiplexing unit generates a signal sequence for each of the training signal sequences selected by the training signal sequence selection unit, and the electrical-to-optical conversion unit transmits a plurality of signal sequences generated by the signal multiplexing unit in different polarization planes.

Preferably, in the coherent communication system, the signal multiplexing unit time-division multiplexes another training signal sequence before and after the training signal sequence to be time-division multiplexed with the transmission data sequence.

Preferably, in the coherent communication system, the optical signal reception apparatus further includes: a training signal switching unit that selects a maximum power value among the power values calculated by the power calculation unit; and a training signal sequence detection unit that detects a training signal sequence in which power is concentrated in a frequency band passed by a frequency band pass filter unit corresponding to a power calculation unit that has calculated the maximum power value from the digital signal sequences based on the maximum power value selected by the training signal switching unit.

Preferably, in the coherent communication system, the optical signal reception apparatus shares information on the selected training signal sequence with the optical signal transmission apparatus in advance, and the training signal switching unit selects and outputs only an input from a frequency band pass filter unit corresponding to the selected training signal sequence using the information.

Preferably, in the coherent communication system, the optical signal reception apparatus selects and extracts any one of a section including part of the detected training signal sequence, a section including all the detected training signal sequence, and a section not including the detected training signal sequence from the digital signal sequence based on position information of the training signal sequence detected by the training signal sequence detection unit.

Preferably, in the coherent communication system, the optical signal reception apparatus further includes an offset amount calculation unit that calculates a frequency offset in a digital signal sequence in the section including part of the training signal sequence detected by the training signal sequence detection unit or the section including all the training signal sequence detected by the training signal sequence detection unit based on the training signal switching unit, the frequency band pass filter unit compensates for the frequency offset for the digital signal sequence based on the frequency offset calculated by the offset amount calculation unit, and then passes a frequency band component at which power of the training signal sequence is concentrated among frequency components included in the digital signal sequence, and the optical signal reception apparatus further includes: a plurality of power calculation units that are provided so as to correspond to the plurality of frequency band pass filter units, and calculate power values of digital signal sequences output by the corresponding frequency band pass filter units; and a transmission path information calculation unit that calculates an amount of chromatic dispersion based on the power values calculated by the plurality of power calculation units.

Preferably, in the coherent communication system, the optical signal reception apparatus further includes an offset amount calculation unit that calculates a frequency offset in a digital signal sequence in the section including part of the training signal sequence detected by the training signal sequence detection unit or the section including all the training signal sequence detected by the training signal sequence detection unit based on the training signal switching unit, the plurality of frequency band pass filter units compensate for the frequency offset for the digital signal sequence based on the frequency offset calculated by the offset amount calculation unit, and then pass a frequency band component other than a frequency band component at which the power of the training signal sequence is concentrated among frequency components included in the digital signal sequence, and the optical signal reception apparatus further includes a transmission path information calculation unit that calculates noise power based on the power values calculated by the plurality of power calculation units.

Preferably, in the coherent communication system, the optical signal reception apparatus further includes a transmission path information calculation unit that calculates signal power in a digital signal sequence in the section that does not include the training signal sequence detected by the training signal sequence detection unit.

Preferably, in the coherent communication system, at least one of the frequency band pass filter units and the power calculation units operate at an operation clock that is slower than an operating clock of the training signal sequence detection unit.

Preferably, in the coherent communication system, the transmission path information calculation unit operates at an operating clock that is slower than an operating clock of the training signal sequence detection unit.

Preferably, in the coherent communication system, the offset amount calculation unit operates at an operating clock that is slower than an operating clock of the training signal sequence detection unit.

Preferably, in the plurality of frequency band pass filter units of the coherent communication system, a computation unit that performs an FFT computation when the digital signal sequence is converted into a signal in a frequency domain or a computation unit that performs an IFFT computation when a digital signal sequence in the frequency domain is inversely converted into a signal in a time domain are shared.

Preferably, in the coherent communication system, the transmission path information calculation unit sorts a plurality of estimation values of the amount of chromatic dispersion obtained through a plurality of measurements in ascending or descending order, and removes any number of higher estimation values including a maximum estimation value and any number of lower estimation values including a minimum estimation value.

Preferably, in the coherent communication system, the optical signal reception apparatus further includes: a chromatic dispersion compensation unit that compensates for distortion due to chromatic dispersion in the digital signal sequence based on the amount of chromatic dispersion calculated by the transmission path information calculation unit; an adaptive equalization unit that equalizes a digital signal sequence compensated by the chromatic dispersion compensation unit; and a demodulation unit that demodulates a digital signal sequence equalized by the adaptive equalization unit.

Further, the present invention is a communication method in a coherent communication system, including: a training signal sequence generation step of generating, as a plurality of training signal sequences, a plurality of signal sequences having power concentrated in a plurality of frequency bands, the power concentrated at different frequency bands; a training signal sequence selection step of selecting at least one training signal sequence from among the plurality of training signal sequences generated in the training signal sequence generation step; a signal multiplexing step of generating a signal sequence obtained by time-division multiplexing the training signal sequence selected in the training signal sequence selection step with a transmission data sequence; an electrical-to-optical conversion step of transmitting the signal sequence generated in the signal multiplexing step as an optical signal; an optical-to-electrical conversion step of converting the optical signal transmitted in the electrical-to-optical conversion step into an electrical signal; an analog-to-digital conversion step of converting the electrical signal converted in the optical-to-electrical conversion step into a digital signal sequence; a frequency band pass filter step of passing part of frequency band components of the digital signal sequence converted in the analog-to-digital conversion step for the plurality of signal sequences; and a power calculation step of calculating a power value of each digital signal sequence obtained in the frequency band pass filter step.

Further, the present invention is a transmission method in a coherent communication system, including: a training signal sequence generation step of generating, as a plurality of training signal sequences, a plurality of signal sequences having power concentrated in a plurality of frequency bands, the power concentrated at different frequency bands; a training signal sequence selection step of selecting at least one training signal sequence from among the plurality of training signal sequences generated in the training signal sequence generation step; a signal multiplexing step of generating a signal sequence obtained by time-division multiplexing the training signal sequence selected in the training signal sequence selection step with a transmission data sequence; and an electrical-to-optical conversion step of transmitting the signal sequence generated in the signal multiplexing step as an optical signal.

Advantageous Effects of Invention

With the present invention, an optical signal transmission apparatus generates, as training signal sequences, a plurality of signal sequences which have power concentrating in a plurality of frequency bands and have frequency spectra in different shapes, selectively switches the plurality of generated training signal sequences in accordance with an optical transmission path, and transmits a signal including a signal sequence in which the selected training signal sequence is time-division multiplexed. In an optical signal reception apparatus, a reception unit corresponding to the selected training signal sequence can estimate an amount of chromatic dispersion from the difference between arrival times in frequency bands at which the power of the training signal sequence included in this signal concentrates. It is possible to improve the accuracy of decoding of a reception signal by compensating for the calculated amount of chromatic dispersion.

MODES FOR CARRYING OUT THE INVENTION

Hereinafter, embodiments of the present invention will be described in detail with reference to the drawings. An optical signal transmission apparatus and an optical signal reception apparatus in the embodiments of the present invention are used, for example, for a coherent communication system, such as an optical fiber transmission system based on coherent detection using an optical signal.

First Embodiment

First, a first embodiment of the present invention will be described.

Figure 1:
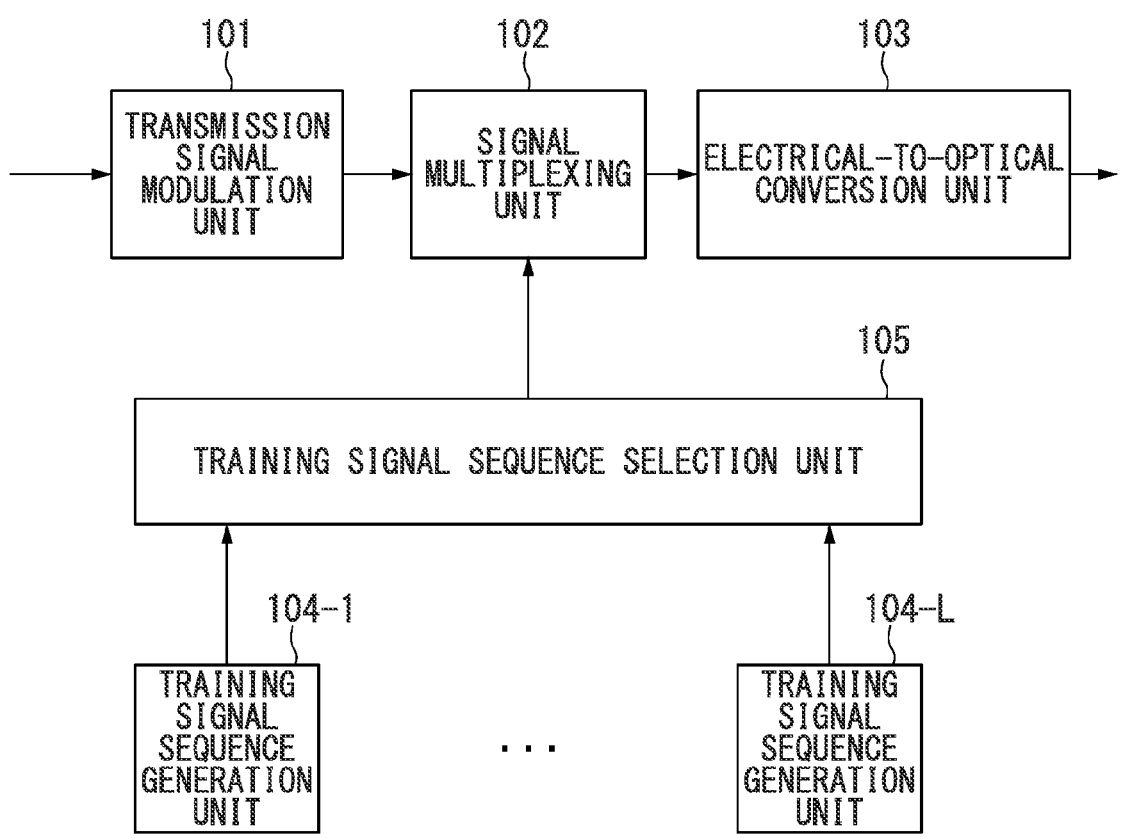
FIG. 1 is a block diagram illustrating an example of a configuration of an optical signal transmission apparatus in accordance with a first embodiment of the present invention.

FIG. 1 is a block diagram illustrating an example of a configuration of an optical signal transmission apparatus in the first embodiment of the present invention. In FIG. 1, 101 indicates a transmission signal modulation unit, 102 indicates a signal multiplexing unit, 103 indicates an electrical-to-optical conversion unit, 104-$l$ ($1 \le l \le L$; L is an integer greater than or equal to 2) indicates a training signal sequence generation unit, and 105 indicates a training signal sequence selection unit. The optical signal transmission apparatus includes the transmission signal modulation unit 101, the signal multiplexing unit 102, the electrical-to-optical conversion unit 103, L training signal sequence generation units 104-1 to 104-L, and the training signal sequence selection unit 105.

The transmission signal modulation unit 101 modulates a binary sequence of data to be transmitted and outputs a transmission symbol sequence. Modulation schemes may include, for example, binary phase shift keying (BPSK) modulation, quadrature phase shift keying (QPSK) modulation, quadrature amplitude modulation (QAM), but may be other modulation schemes. Each of the training signal sequence generation units 104-$l$ ($l=1, 2, \ldots, L$) is a block that generates a specific frequency band signal sequence having power concentrated on two or more specific frequency bands, and L blocks generate and output specific frequency band signal sequences having different frequency spectrum shapes as training signal sequences.

The training signal sequence selection unit 105 selects at least one of L types of training signal sequences input from the training signal sequence generation units 104-$l$, and outputs the selected training signal sequence to the signal multiplexing unit 102. The training signal sequence selection unit 105 selects the at least one training signal sequence from among the L types of training signal sequences based on at least one of frequency characteristics of the optical signal transmission apparatus or the optical signal reception apparatus, narrowing in a propagation path, frequency characteristics of a transmission channel of the propagation path, an amount of chromatic dispersion, a transmission distance, and the estimation precision of the amount of chromatic dispersion. It is to be noted that the frequency characteristics of the optical signal transmission apparatus or the optical signal reception apparatus include frequency characteristics of a digital band limit filter in each apparatus, frequency characteristics in a front end unit such as a power amplifier, a digital-to-analog converter, an analog-to-digital converter, or an analog band pass filter, a reception signal power or a reception signal power to noise power ratio of each frequency component, and the like.

The signal multiplexing unit 102 receives an output of the transmission signal modulation unit 101 and an output of the training signal sequence selection unit 105, inserts (time-division multiplexes) the training signal sequence which is the output from the training signal sequence selection unit 105 into the transmission symbol sequence which is an output signal from the transmission signal modulation unit 101 in each arbitrary signal period Ns (Ns≥1; Ns is an integer greater than or equal to 1), and outputs a resultant signal sequence. The electrical-to-optical conversion unit 103 receives an output of the signal multiplexing unit 102, performs electrical-to-optical conversion on the signal sequence, and outputs an optical signal. It is to be noted that when the signal multiplexing unit 102 outputs a plurality of signal sequences, the electrical-to-optical conversion unit 103 outputs the respective signal sequences in different polarization planes of the optical signal.

Figure 2:
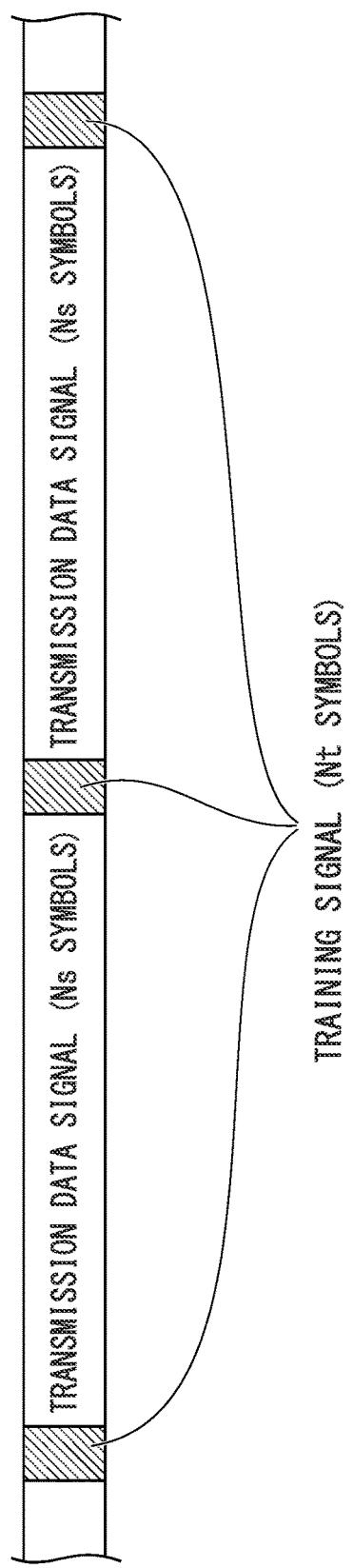
FIG. 2 is a diagram illustrating an example of a transmission signal sequence when training signals are time-division multiplexed in the optical signal transmission apparatus of the first embodiment.

FIG. 2 is a diagram illustrating an example of the transmission signal sequence output by the optical signal transmission apparatus of the present embodiment. As illustrated in FIG. 2, the transmission signal sequence is generated by time-division multiplexing a training signal including Nt symbols (Nt≥1; Nt is an integer greater than or equal to 1) with a transmission data signal in each Ns symbol. It is to be noted that the training signal may be referred to as a reference signal, a pilot signal, a known signal, or the like.

Here, for example, an alternating signal having a relationship of point-symmetry with respect to an origin on an IQ plane can be used as a specific frequency band signal sequence. For example, a BPSK signal may be generated and two constellation points may be alternately used as −S, S, −S, S, . . . , −S, S, or a QPSK signal may be generated and a signal sequence such as (S, S), (−S, −S), (S, S), (−S, −S), . . . , (S, S), (−S, −S) or (S, −S), (−S, S), (S, −S), (−S, S), . . . , (S, −S), (−S, S) may be used. Here, S denotes any real number. Further, (α, β) denotes signal components of a real part and imaginary part, respectively, and can be expressed as a complex number α+jβ. j is an imaginary unit.

Further, an alternating signal in which one signal is repeated M times (M is any integer; here, M=2) like −S, −S, S, S, −S, −S, S, S, . . . , −S, −S, S, S can be used. Further, it is possible to generate a specific frequency band signal with peaks in 4 or more frequency bands by mixing or convoluting signals corresponding to a plurality of number of repetitions. Further, it is also possible to generate two or more specific frequency band signals by generating and summing a plurality of sine waves with different periods. Further, it is also possible to generate a specific frequency band signal by transmitting a signal only with a specific subcarrier using an orthogonal frequency division multiplexing (OFDM) scheme.

With the above-described method, a plurality of specific frequency band signal sequences are generated, and one of the specific frequency band signal sequences is selected and time-division multiplexed with the transmission data signal.

Here, as an example, a case is considered in which, in a transmission signal transfer of 30 Gbaud, there are two training signal sequence generation units 104-1 and 104-2 (L=2), the training signal sequence generation unit 104-1 generates an alternating signal of (S, S) and (−S, −S) of a QPSK signal as a first specific frequency band signal sequence, and the training signal sequence generation unit 104-2 generates a signal sequence of a QPSK signal in which one signal is repeated twice, such as (S, S), (S, S), (−S, −S), (−S, −S), (S, S), . . . , (S, S), (S, S), (−S, −S), (−S, −S), as a second specific frequency band signal sequence.

Figure 3:
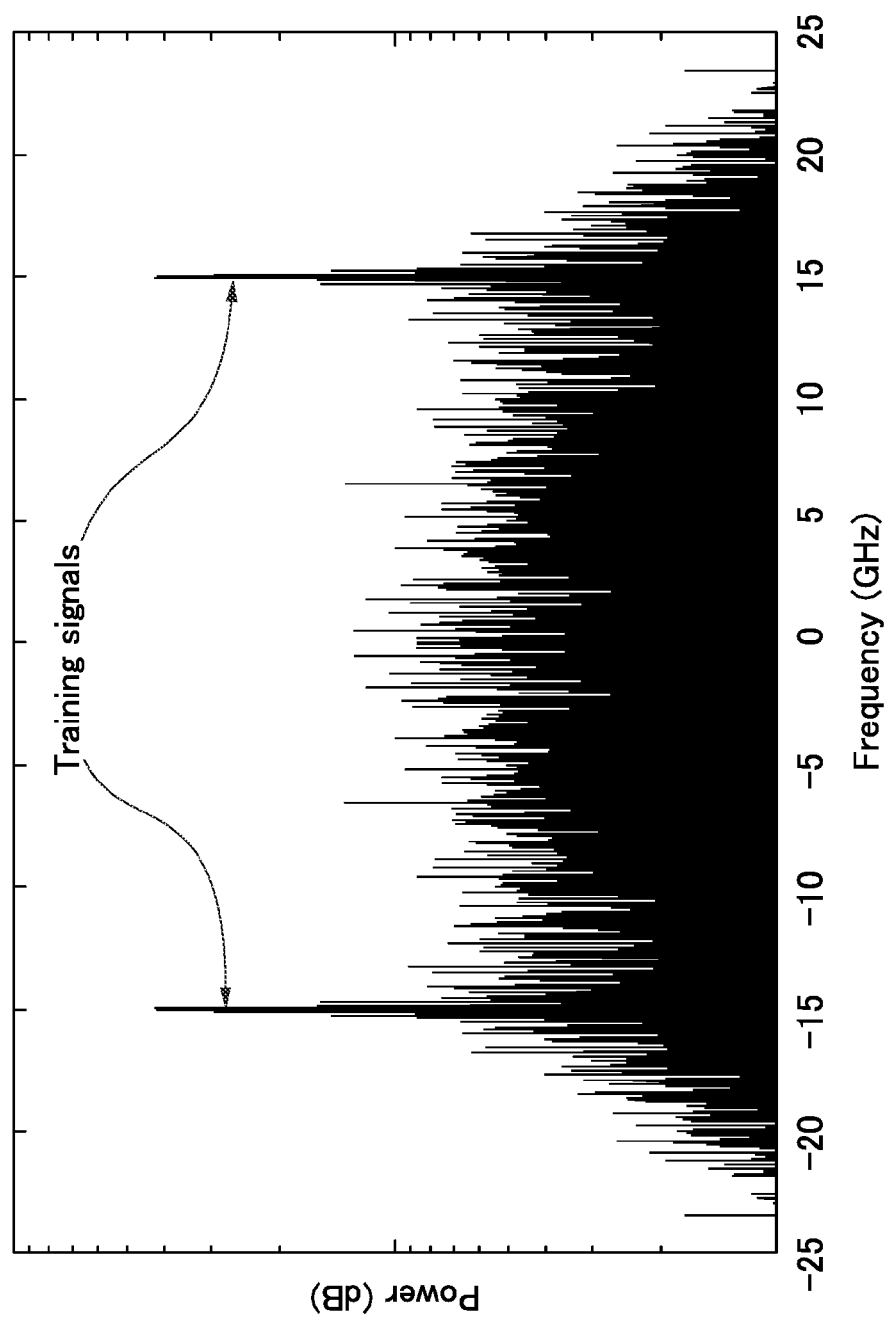
FIG. 3 is a diagram illustrating an example of a frequency spectrum of a transmission signal when a first specific frequency band signal sequence is time-division multiplexed in the first embodiment.
Figure 4:
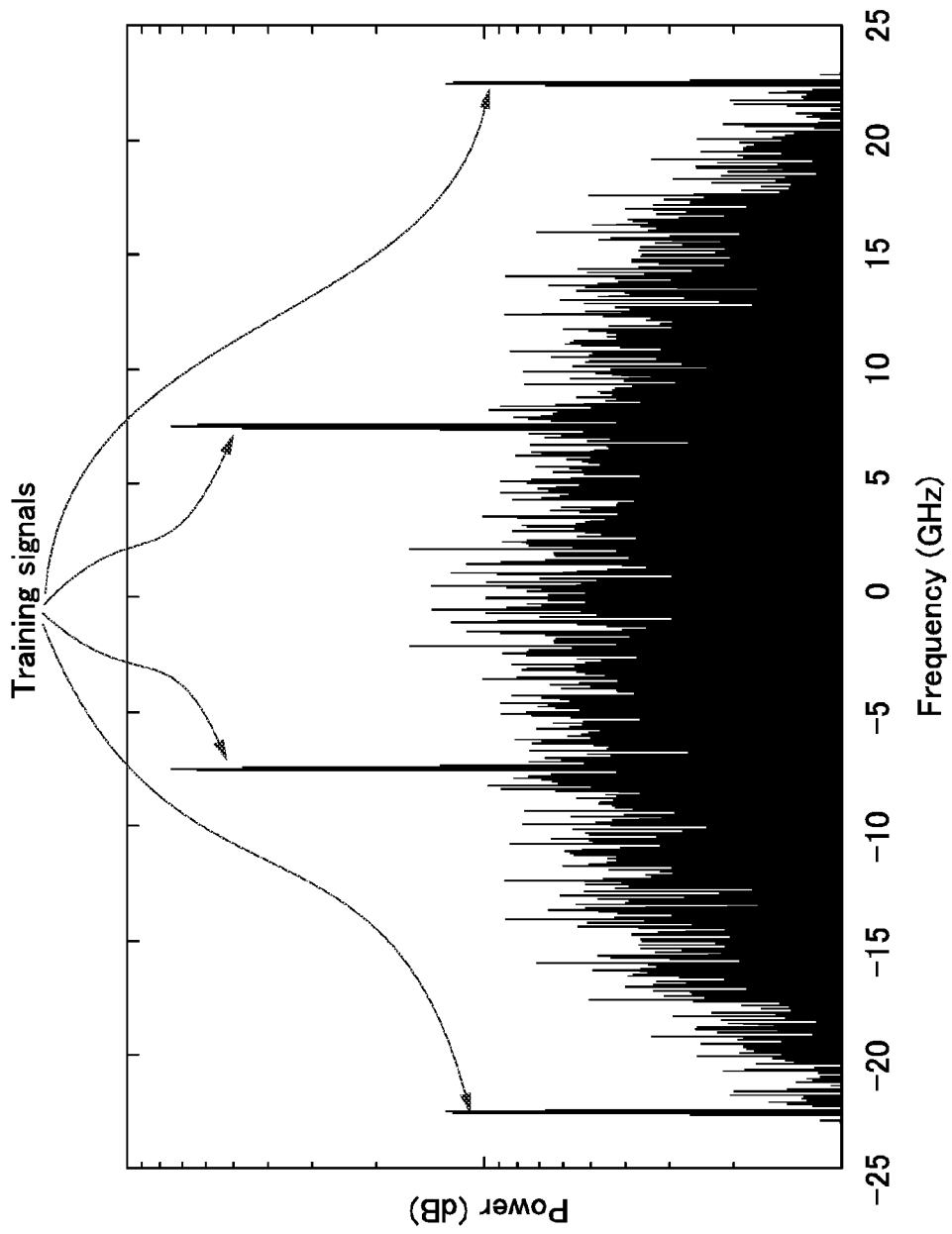
FIG. 4 is a diagram illustrating an example of a frequency spectrum of a transmission signal when a second specific frequency band signal sequence is time-division multiplexed in the first embodiment.

FIG. 3 is a diagram illustrating a frequency spectrum of the transmission signal when the first specific frequency band signal sequence generated by the training signal sequence generation unit 104-1 of the present embodiment is time-division multiplexed. Further, FIG. 4 is a diagram illustrating a frequency spectrum of the transmission signal when the second specific frequency band signal sequence generated by the training signal sequence generation unit 104-2 of the present embodiment is time-division multiplexed. In FIGS. 3 and 4, a horizontal axis indicates a frequency, and a vertical axis indicates power in a frequency component. It is to be noted that a negative signal in the frequency domain is an alias component of a signal which corresponds to an electrical signal of 30 GHz to 60 GHz. When the signal is up-converted into an optical signal, the signal is converted to be in a negative domain relative to a carrier frequency, and thus FIGS. 3 and 4 employ such notation.

It can be confirmed in FIG. 3 that, in the case of the first specific frequency band signal sequence, two signals having a 30 GHz interval are formed on the high frequency side of 15 GHz and the low frequency side of −15 GHz. It can also be confirmed in FIG. 4 that, in the case of the second specific frequency band signal sequence, a total of four spectra, including two high power spectra on the high frequency side of 7.5 GHz and the low frequency side of −7.5 GHz and two low power spectra on the high frequency side of 22.5 GHz and the low frequency side of −22.5 GHz, are formed. In other words, the power of the frequency spectrum of the second specific frequency band signal sequence is concentrated in the frequency bands different from the bands on which the power of the frequency spectrum of the first specific frequency band signal sequence is concentrated.

Since signal light in which spread of each frequency spectrum is small is obtained by using the specific frequency band signal as the training signal sequence, the waveform does not easily deteriorate due to the chromatic dispersion. Further, since the frequency spectra are apart from each other, an arrival time difference is generated due to the chromatic dispersion. Using this, the amount of chromatic dispersion can be calculated using a method as shown below.

Further, the first specific frequency band sequence and the second specific frequency band signal sequence in which the power is concentrated at a frequency band different from that of the first frequency band are generated, any one of the first specific frequency band sequence and the second specific frequency band signal sequence is selected by the training signal sequence selection unit 105, time-division multiplexed, and transmitted, and thus the specific frequency band signal sequence can be adaptively switched in accordance with an influence of narrowing (PBN: path band narrowing) of a signal in a repeater in the transmission path, frequency characteristics or a cut-off frequency of a front end (FE) unit such as a power amplifier, a digital-to-analog converter (DAC), an analog-to-digital converter (ADC), or an analog band pass filter (BPF) of a transceiver (the optical signal transmission apparatus or the optical signal reception apparatus), or a cut-off frequency of a digital BPF of the transceiver; accordingly, estimation of the chromatic dispersion in the reception unit becomes possible.

Here, a criterion for selecting one of the plurality of specific frequency band signal sequences as the training signal may include at least one of the shape, a cut-off frequency, or frequency characteristics of the digital band limit filter of the transceiver, narrowing of a signal, a filter shape, or frequency characteristics in a repeater in the transmission path, frequency characteristics in a propagation channel of the transmission path, an amount of chromatic dispersion to be estimated or a maximum value thereof, a transmission distance or a maximum value thereof, frequency characteristics, a filter shape, or a cut-off frequency of a front end unit such as a power amplifier, a digital-to-analog converter, an analog-to-digital converter, or an analog band pass filter of the transceiver, reception signal power or a reception signal power to noise power ratio of each frequency component, or the required estimation precision of the amount of chromatic dispersion.

Specifically, the shape, the cut-off frequency, or the frequency characteristics of the digital band limit filter of the transceiver, the narrowing of the signal, the filter shape, or the frequency characteristics in the repeater in the transmission path, the frequency characteristics in the propagation channel of the transmission path, the frequency characteristics, the filter shape, or the cut-off frequency of the front end unit such as a power amplifier, a digital-to-analog converter, an analog-to-digital converter, or an analog band pass filter of the transceiver, the reception signal power or the reception signal power to noise power ratio of each frequency component, or the like are measured or predicted from a previously transmitted signal or a signal being transmitted, and the training signal in which the most excellent characteristics are obtained is selected using a reception signal power or a reception signal power to noise power ratio of the training signal, a bit error rate or Q value of the transmission signal, error information of constellation of a transmission symbol, or the like.

Figure 5:
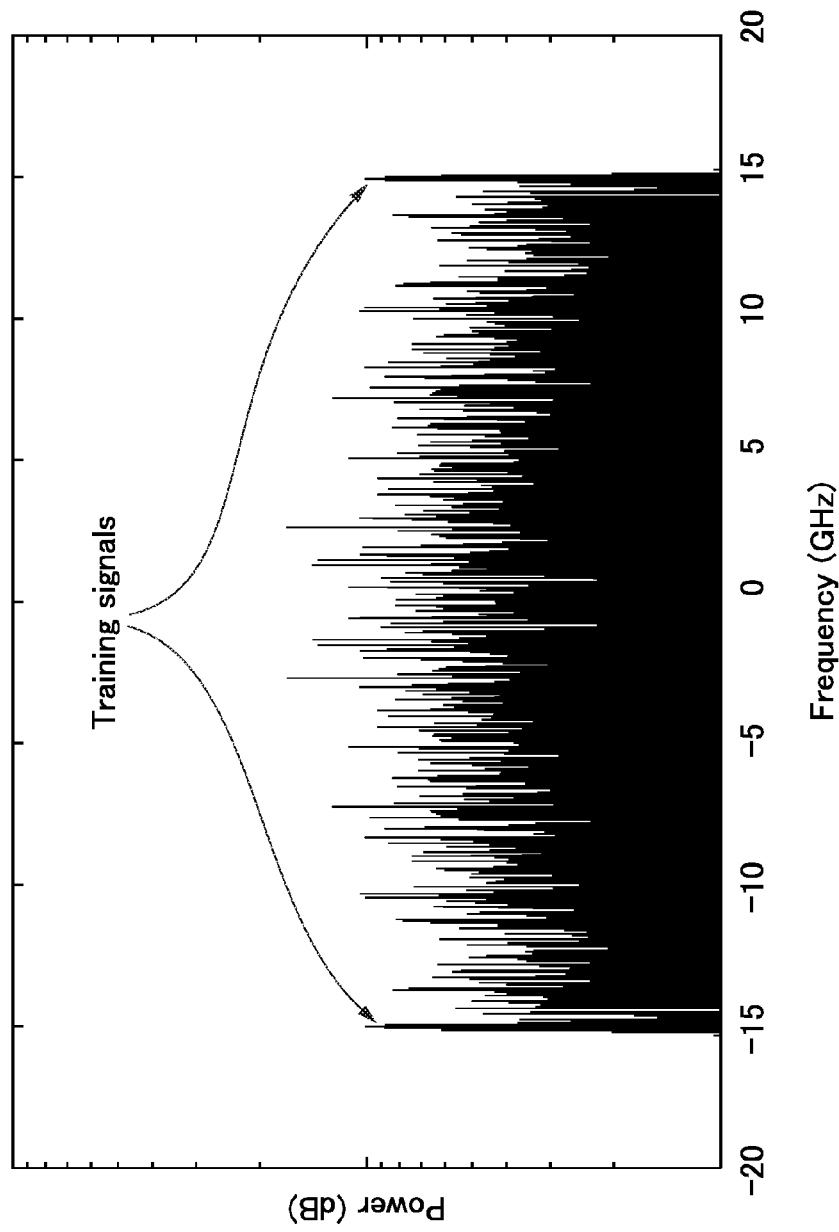
FIG. 5 is a diagram illustrating an example of a frequency spectrum of a transmission signal when band limitation using a Nyquist filter is performed and a first specific frequency band signal sequence is time-division multiplexed at a transmission end in the first embodiment.

As an example, a case is shown in which a Nyquist filter having a roll-off rate $\alpha=0.1$ and a cut-off frequency of 15 GHz is used as a digital BPF at the transmission end, and the electrical signal output from the signal multiplexing unit 102 is caused to pass through the digital BPF. FIG. 5 is a diagram illustrating a frequency spectrum of a transmission signal when the first specific frequency band signal sequence is time-division multiplexed in a case in which the band limitation using the Nyquist filter has been performed at the transmission end. Further, FIG. 6 is a diagram illustrating a frequency spectrum of a transmission signal when the second specific frequency band signal sequence is time-division multiplexed in a case in which the band limitation using the Nyquist filter has been performed at the transmission end.

Figure 6:
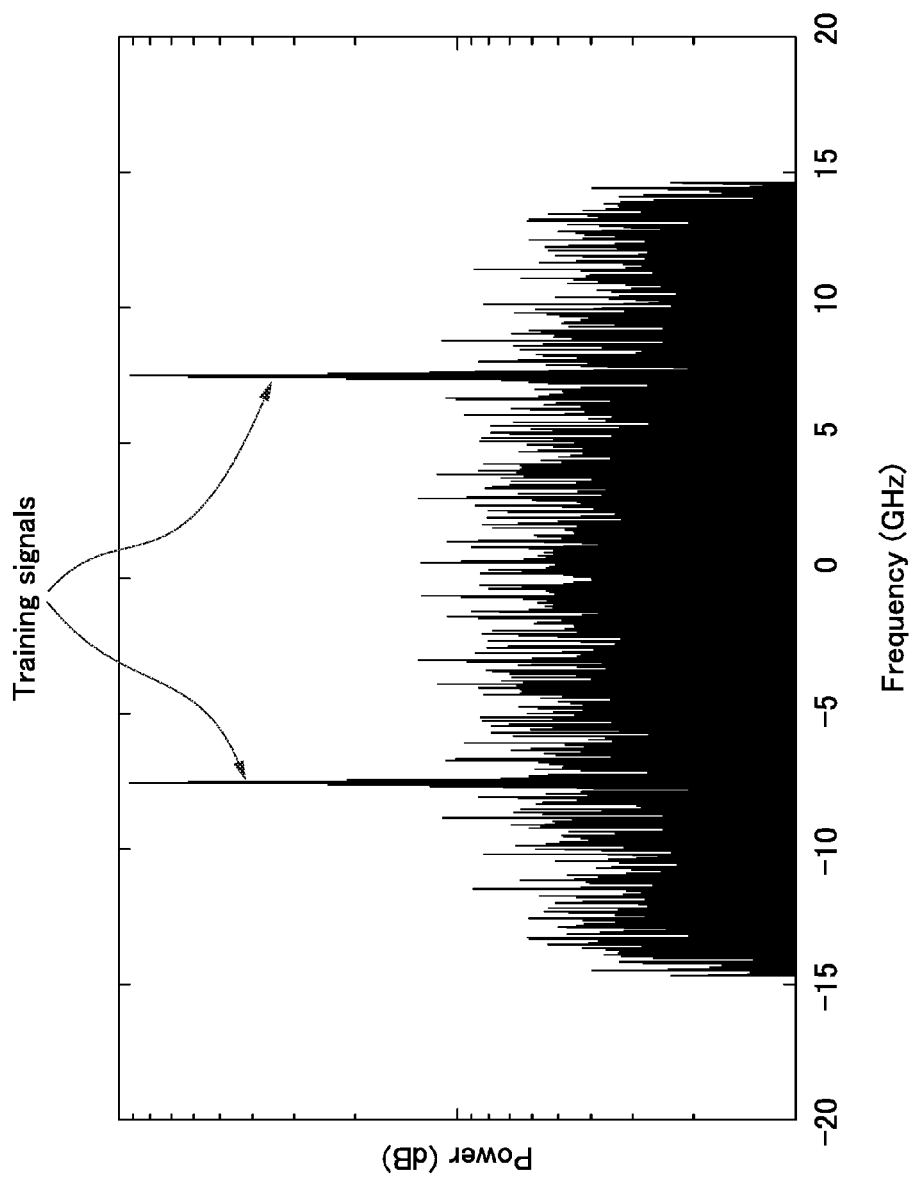
FIG. 6 is a diagram illustrating an example of a frequency spectrum of a transmission signal when band limitation using the Nyquist filter is performed and a second specific frequency band signal sequence is time-division multiplexed at a transmission end in the first embodiment.

As can be seen from FIGS. 5 and 6, when the band limitation using the Nyquist filter is applied to the transmission signal, the first specific frequency band signal sequence exists exactly in the same position as that of the cut-off frequency of the Nyquist filter, and thus the power becomes ¼. In contrast, in the second specific frequency band signal sequence, two spectra exist on the inner side relative to the cut-off frequency of the Nyquist filter, and thus the training signal sequence can be detected after the transmission signal passes the Nyquist filter. In the above description, the description of the digital BPF of the transmission end is given as one example; similarly, the first specific frequency band signal sequence exists exactly in the same position as that of the cut-off frequency of the Nyquist filter for a cut-off frequency in a digital BPF of a reception end, a front end unit such as a power amplifier, a digital-to-analog converter, an analog-to-digital converter, or an analog band pass filter of a transceiver, or a propagation path, and thus the power becomes ¼. In contrast, in the second specific frequency band signal sequence, two spectra exist on the inner side relative to the cut-off frequency of the Nyquist filter, and thus the training signal sequence can be detected even after the transmission signal passes the Nyquist filter.

Further, a group delay or attenuation of the power is seen in a band higher than or equal to a certain frequency, and a sufficient estimation precision may not be obtained depending on the shape or frequency characteristics of the digital band limit filter of the transceiver, a filter shape or frequency characteristics of a signal in a repeater in a transmission path, frequency characteristics of a propagation channel of the transmission path, or frequency characteristics or a filter shape of the front end unit such as a power amplifier, a digital-to-analog converter, an analog-to-digital converter, or an analog band pass filter of a transceiver. In this case, the chromatic dispersion can be estimated by performing a setting so that frequencies of the two spectra of the specific frequency band signal sequence are smaller than or equal to the certain frequency.

Further, since the arrival time difference (delay time difference) on the reception end of the two spectra of the specific frequency band signal sequence to be shown below varies depending on the amount of chromatic dispersion or a maximum value thereof to be estimated, and the transmission distance or a maximum value thereof, the training signal may be selected in accordance with the amount of chromatic dispersion to be estimated or the transmission distance. Specifically, as shown below, since the arrival time difference (delay time difference) at the reception end increases as the amount of chromatic dispersion or the transmission distance increases, an upper limit value of a time delay difference that can be estimated may be determined by a circuit design. Therefore, in this case, the specific frequency band signal sequence included in that range is selected as the training signal sequence. That is, since the arrival time difference (delay time difference) decreases in a narrower band even at the same amount of chromatic dispersion and the same transmission distance, the specific frequency band signal sequence that does not exceed the upper limit value can be selected as the training signal sequence. Accordingly, the estimation of the chromatic dispersion becomes possible without changing the circuit.

Further, it is considered that reception signal power or a reception signal power to noise power ratio of each frequency component may vary in accordance with the shape or the frequency characteristics of the digital band limit filter of the transceiver, the filter shape or the frequency characteristics of the signal in the repeater in the transmission path, the frequency characteristics of the propagation channel of the transmission path, or the frequency characteristics or the filter shape of the front end unit such as a power amplifier, a digital-to-analog converter, an analog-to-digital converter, or an analog band pass filter of the transceiver. In this case, for example, reception signal power or a reception signal power to noise power ratio of each frequency component may be measured on the reception end, and a specific frequency band signal sequence in which the reception signal power or the reception signal power to noise power ratio is highest may be selected as the training signal on the reception end. Accordingly, it is possible to enhance the reception signal power or the reception signal power to noise power ratio, and to improve the estimation precision of the chromatic dispersion.

Here, it is preferable that a frequency interval between a frequency band at which the power in the first specific frequency band signal sequence generated by the training signal sequence generation unit 104-1 is concentrated and a frequency band at which the power in the second specific frequency band signal sequence generated by the training signal sequence generation unit 104-2 is concentrated be set so as to be greater than a maximum value of a frequency offset (for example, a frequency deviation between lasers used in the optical signal reception apparatus and the optical signal transmission apparatus) which may be generated between the optical signal reception apparatus and the optical signal transmission apparatus. By setting the frequency interval to be greater than the maximum value of the frequency offset anticipated in advance, it is possible to easily distinguish the first specific frequency band signal sequence from the second specific frequency band signal sequence at the reception end.

Further, by generating at least one training signal sequence in which a specific frequency band signal is present at a frequency lower than a frequency band in which power is greatly attenuated by the transmission path, the FE unit of the transceiver, or the digital BPF of the transceiver, it is possible to detect the training signal sequence and estimate the chromatic dispersion at the receiver end in all circumstances.

A plurality of specific frequency band signal sequences generated by the plurality of training signal sequence generation units 104-*l* (l=1, 2, . . . , L) are input to the training signal sequence selection unit 105. The training signal sequence selection unit 105 selects one of the plurality of specific frequency band signal sequences, and inputs the selected specific frequency band signal sequence to the signal multiplexing unit 102. The signal multiplexing unit 102 multiplexes, in a time domain, the input specific frequency band signal sequence in a specific position within the transmission signal input from the transmission signal modulation unit 101. A signal in which the transmission signal and the specific frequency band signal sequence are multiplexed in the signal multiplexing unit 102 is transmitted by the electrical-to-optical conversion unit 103 as an optical signal. In this case, it is possible to obtain a diversity gain by transmitting training signal sequences in parallel in different polarization planes, and robustness against polarization-dependent loss is achieved.

Figure 7:
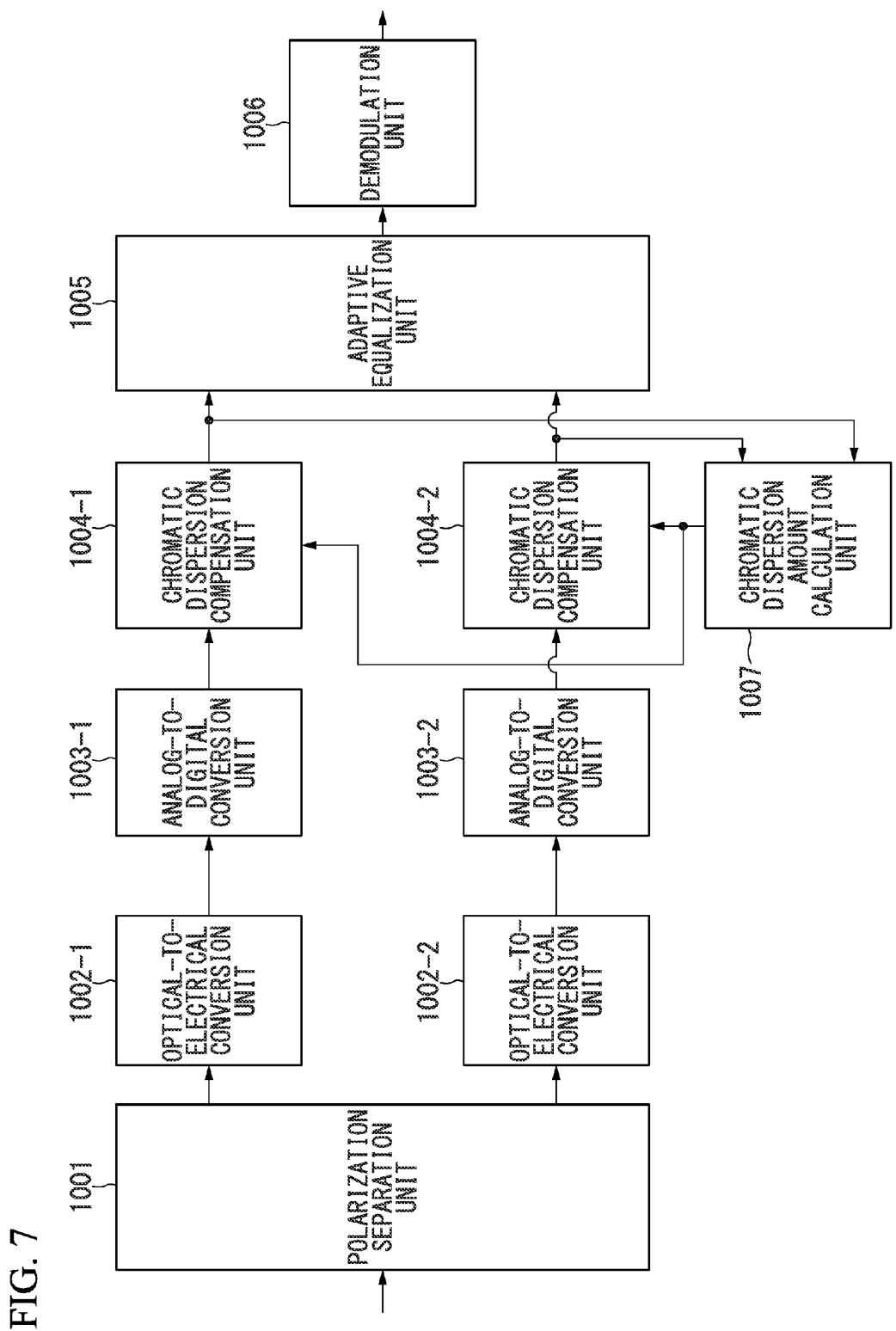
FIG. 7 is a block diagram illustrating an example of a configuration of an optical signal reception apparatus in the first embodiment.

FIG. 7 is a block diagram illustrating an example of a configuration of the optical signal reception apparatus in the present embodiment. In FIG. 7, 1001 indicates a polarization separation unit, 1002-1 and 1002-2 indicate optical-to-electrical conversion units, 1003-1 and 1003-2 indicate analog-to-digital conversion units, 1004-1 and 1004-2 indicate chromatic dispersion compensation units, 1005 indicates an adaptive equalization unit, 1006 indicates a demodulation unit, and 1007 indicates a chromatic dispersion amount calculation unit. The optical signal reception apparatus in the present embodiment includes the polarization separation unit 1001, the optical-to-electrical conversion units 1002-1 and 1002-2, the analog-to-digital conversion units 1003-1 and 1003-2, the chromatic dispersion compensation units 1004-1 and 1004-2, the adaptive equalization unit 1005, the demodulation unit 1006, and the chromatic dispersion amount calculation unit 1007.

The polarization separation unit 1001 performs polarization separation on the received optical signal in an optical domain, and outputs polarization-separated optical signals to the optical-to-electrical conversion unit 1002-1 and the optical-to-electrical conversion unit 1002-2. The polarization separation unit 1001, for example, can separate the received optical signal into two orthogonal polarizations by including a polarization diversity 90° hybrid coupler, and a local oscillator light source. Here, in order to simplify the description, one of the two orthogonal polarizations is referred to as an X polarization, and the other polarization is referred to as a Y polarization. The polarization separation unit 1001 outputs the X polarization to the optical-to-electrical conversion unit 1002-1, and outputs the Y polarization to the optical-to-electrical conversion unit 1002-2.

The optical-to-electrical conversion unit 1002-*i* (i=1 or 2) receives the X polarization or the Y polarization of the optical signal transferred via an optical fiber, converts the X polarization or the Y polarization into an electrical signal, and outputs the result to the analog-to-digital conversion unit 1003-*i*. Specifically, the optical-to-electrical conversion unit 1002-1 and the optical-to-electrical conversion unit 1002-2 each separate an optical electric field of input signal light into orthogonal components using local oscillator light, and convert the separated components into an electrical analog signal. The analog/digital conversion unit 1003-*i* (i=1 or 2) receives the electrical signal from the optical-to-electrical conversion unit 1002-*i*, performs analog/digital conversion, and outputs a digitally converted (sampled) reception signal. The digital reception signal output from the analog-to-digital conversion unit 1003-*i* (i=1 or 2) is input to the chromatic dispersion compensation unit 1004-*i*.

The chromatic dispersion compensation unit 1004-1 and the chromatic dispersion compensation unit 1004-2 each receive the digital reception signal, compensate for distortion of the signal caused by the chromatic dispersion based on an amount of chromatic dispersion calculated by the chromatic dispersion amount calculation unit 1007, and output the result. The chromatic dispersion amount calculation unit 1007 receives output results of the chromatic dispersion compensation unit 1004-1 and the chromatic dispersion compensation unit 1004-2, calculates the amount of chromatic dispersion, and outputs the result of the calculation to the chromatic dispersion compensation unit 1004-1 and the chromatic dispersion compensation unit 1004-2 as an output value. The adaptive equalization unit 1005 receives digital reception signals compensated by the chromatic dispersion compensation unit 1004-1 and the chromatic dispersion compensation unit 1004-2, compensates for polarization mode dispersion and a signal distorted in the transceiver and/or the transmission path, and outputs the result to the demodulation unit 1006. The demodulation unit 1006 receives the digital reception signal compensated by the adaptive equalization unit 1005, demodulates the reception signal, and outputs a demodulation result.

Here, the chromatic dispersion compensation unit 1004-1, the chromatic dispersion compensation unit 1004-2, and the adaptive equalization unit 1005 can operate using the methods of the frequency domain equalization (FDE) and time domain equalization (TDE) shown in Reference Document 1.

(Reference Document 1) R. Kudo, T. Kobayashi, K. Ishihara, Y. Takatori, A. Sano, and Y. Miyamoto, "Coherent optical single carrier transmission using overlap frequency domain equalization for long-haul optical systems", J. Lightwave Technology, vol. 27, no. 16, pp. 3721-3728, August 2009.

Further, the chromatic dispersion compensation unit 1004-1 and the chromatic dispersion compensation unit 1004-2 set an amount of chromatic dispersion of 0 ps/nm as an initial value, and update the value based on the chromatic dispersion amount calculated by the chromatic dispersion amount calculation unit 1007. Further, in the configuration illustrated in FIG. 7, the inputs of the chromatic dispersion amount calculation unit 1007 are the outputs of the chromatic dispersion compensation units 1004-1 and 1004-2, but they may be the outputs of the analog-to-digital conversion units 1003-1 and 1003-2. In this case, the chromatic dispersion amount calculation unit 1007 is able to always estimate the amount of chromatic dispersion without being influenced by a compensation error in the chromatic dispersion compensation unit 1004-1 and the chromatic dispersion compensation unit 1004-2.

Figure 8:
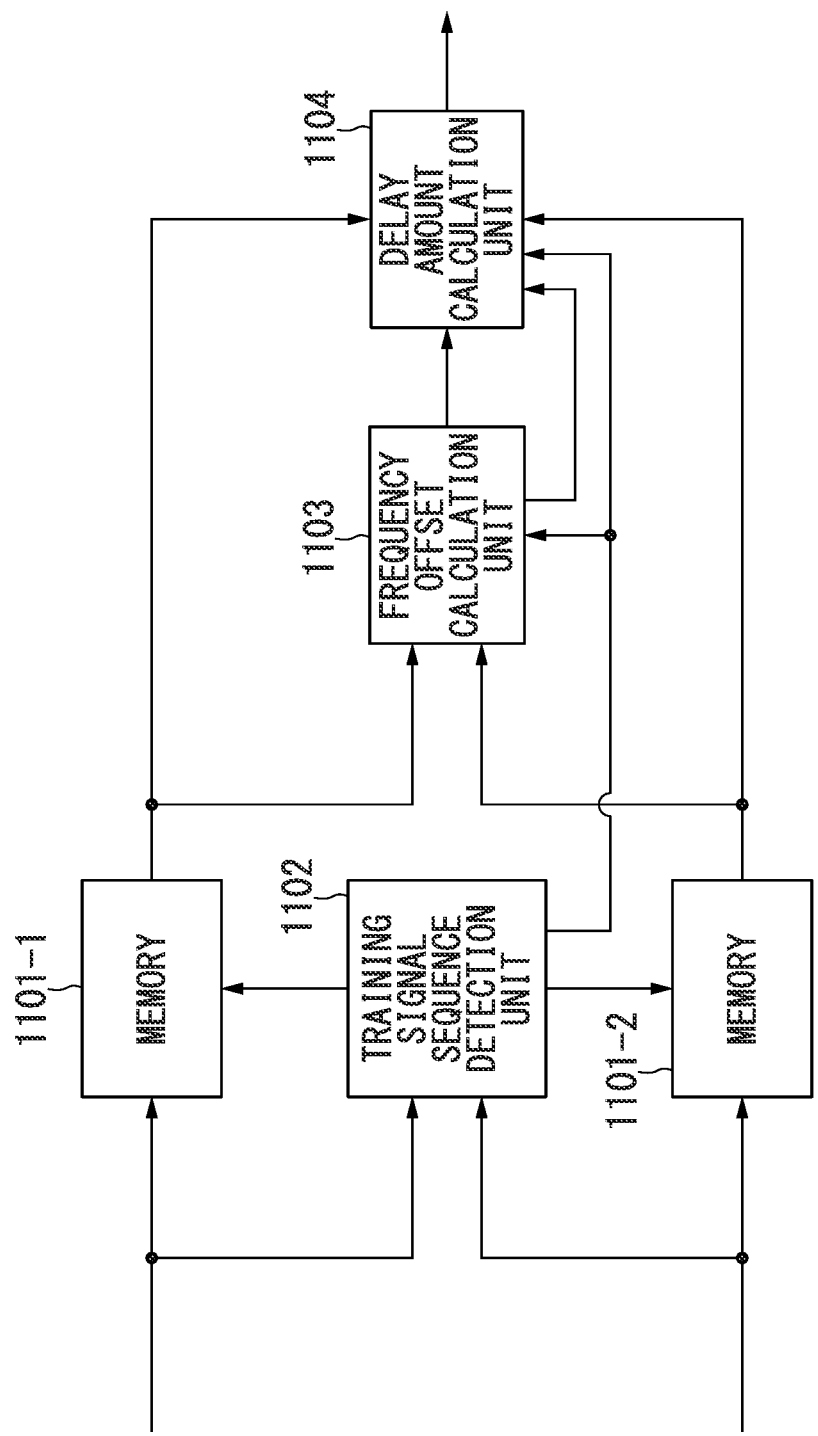
FIG. 8 is a block diagram illustrating an example of a configuration of a chromatic dispersion amount calculation unit 1007 in the first embodiment.

FIG. 8 is a block diagram illustrating an example of a configuration of the chromatic dispersion amount calculation unit 1007 in the present embodiment. In FIG. 8, 1101-1 and 1101-2 indicate memories, 1102 indicates a training signal sequence detection unit, 1103 indicates a frequency offset calculation unit, and 1104 indicates a delay amount calculation unit. The chromatic dispersion amount calculation unit 1007 includes the memories 1101-1 and 1101-2, the training signal sequence detection unit 1102, the frequency offset calculation unit 1103, and the delay amount calculation unit 1104.

The signal sequence of the X polarization or the Y polarization output from the chromatic dispersion compensation unit 1004-*i* is input as an input signal to the memory 1101-*i* (i=1 or 2). The memory 1101-*i* buffers only a signal sequence in a section in which the training signal sequence is included and sections before and after that section in each training insertion period Ns based on an output of the training signal sequence detection unit 1102, and outputs the signal sequence. Signal sequences in other sections are deleted.

The training signal sequence detection unit 1102 receives the signal sequences of the X polarization and the Y polarization output from the chromatic dispersion compensation unit 1004-1 and the chromatic dispersion compensation unit 1004-2, and detects an insertion position of the training signal sequence. Here, as a method for detecting the insertion position of the training signal sequence, for example, signal power in a band in which the specific frequency band signal sequence may exist (a band in which an influence of the frequency offset is considered) is calculated in a section of the insertion period Ns of the training signal sequence, and a time when the signal power becomes a peak or exceeds a threshold is detected as the insertion position of the training signal sequence, or the insertion position of the training signal sequence is detected by calculating a cross-correlation between the training signal and the reception signal and detecting a peak of the power when the training signal sequence to be previously transmitted is known to the reception end.

Further, the training signal sequence detection unit 1102 outputs control signals to the memory 1101-1 and the memory 1101-2 to buffer only the signal sequence in the section in which the training signal sequence is included and sections before and after that section based on the insertion position of the training signal sequence detected above. Further, the training signal sequence detection unit 1102 outputs information regarding the determined type of the specific frequency band signal sequence to the frequency offset calculation unit 1103 and the delay amount calculation unit 1104 as control information.

The frequency offset calculation unit 1103 receives the output signal sequences from the memory 1101-1 and the memory 1101-2 and the control information from the training signal sequence detection unit 1102, and calculates a frequency offset. The frequency offset calculation unit 1103 outputs the result of the frequency offset calculation to the delay amount calculation unit 1104. Here, the frequency offset is obtained by calculating an amount of a frequency offset of the specific frequency band signal sequence. Moreover, the frequency offset calculation unit 1103 outputs information regarding the determined type of the specific frequency band signal sequence to the delay amount calculation unit 1104 as control information.

The delay amount calculation unit 1104 receives the outputs of the memory 1101-1 and the memory 1101-2, the output of the frequency offset calculation unit 1103, and the control information from the training signal sequence detection unit 1102, and calculates a relative time difference (an amount of delay) of frequency spectra of the specific frequency band signal sequences.

In the chromatic dispersion amount calculation unit 1007 configured as illustrated in FIG. 8, the training signal sequence detection unit 1102 detects the insertion position of the training signal sequence, and outputs the control signals to the memory 1101-1 and the memory 1101-2 to buffer only the signal sequence in the section in which the detected training signal sequence is included and the sections before and after that section. Therefore, the frequency offset calculation unit 1103 and the delay amount calculation unit 1104 calculate the amount of the frequency offset and the amount of the delay using only the signal buffered in the memories in a section of the insertion period Ns of the training signal sequence. When the insertion period Ns of the training signal sequence is longer than the buffered signal sequence, a processing operation of the frequency offset calculation unit 1103 and the delay amount calculation unit 1104 can be performed at lower speed than a processing operation of the training signal sequence detection unit 1102, and lower power consumption and reduction of a circuit scale can be achieved by decreasing a frequency of an operation clock in a synchronization circuit. Further, when it is acceptable that the amount of frequency offset and the amount of delay are estimated per U frames (U≥2; U is an integer), it is possible to decrease the operating clock and achieve lower power consumption and reduction of a circuit scale as compared to a case in which the amounts are estimated per frame.

Figure 18:
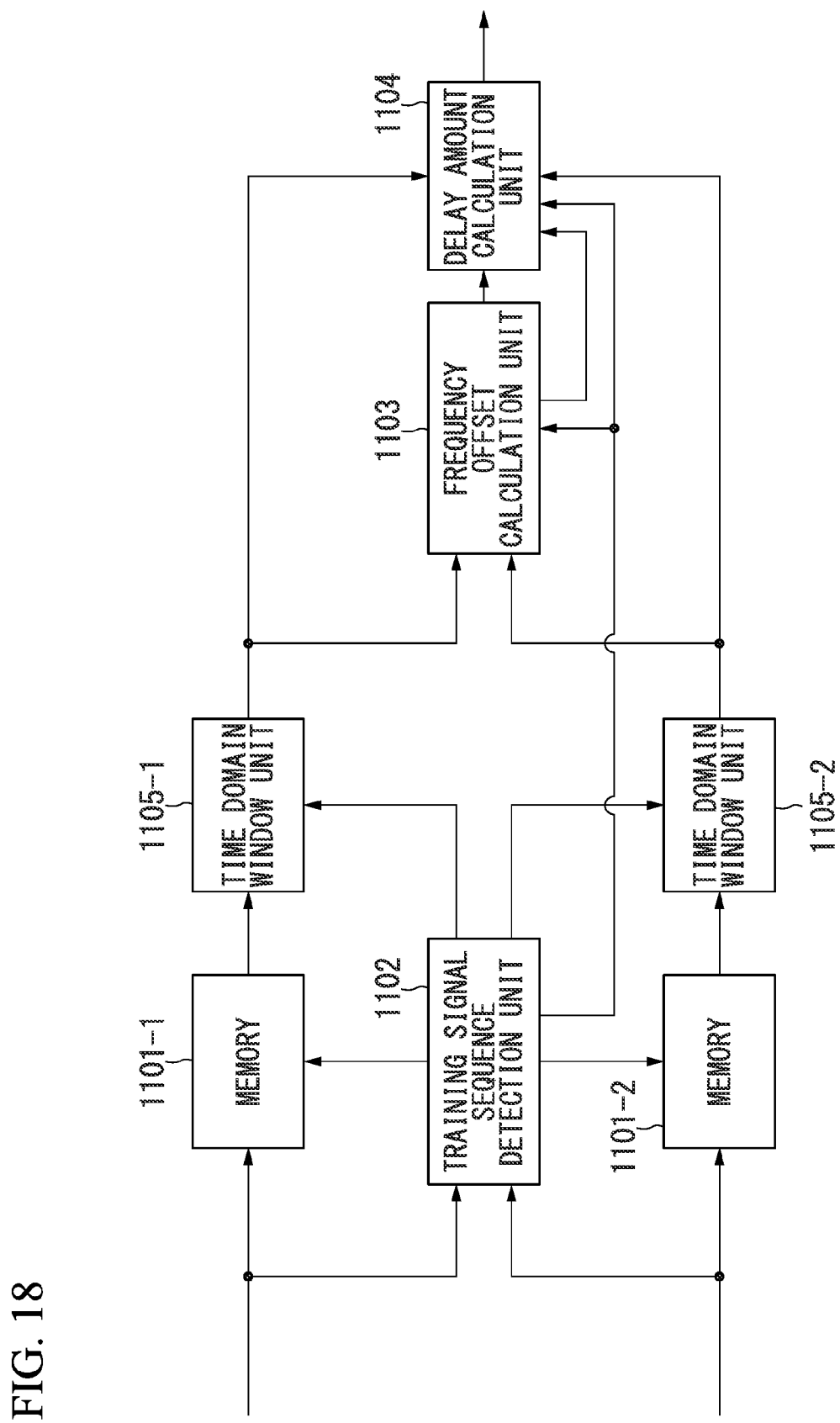
FIG. 18 is a block diagram illustrating an example of a configuration of the chromatic dispersion amount calculation unit 1007 including a time domain window unit.
Figure 19:
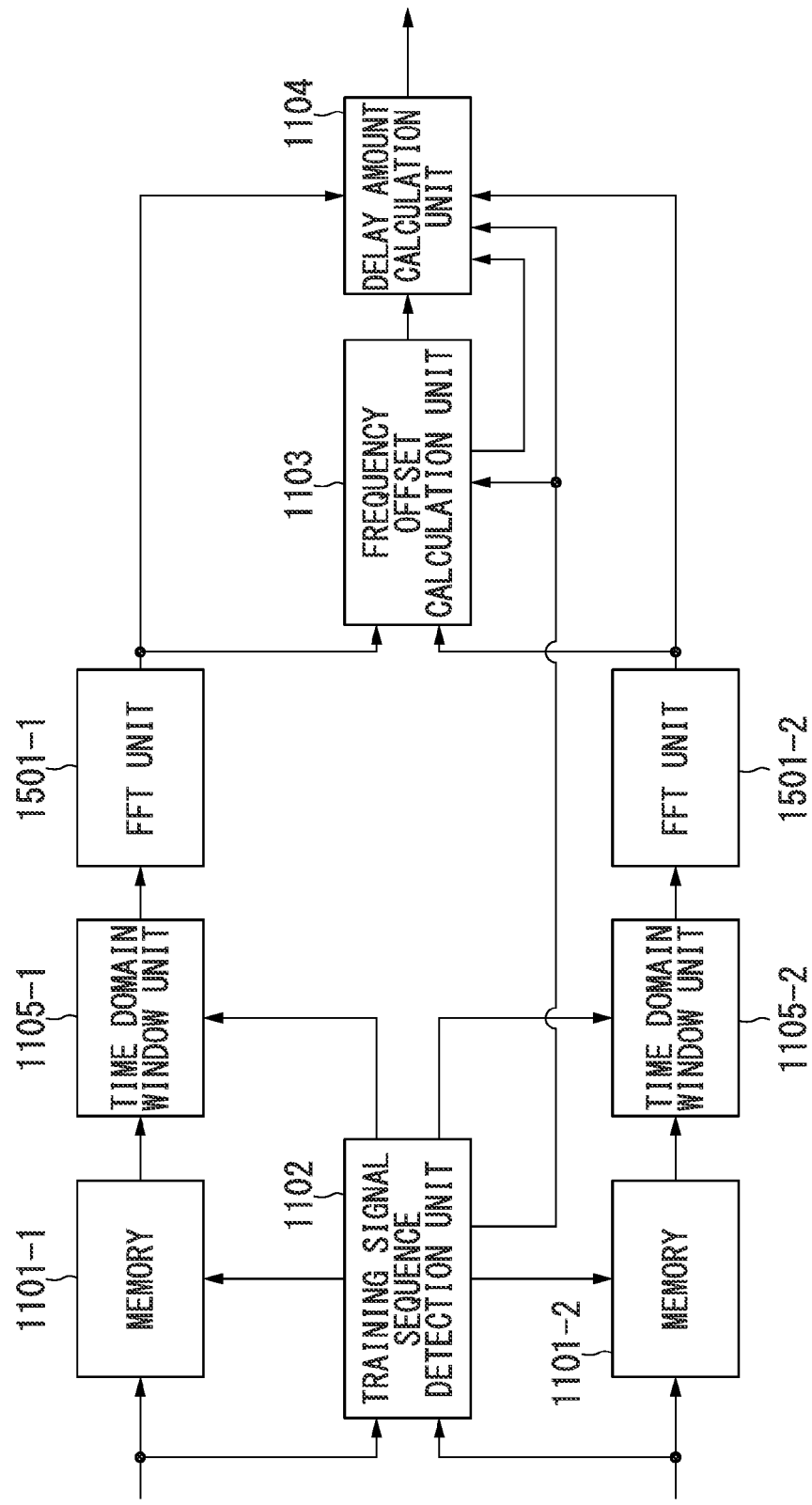
FIG. 19 is a block diagram illustrating an example of a configuration of the chromatic dispersion amount calculation unit 1007 that uses FFT and IFFT to perform filtering in a frequency domain and includes a time domain window unit.

Further, as illustrated in FIG. 18, in the chromatic dispersion amount calculation unit 1007, when time domain window units 1105-*i* (i=1 or 2) are provided on the output sides of the memories 1101-*i* (i=1 and 2), an S/N of the training signal sequences input to the frequency offset calculation unit 1103 and the delay amount calculation unit 1104 can be increased. The time domain window unit 1105-*i* (i=1 or 2) extracts any smaller signal sequence from the buffered signal sequence so as to include part or all of the training signal sequences based on the position information of the training signal sequence output from the training signal sequence detection unit 1102, and performs zero substitution on other portions. Accordingly, it is possible to reduce waveform distortion that depends on a signal pattern, and noise power. Alternatively, the time domain window unit 1105-*i* (i=1 or 2) extracts a signal sequence from the buffered signal sequence so as not to include the training signal sequence based on the position information of the training signal sequence output from the training signal sequence detection unit 1102, and performs zero substitution on other portions. Accordingly, the data signal sequence other than the training signal sequence can be extracted, and thus it is possible to calculate the signal power of the reception signal. The signal power of the reception signal may be calculated using a power calculation unit to be described below, or a dedicated calculation unit for calculating the signal power of the reception signal may be provided. It is to be noted that FIG. 18 illustrates a configuration in which the time domain window units 1105-*i* (i=1 and 2) are added to the configuration in FIG. 8, a configuration in which the time domain window units 1105-*i* (i=1 and 2) are added to the configuration in FIG. 15, as illustrated in FIG. 19, may be adopted.

Further, the delay amount calculation unit 1104 illustrated in FIG. 8 can also buffer a plurality of estimation values and output an average value of the estimation values. Further, the delay amount calculation unit 1104 can sort the plurality of buffered estimation values in ascending or descending order, remove any number of higher estimation values including a maximum value and any number of lower estimation values including a minimum value, calculate the average value, and then output the average value as an estimation value. Accordingly, even when an abnormal value is output as the estimation value due to waveform distortion or an instantaneous error that depends on a signal pattern, it is possible to remove influence thereof.

Figure 9:
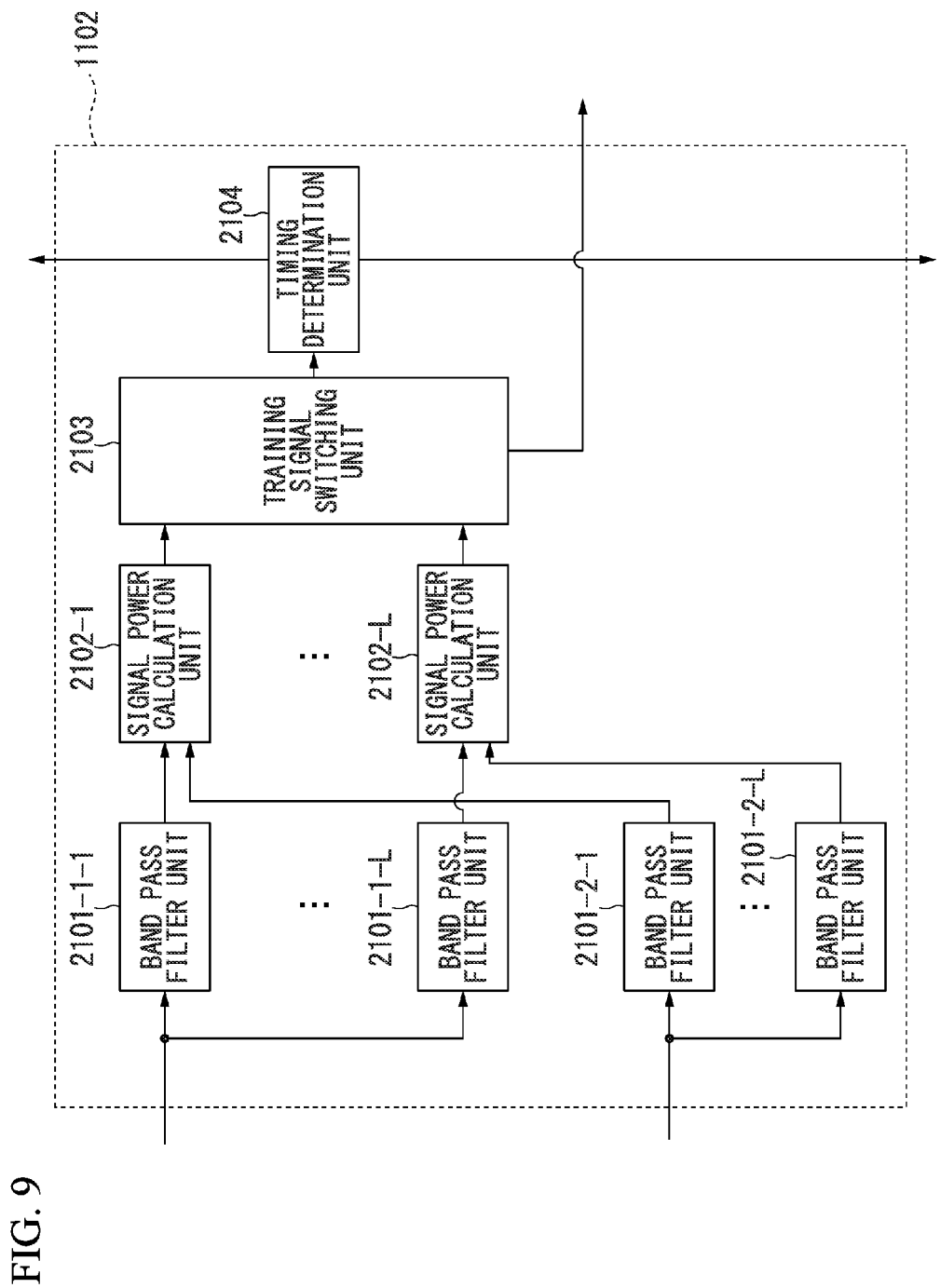
FIG. 9 is a block diagram illustrating an example of a configuration of a training signal sequence detection unit 1102 in the first embodiment.

FIG. 9 is a block diagram illustrating an example of a configuration of the training signal sequence detection unit 1102 in the present embodiment. In FIG. 9, 2101-1-$l$ (1≤$l$≤L and L≥2) and 2101-2-$l$ (1≤$l$≤L and L≥2) indicate band pass filter units, 2102-$l$ (1≤$l$≤L and L≥2) indicates a signal power calculation unit, 2103 indicates a training signal switching unit, and 2104 indicates a timing determination unit. The training signal sequence detection unit 1102 includes 2×L band pass filter units 2101-1-1 to 2101-1-L and 2101-2-1 to 2101-2-L, L signal power calculation units 2102-1 to 2102-L, the training signal switching unit 2103, and the timing determination unit 2104.

The band pass filter unit 2101-1-$l$ (1≤$l$≤L and L≥2) performs a process of a band pass filter (BPF) that passes a component in a predetermined frequency band on the sequence of the X polarization output from the chromatic dispersion compensation unit 1004-1 (FIG. 7). The band pass filter unit 2101-2-$l$ (1≤$l$≤L and L≥2) performs a process of a band pass filter that passes a component in a predetermined frequency band on the sequence of the Y polarization output from the chromatic dispersion compensation unit 1004-2 (FIG. 7). Here, the training signal sequence detection unit 1102 includes the band pass filter unit 2101-1-$l$ and the band pass filter unit 2101-2-$l$ for the X polarization and the Y polarization as L types of BPFs. The L types of BPFs include filters that pass signal components of different training signal sequences, and are provided corresponding to types of the all training signal sequences used at a transmitter end.

The signal power calculation unit 2102-$l$ (1≤$l$≤L and L≥2) calculates the signal power for signals output from the band pass filter units 2101-1-$l$ (1≤$l$≤L and L≥2) and the band pass filter units 2101-2-$l$ (1≤$l$≤L and L≥2). The training signal switching unit 2103 receives the signal powers calculated by the L types of the signal power calculation unit 2102-$l$ (1≤$l$≤L and L≥2), selects the sequence having a maximum signal power among the signal powers calculated in respective sequences, and outputs the sequence to the timing determination unit 2104. Further, the training signal switching unit 2103 outputs information regarding the selected sequence as control information. The timing determination unit 2104 determines the position in which the training has been inserted from the signal sequence output from the training signal switching unit 2103, and outputs the result as the control information.

For example, when the two specific frequency band signal sequences as illustrated in FIGS. 3 and 4 used in the above description have been transmitted as a transmission signal of 30 Gbaud, the training signal sequence detection unit 1102 includes L=2 types of band pass filters (BPFs), including a band pass filter unit 2101-1-1, a band pass filter unit 2101-2-1, a band pass filter unit 2101-1-2, and a band pass filter unit 2101-2-2.

As the band pass filter unit 2101-1-1 and the band pass filter unit 2101-2-1, BPFs having central frequencies of 15 GHz and −15 GHz and a bandwidth of ±Δf are used so as to pass the first specific frequency band signal sequence. As the band pass filter unit 2101-1-2 and the band pass filter unit 2101-2-2, BPFs having central frequencies of 7.5 GHz and −7.5 GHz and a bandwidth of ±Δf are used so as to pass the second specific frequency band signal sequence.

Here, it is preferable for a conceivable maximum frequency offset value (for example, Δf=5 GHz when the maximum frequency offset is 5 GHz) or a value for causing a specific frequency band signal sequence other than a desired specific frequency band signal sequence not to be passed (for example, Δf<3.75 GHz when the two specific frequency band signal sequences are assumed) to be set as the set value of Δf.

The signal power calculation unit 2102-$l$ (1≤$l$≤L) calculates the signal power for the output signal sequences from the band pass filter unit 2101-1-$l$ and the band pass filter unit 2101-2-$l$. Here, as the signal power, power for each sample of a time signal sequence may be calculated or the signal sequence may be divided into blocks having a certain length and a sum of signal powers in these sections may be output. It is to be noted that while the signal power calculation unit 2102-$l$ (1≤$l$≤L) uses the signal sequence of the X polarization from the band pass filter unit 2101-1-$l$ and the signal sequence of the Y polarization from the band pass filter unit 2101-2-$l$ as input values, a sum of the powers of the X polarization and the Y polarization may be output in the power calculation or a calculation result of either the X polarization or the Y polarization may be selected and output in the power calculation.

The training signal switching unit 2103 receives the calculation results from the L types of signal power calculation unit 2102-$l$ (1≤$l$≤L and L≥2), selects the sequence having a greatest value among the maximum values of the signal powers calculated in the respective sequences, and outputs the sequence. For example, when the transmitter selects the specific frequency band signal sequence in FIG. 3 as the training signal sequence, the receiver end determines that the receiver receives the training signal sequence corresponding to the signal power calculation unit 2102-1 since the maximum value of the signal power is greater in the signal power calculation unit 2102-1. In this case, the training signal switching unit 2103 outputs the output of the signal power calculation unit 2102-1 to the timing determination unit 2104, and outputs information indicating that the specific frequency band signal sequence in FIG. 3 has been selected to the frequency offset calculation unit 1103 and the delay amount calculation unit 1104 as control information.

On the other hand, when the transmitter selects the specific frequency band signal sequence in FIG. 4 as the training signal sequence, the receiver end determines that the receiver receives the training signal sequence corresponding to the signal power calculation unit 2102-2 since the maximum value of the signal power is greater in the signal power calculation unit 2102-2. In this case, the training signal switching unit 2103 outputs the output of the signal power calculation unit 2102-2 to the timing determination unit 2104, and outputs, as control information, information indicating that the specific frequency band signal sequence of FIG. 4 has been selected to the frequency offset calculation unit 1103 and the delay amount calculation unit 1104.

The timing determination unit 2104 determines a position in which the training has been inserted based on the output signal sequence from the training signal switching unit 2103, and outputs the result of the determination to the memory 1101-1 and the memory 1101-2 as control information. As a method for determining the timing, a temporal position in which a peak value or a value greater than or equal to a threshold value among power values calculated for samples or blocks, or both exist is detected as a position (timing) in which the training signal sequence exists.

In the case of the related art as shown in Reference Document 1, it is difficult to establish synchronization of frames in a reception signal influenced by the chromatic dispersion, whereas in the present embodiment, the position of the training signal can be detected and the frame synchronization becomes possible even for the reception signal influenced by the chromatic dispersion.

Figure 10:
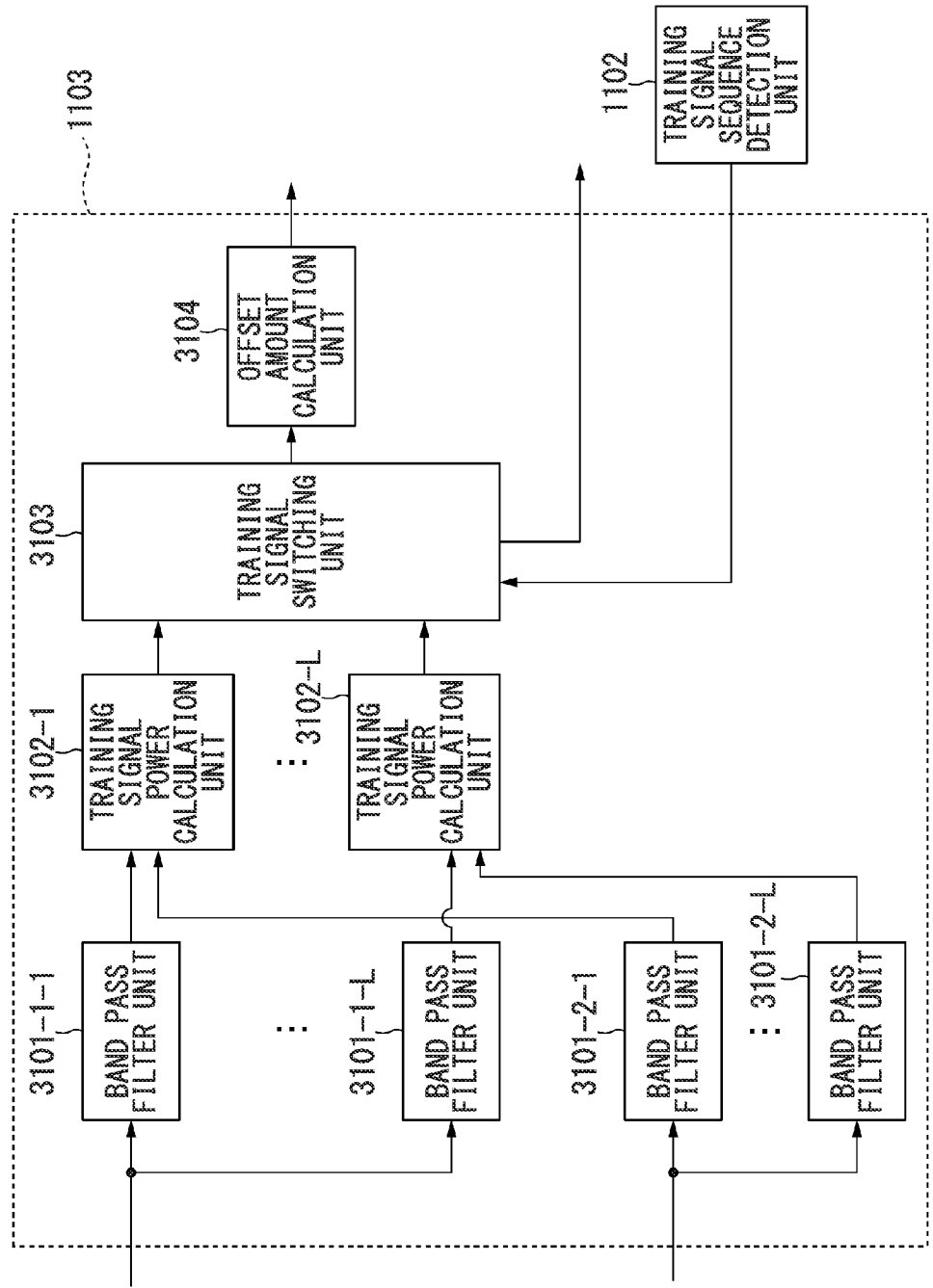
FIG. 10 is a block diagram illustrating an example of a configuration of a frequency offset calculation unit 1103 in the first embodiment.

FIG. 10 is a block diagram illustrating an example of a configuration of the frequency offset calculation unit 1103 in the present embodiment. In FIG. 10, 3101-1-$l$ ($1 \leq l \leq L$ and $L \geq 2$) and 3101-2-$l$ ($1 \leq l \leq L$ and $L \geq 2$) indicate band pass filter units, 3102-$l$ ($1 \leq l \leq L$ and $L \geq 2$) indicates a training signal power calculation unit, 3103 indicates a training signal switching unit, and 3104 indicates an offset amount calculation unit. The frequency offset calculation unit 1103 includes 2×L band pass filter units 3101-1-1 to 3101-1-L and 3101-2-1 to 3101-2-L, the training signal power calculation units 3102-1 to 3102-L, the training signal switching unit 3103, and the offset amount calculation unit 3104.

The band pass filter unit 3101-1-$l$ ($1 \leq l \leq L$ and $L \geq 2$) performs a process of a band pass filter (BPF) for passing a component in a predetermined frequency band on the training signal sequence of the X polarization output from the memory 1101-1 (FIG. 8). The band pass filter unit 3101-2-$l$ ($1 \leq l \leq L$ and $L \geq 2$) performs a process of a band pass filter (BPF) for passing a component in a predetermined frequency band on the training signal sequence of the Y polarization output from the memory 1101-2 (FIG. 8). Here, the frequency offset calculation unit 1103 includes the band pass filter units 3101-1-$l$ and the band pass filter unit 3101-2-$l$ as L types of BPFs for the X polarization and the Y polarization. The L types of BPFs are configured as filters that pass signal components of different training signal sequences, and are provided corresponding to types of all the training signal sequences used at the transmitter end.

The training signal power calculation unit 3102-$l$ ($1 \leq l \leq L$ and $L \geq 2$) calculates signal power for the signals output from the band pass filter unit 3101-1-$l$ ($1 \leq l \leq L$ and $L \geq 2$) and the band pass filter unit 3101-2-$l$ ($1 \leq l \leq L$ and $L \geq 2$). The training signal switching unit 3103 receives calculation results from the L types of training signal power calculation unit 3102-$l$ ($1 \leq l \leq L$ and $L \geq 2$), selects the training signal sequence having a greatest value among maximum values of powers calculated in the training signal sequences, and outputs the training signal sequence. Further, in addition to outputting the selected training signal sequence, the training signal switching unit 3103 determines the training signal sequence transmitted at the transmission end and outputs the result of the determination as control information, similarly to the training signal switching unit 2103 (FIG. 9). Alternatively, the training signal switching unit 3103 selects one of the L types of training signal sequences using the control information from the training signal switching unit 2103, and outputs the selected training signal sequence. The offset amount calculation unit 3104 calculates an amount of a frequency offset from the training signal sequence output from the training signal switching unit 3103, and outputs the result.

Since a specific operation of the band pass filter unit 3101-1-$l$ ($1 \leq l \leq L$ and $L \geq 2$), the band pass filter unit 3101-2-$l$ ($1 \leq l \leq L$ and $L \geq 2$), the training signal power calculation unit 3102-$l$ ($1 \leq l \leq L$ and $L \geq 2$), and the training signal switching unit 3103 is the same as the operation of the band pass filter units 2101-1-$l$ ($1 \leq l \leq L$ and $L \geq 2$) and 2101-2-$l$ ($1 \leq l \leq L$ and $L \geq 2$), the signal power calculation unit 2102-$l$ ($1 \leq l \leq L$ and $L \geq 2$), and the training signal switching unit 2103, a description thereof will be omitted.

A specific operation example of the offset amount calculation unit 3104 will be described. For example, when the optical signal reception apparatus receives the first specific frequency band signal sequence as illustrated in FIG. 3, peak values of power in a frequency spectrum are originally present at ±15 GHz in this first specific frequency band signal sequence, as illustrated in FIG. 3. However, when a frequency offset exists, the peak values are present at ±15 GHz+Δf. Accordingly, by calculating the difference Δf from the detected peak values, the frequency offset can be calculated even in the reception signal influenced by the chromatic dispersion. For example, when the signal having the frequency spectrum of FIG. 3 has been transmitted, and the peak values have been detected at 18 GHz and −12 GHz at the reception end, a frequency offset of Δf=3 GHz can be estimated by (18−15) GHz or (−12−(−15)) GHz.

Figure 11:
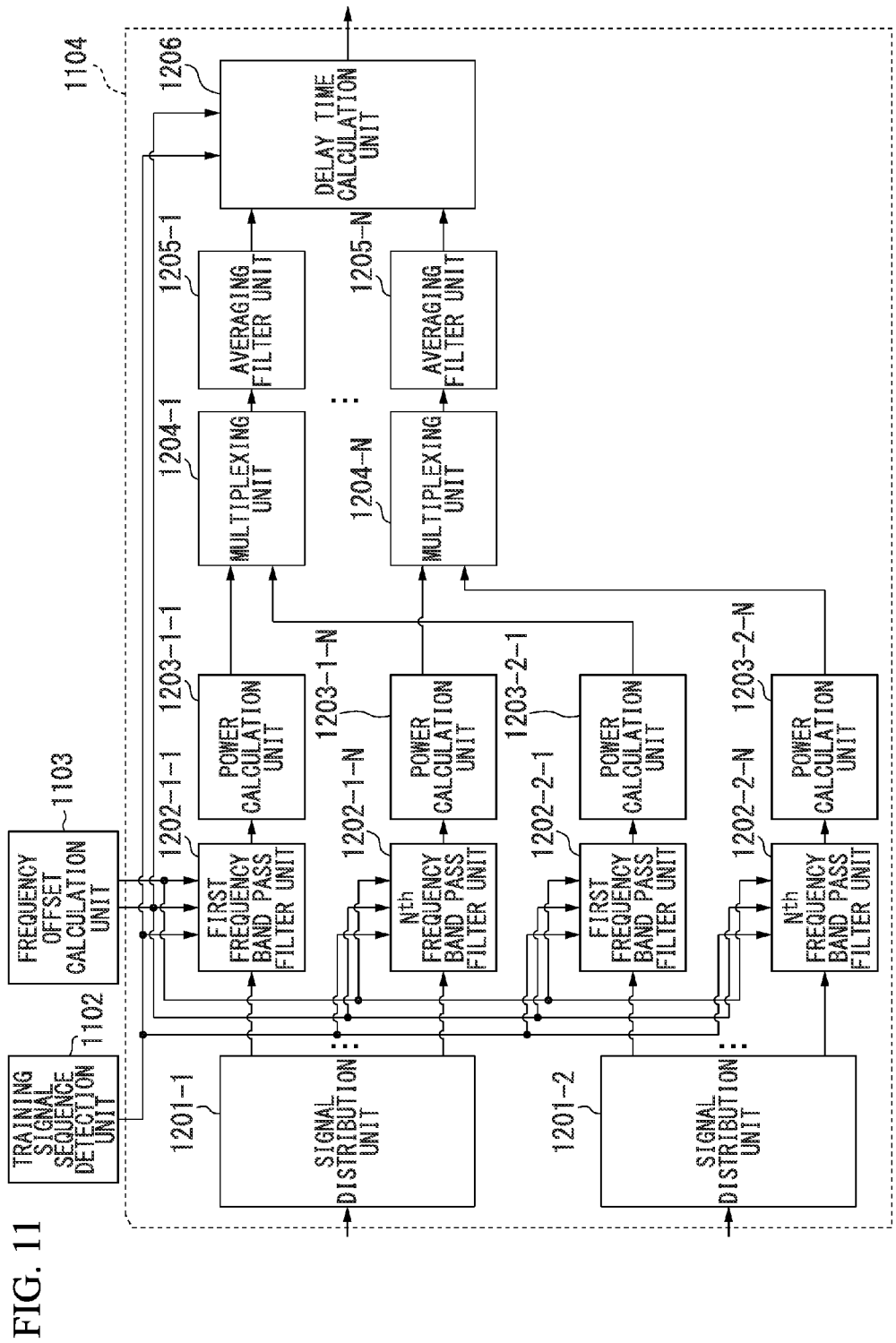
FIG. 11 is a block diagram illustrating an example of a configuration of a delay amount calculation unit 1104 in the first embodiment.

FIG. 11 is a block diagram illustrating an example of a configuration of the delay amount calculation unit 1104 in the present embodiment. In FIG. 11, 1201-1 and 1201-2 indicate signal distribution units, 1202-1-$n$ and 1202-2-$n$ ($1 \leq n \leq N$ and $N \geq 2$) indicate $n^{th}$ frequency band pass filter units, 1203-1-$n$ and 1203-2-$n$ ($1 \leq n \leq N$ and $N \geq 2$) indicate power calculation units, 1204-$n$ ($1 \leq n \leq N$ and $N \geq 2$) indicates a multiplexing unit, 1205-$n$ ($1 \leq n \leq N$ and $N \geq 2$) indicates an averaging filter unit, and 1206 indicates a delay time calculation unit. The delay amount calculation unit 1104 includes two signal distribution units 1201-1 and 1201-2, 2×N frequency band pass filter units 1202-1-1 to 1202-1-N and 1202-2-1 to 1202-2-N, 2×N power calculation units 1203-1-1 to 1203-1-N and 1203-2-1 to 1203-2-N, N multiplexing units 1204-1 to 1204-N, N averaging filter units 1205-1 to 1205-N, and the delay time calculation unit 1206.

The signal distribution unit 1201-1 receives the X polarization output from the chromatic dispersion compensation unit 1004-1 as an input signal, duplicates and branches the input signal into N same signal sequences, and outputs the signal sequences to the $n^{th}$ frequency band pass filter units 1202-1-$n$ ($1 \leq n \leq N$ and $N \geq 2$). The signal distribution unit 1201-2 receives the Y polarization output from the chromatic dispersion compensation unit 1004-2 as an input signal, duplicates and branches the input signal into N same signal sequences, and outputs the signal sequences to the $n^{th}$ frequency band pass filter units 1202-2-$n$ ($1 \leq n \leq N$ and $N \geq 2$).

The $n^{th}$ frequency band pass filter unit 1202-1-$n$ ($1 \leq n \leq N$ and $N \geq 2$) compensates for the frequency offset for the X polarization that is the output signal from the signal distribution unit 1201-1 based on the frequency offset calculated by the frequency offset calculation unit 1103. Further, the $n^{th}$ frequency band pass filter unit 1202-1-$n$ passes the signal through the process of a frequency band pass filter which passes the specific frequency band signal based on the control information on the specific frequency band signal (information indicating the type of the specific frequency band signal) output by the training signal sequence detection unit 1102 or the frequency offset calculation unit 1103. The $n^{th}$ frequency band pass filter unit 1202-1-$n$ outputs the passed signal to the power calculation unit 1203-1-$n$ as the result of the process.

The $n^{th}$ frequency band pass filter unit 1202-2-$n$ ($1 \leq n \leq N$ and $N \geq 2$) compensates for the frequency offset for the Y polarization that is the output signal from the signal distribution unit 1201-2 based on the frequency offset calculated by the frequency offset calculation unit 1103. Further, the $n^{th}$ frequency band pass filter unit 1202-2-$n$ passes the signal through the process of a frequency band pass filter which passes the specific frequency band signal based on the control information on the specific frequency band signal (information indicating the type of the specific frequency band signal) output by the training signal sequence detection unit 1102 or the frequency offset calculation unit 1103. The $n^{th}$ frequency band pass filter unit 1202-2-$n$ outputs the passed signal to the power calculation unit 1203-2-$n$ as the result of the process.

Alternatively, the $n^{th}$ frequency band pass filter units 1202-1-$n$ and 1202-2-$n$ ($1 \leq n \leq N$ and $N \geq 2$) shift the central frequencies of the frequency band pass filters based on the value of the frequency offset calculated by the frequency offset calculation unit 1103 and the type of the specific frequency band signal, pass the X polarization and the Y polarization, and then output the result thereof. It is to be noted that filter units of the $n^{th}$ frequency band pass filter unit 1202-1-$n$ and the $n^{th}$ frequency band pass filter unit 1202-2-$n$ ($1 \leq n \leq N$ and $N \geq 2$) are filter units that pass the same frequency band, and frequency band pass filters are set so as to include part (for example, the frequency band having a bandwidth wider than or equal to a line width of a light source around the peak value of the power of the frequency spectrum of the specific frequency band signal) or all of the specific frequency band signals in the frequency band different for each sequence n.

The power calculation unit 1203-1-$n$ ($1 \leq n \leq N$ and $N \geq 2$) calculates an absolute value of a power value or amplitude for each sample for the sequence of the X polarization output from the $n^{th}$ frequency band pass filter unit 1202-1-$n$, and outputs the result of the calculation to the multiplexing unit 1204-$n$.

The power calculation unit 1203-2-$n$ ($1 \leq n \leq N$ and $N \geq 2$) calculates an absolute value of a power value or amplitude for each sample for the sequence of the Y polarization output from the $n^{th}$ frequency band pass filter unit 1202-2-$n$, and outputs the result of the calculation to the multiplexing unit 1204-$n$.

The multiplexing unit 1204-$n$ ($1 \leq n \leq N$ and $N \geq 2$) combines the signal sequence of the power value of the X polarization output from the power calculation unit 1203-1-$n$ and the signal sequence of the power value of the Y polarization output from the power calculation unit 1203-2-$n$, and outputs the result of the combination. For example, when the X polarization in the $m^{th}$ input of the multiplexing unit 1204-$n$ is $x_n(m)$ and the Y polarization is $y_n(m)$, the output of the multiplexing unit 1204-$n$ is $ax_n(m)+by_n(m)$. Here, a and b are arbitrary real numbers greater than zero, and a and b are changed based on information such as noise or interference so as to change a ratio of multiplexing of the power values of the X polarization and the Y polarization output from the power calculation unit 1203-1-$n$ and the power calculation unit 1203-2-$n$.

For example, when the noise power of the front end unit of the Y polarization at the reception end is four times the noise power of the front end unit of the X polarization at the reception end, a and b are adjusted to a=2 and b=1 so that the noise powers are equalized. Accordingly, the signal sequences can be combined in a state in which the signal power to noise power ratio is maximized. Further, since it is conceivable that a delay difference is generated between the X polarization and the Y polarization under influence of the transmission path, the front end unit, or the like, shifting by q (q is an integer) samples can be performed and then the multiplexing may be performed. In this case, the output of the multiplexing unit 1204-$n$ becomes $ax_n(m)+by_n(m-q)$. As a method for determining q, a timing detection unit or a skew adjustment unit may be further provided in the optical signal reception apparatus, a calculated timing difference may be used as an input value, or q may be adjusted so that values exceeding a threshold value or maximum values in the output values of the power calculation unit 1203-1-$n$ and the power calculation unit 1203-2-$n$ overlap in a certain constant section. It is to be noted that a unit of the number of samples is each signal in the time sequences sampled in the analog-to-digital conversion units 1003-1 to 1003-2.

The N signal sequences multiplexed by the multiplexing units 1204-$n$ ($1 \leq n \leq N$ and $N \geq 2$) are input as an input value to the averaging filter unit 1205-$n$. Each averaging filter unit 1205-$n$ sums Q consecutive signals for each input sequence and performs averaging, as shown in Equation (1) below.

[Equation 1]

$$s'_m(m') = \sum_{m=m'}^{m'+Q-1} s_n(m) \quad (1)$$

Here, $s_n(m)$ indicates an output signal of the $n^{th}$ multiplexing unit 1204-$n$ at a time m, and $s'_n(m')$ indicates an output signal of the averaging filter unit 1205-$n$ ($1 \leq n \leq N$ and $N \geq 2$). By using the averaging filter, it is possible to reduce noise and interference. Further, when Q is set to the same number of signals as the specific frequency band signal sequences (a product of the number of oversampling and the number of signals when the oversampling is performed), a square wave output from the $n^{th}$ multiplexing unit 1204-$n$ ($1 \leq n \leq N$ and $N \geq 2$) can be converted into a triangular wave, and detection of the peak value in the delay time calculation unit 1206 is facilitated.

The delay time calculation unit 1206 detects sample times $T_n$ when maximum power values (peak values) are output, from the sequences output from the N averaging filter units 1205-$n$ ($1 \leq n \leq N$ and $N \geq 2$). The delay time calculation unit 1206 calculates, from the detected sample times $T_n$, a time difference between the peak values or an amount of chromatic dispersion obtained therefrom, based on the control information regarding a type of the specific frequency band signal from the training signal sequence detection unit 1102 or the frequency offset calculation unit 1103, and outputs the result of the calculation.

Here, N indicates the number of peak power values in the frequency spectrum of the specific frequency band signal transmitted by the optical signal transmission apparatus. For example, when peak power values are present at two specific frequency bands ±15 GHz as illustrated in FIG. 3, N=2 can be calculated. However, since it is sufficient for N to be greater than or equal to 2, it is not limited to the above.

When the delay time calculation unit 1206 calculates the chromatic dispersion amount D', the delay time calculation unit 1206 can calculate the chromatic dispersion amount D' as shown in Equation (2) below using a time difference $\tau_{k-h}$ between a time $T_k$ at a peak value of the $k^{th}$ multiplexing unit 1204-$k$ and a time $T_h$ at a peak value of the $h^{th}$ multiplexing unit 1204-$h$.

[Equation 2]

$$D' = \frac{c\tau_{k-h}}{\lambda^2 B_{k-h}} = \frac{c(T_k - T_h)}{\lambda^2 B_{k-h}} \quad (2)$$

In Equation (2), c indicates the speed of light, $\lambda$ indicates a central wavelength of the transmission signal, and $B_{k-h}$ indicates a bandwidth from a central frequency of the $k^{th}$ frequency band pass filter unit 1202-1-$k$ (or 1202-2-$k$) to a central frequency of the $h^{th}$ band pass filter unit 1202-1-$h$ (or 1202-2-$h$). However, it is assumed that the $h^{th}$ frequency band pass filter unit 1202-1-$h$ (or 1202-2-$h$) has a higher frequency band than the $k^{th}$ frequency band pass filter unit 1202-1-$k$ (or 1202-2-$k$).

Further, since $B_{k\text{-}h}$ is the bandwidth from the central frequency of the $k^{th}$ frequency band pass filter unit 1202-1-$k$ (or 1202-2-$k$) to the central frequency of the $h^{th}$ band pass filter unit 1202-1-$h$ (or 1202-2-$h$), $B_{k\text{-}h}$ depends on the type of the specific frequency band signal. Therefore, $B_{k\text{-}h}$ is calculated based on the control information on the type of the specific frequency band signal from the training signal sequence detection unit 1102 or the frequency offset calculation unit 1103.

The delay time calculation unit 1206 can calculate one to a maximum of N(N−1)/2 delay times using the N sequences input from the N averaging filter units 1205-$n$ (1≤$n$≤N and N≥2), and outputs, as an output value, a value selected from among the delay times, a calculated average value of the delay times, or an amount of chromatic dispersion calculated from the value to the dispersion compensation unit 1004-1 and the chromatic dispersion compensation unit 1004-2. It is to be noted that, in practice, the chromatic dispersion amount to be output may be a value that does not include the $\lambda^2$ in Equation (2) (that is, even when not divided by $\lambda^2$). This is because, when the calculation value of the chromatic dispersion is applied to a weight $W(\omega)$ of each frequency $\omega$ used in the chromatic dispersion compensation unit 1004-1 and the chromatic dispersion compensation unit 1004-2, $\lambda^2$ is multiplied as shown in Equation (3) below and thus, $\lambda^2$ is canceled out in Equation (2). That is, in practice, the chromatic dispersion compensation weight can be calculated regardless of $\lambda^2$.

[Equation 3]

$$W(\omega) = \exp\left(-j\frac{\lambda^2}{2\pi c}D'\omega^2\right) \quad (3)$$

In Equation (3), D' indicates the calculated value of the amount of the chromatic dispersion.

In the optical signal reception apparatus of the present embodiment, while the polarization separation unit 1001 divides the received optical signal into two signal sequences of the X polarization and the Y polarization and thus two systems of the optical-to-electrical conversion units 1002-1 to 1002-2, the analog-to-digital conversion units 1003-1 to 1003-2, the chromatic dispersion compensation units 1004-1 to 1004-2, the signal distribution units 1201-1 to 1201-2, the $n^{th}$ frequency band pass filter units 1202-1-$n$ and 1202-2-$n$ (1≤$n$≤N and N≥2), and the power calculation units 1203-1-$n$ and 1203-2-$n$ (1≤$n$≤N and N≥2) are provided in accordance with the number of the divided signal sequences, signal processing may be performed using only either the X polarization or the Y polarization. In this case, the above units may be included for one sequence, and the multiplexing units 1204-$n$ (1≤$n$≤N and N≥2) are unnecessary. Moreover, when the signal distribution unit 1201 distributes the input signal as three or more sequences, the above units are provided so as to correspond to the number of the distributed sequences, and the multiplexing unit 1204-$n$ (1≤$n$≤N and N≥2) multiplexes the sequences.

While the delay amount calculation unit 1104 in the present embodiment includes the averaging filter units 1205-1 to 1205-N after the multiplexing units 1204-1 to 1204-N, the units can be provided in reverse order. In this case, 2×N averaging filter units are provided so as to correspond to the power calculation units 1203-1-1 to 1203-1-N and 1203-2-1 to 1203-2-N, averaging filtering is performed on the outputs of the power calculation units 1203-1-1 to 1203-1-N and 1203-2-1 to 1203-2-N, and then the multiplexing units 1204-1 to 1204-N multiplex the outputs of the 2×N averaging filter units corresponding to the same frequency band (sequence).

It is to be noted that the memory 1101-1, the memory 1101-2, the training signal sequence detection unit 1102, and the frequency offset calculation unit 1103 are not necessarily required. For example, when detection of the training signal sequence and calculation of the frequency offset can be performed using an external function of the chromatic dispersion amount calculation unit 1007, values thereof can be used. When the values are known in advance, the values can also be set manually. When the memory 1101-1, the memory 1101-2, and the training signal sequence detection unit 1102 are not provided, the frequency offset calculation unit 1103 receives the signal sequences of the X polarization and the Y polarization output from the chromatic dispersion compensation unit 1004-1 and the chromatic dispersion compensation unit 1004-2, and calculates the frequency offset.

Further, while in the present embodiment, the type of the specific frequency band signal has been determined at the reception end, information of the specific frequency band signal sequence to be transmitted in advance may be shared between the optical signal transmission apparatus and the optical signal reception apparatus, and the operation may be performed using the information. For example, a signal is transferred on a trial basis between the optical signal transmission apparatus, and the states of each apparatus and the propagation path are recognized in advance, so that an available specific frequency band signal can be recognized in advance. In this case, based on shared selection information of a training signal sequence, the training signal sequence detection unit 1102, the frequency offset calculation unit 1103, and the delay amount calculation unit 1104 operate only portions corresponding to the specific frequency band signal sequence indicated by the selection information that has been acquired in advance, and thus it is possible to simplify the circuit.

Specifically, in the training signal sequence detection unit 1102 (FIG. 9), the band pass filter unit 2101-1-$l$ (1≤$l$≤L and L≥2), the band pass filter unit 2101-2-$l$ (1≤$l$≤L and L≥2), and the signal power calculation unit 2102-$l$ (1≤$l$≤L and L≥2) are corresponding portions. Further, in the frequency offset calculation unit 1103 (FIG. 10), the band pass filter unit 3101-1-$l$ (1≤$l$≤L and L≥2), the band pass filter unit 3101-2-$l$ (1≤$l$≤L and L≥2), and the training signal power calculation unit 3102-$l$ (1≤$l$≤L and L≥2) are corresponding portions. In this case, the training signal switching unit 2103 in the training signal sequence detection unit 1102 and the training signal switching unit 3103 in the frequency offset calculation unit 1103 may not be provided, and thus the circuit can be simplified. Alternatively, the training signal switching unit 2103 in the training signal sequence detection unit 1102 and the training signal switching unit 3103 in the frequency offset calculation unit 1103 may always output only an input of a portion corresponding to the selected training signal sequence, without switching.

Further, a plurality of sets of the band pass filter unit 2101-1-$l$ (1≤$l$≤L and L≥2), the band pass filter unit 2101-2-$l$, and the signal power calculation unit 2102-$l$ in the training signal sequence detection unit 1102 may be a band pass filter and a signal power calculation unit that switch a passing frequency, similarly to the switching of the training signal switching unit 2103. Further, a plurality of sets of the band pass filter unit 3101-1-*l* (1≤*l*≤L and L≥2), the band pass filter unit 3101-2-*l*, and the training signal power calculation unit 3102-*l* in the frequency offset calculation unit 1103 may be a band pass filter and a training signal power calculation unit that switch a passing frequency, similarly to the switching of the training signal switching unit 3103.

Here, a reception operation when the specific frequency band signal sequence illustrated in FIG. 3 is time-division multiplexed with the transmission signal as a training signal sequence will be described by way of example with reference to FIG. 11. It is to be noted that N is assumed to be 2.

Figure 12:
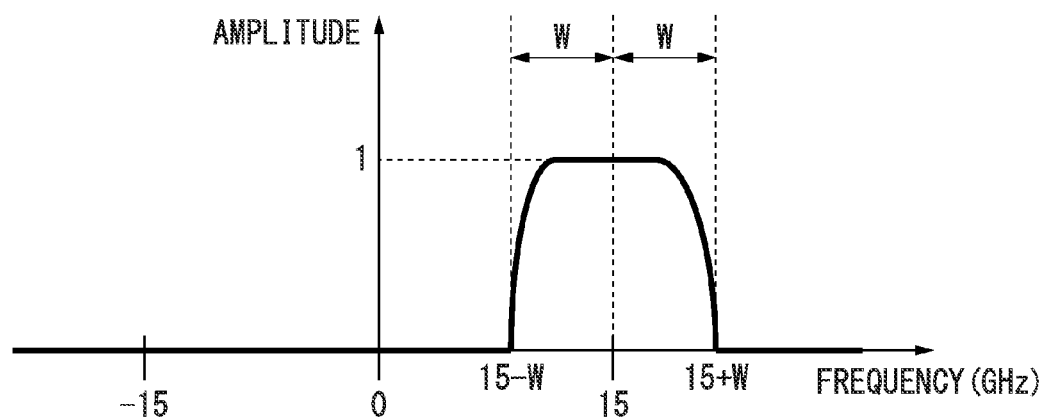
FIG. 12 is a schematic diagram illustrating an example of a band pass filter in a first frequency band pass filter unit of the first embodiment.

In FIG. 11, first, the digital signal received by a receiver of the optical signal reception apparatus is distributed into two sequences in each of the signal distribution units 1201-1 and 1201-2. Next, the first frequency band pass filter units 1202-1-1 and 1202-2-1 perform band limitation to obtain a signal of 15 GHz on the high frequency side in the X polarization and the Y polarization based on the information on the type of specific frequency band signal from the training signal sequence detection unit 1102 or the frequency offset calculation unit 1103, and output results, respectively. FIG. 12 is a schematic diagram illustrating an example of band limitation performed on the input reception signal subjected to the frequency offset compensation by the first frequency band pass filter unit 1202-1-1 in the present embodiment. In FIG. 12, a horizontal axis indicates the frequency, and a vertical axis indicates amplitude. As illustrated in FIG. 12, the first frequency band pass filter unit 1202-1-1 performs the band limitation using a band pass filter with a bandwidth of 2 W in which a passband is from (15−W) GHz to (15+W) GHz on the input reception signal subjected to the frequency offset compensation, and outputs the result. The first frequency band pass filter unit 1202-2-1 also performs the same process on the Y polarization.

Figure 13:
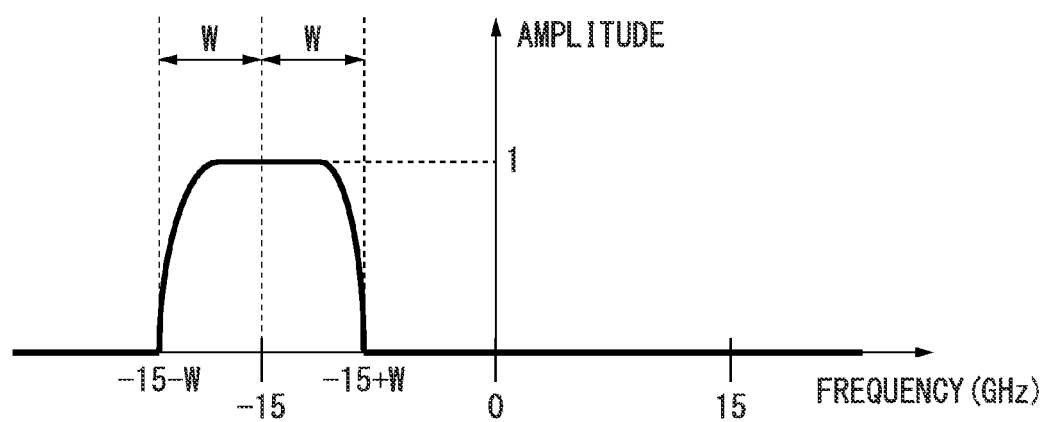
FIG. 13 is a schematic diagram illustrating an example of a band pass filter in a second frequency band pass filter unit of the first embodiment.

Similarly, the second frequency band pass filter units 1202-1-2 and 1202-2-2 perform band limitation to obtain a signal of −15 GHz on the lower frequency side in the X polarization and the Y polarization, and output results, respectively. FIG. 13 is a schematic diagram illustrating an example of band limitation performed on the input reception signal subjected to the frequency offset compensation by the second frequency band pass filter unit 1202-1-2 in the present embodiment. In FIG. 13, a horizontal axis indicates the frequency, and a vertical axis indicates amplitude. As illustrated in FIG. 13, the second frequency band pass filter unit 1202-1-2 performs the band limitation using a band pass filter with a bandwidth of 2 W in which a passband is from (−15−W) GHz to (−15+W) GHz on the input reception signal subjected to the frequency offset compensation, and outputs the result. The second frequency band pass filter unit 1202-2-2 also performs the same process on the Y polarization.

Here, W is an arbitrary value greater than 0. By increasing W, the operation is possible even when the specific frequency reception signal is shifted from the central frequency due to the frequency offset, a phase offset, or the like. Conversely, by decreasing W, components other than a specific frequency band signal, such as a noise or interference component can be reduced, and thus the accuracy of estimation is improved.

The power calculation unit 1203-1-1 calculates an absolute value of the power value or the amplitude per sample for the signal sequence which is the output result of the first frequency band pass filter unit 1202-1-1, and outputs the result of the calculation to the multiplexing unit 1204-1. Similarly, the power calculation unit 1203-2-1 calculates an absolute value of the power value or the amplitude per sample for the signal sequence which is the output result of the first frequency band pass filter unit 1202-2-1, and outputs the result of the calculation to the multiplexing unit 1204-1. Here, when an input signal at an n sample time of the power calculation units 1203-1-1 and 1203-2-1 is denoted as a(n), an output value of the power calculation units 1203-1-1 and 1203-2-1 is $|a(n)|^2$ or $|a(n)|$. Here, $|x|$ indicates an absolute value of a complex number x.

Similarly, the power calculation unit 1203-1-2 calculates a power value for each sample for the signal sequence of the output result of the second frequency band pass filter unit 1202-1-2, and outputs the result of the calculation to the multiplexing unit 1204-2. The power calculation unit 1203-2-2 calculates a power value for each sample for the signal sequence of the output result of the second frequency band pass filter unit 1202-2-2, and outputs the result of the calculation to the multiplexing unit 1204-2.

The multiplexing unit 1204-1 receives the sequences output from the power calculation unit 1203-1-1 and the power calculation unit 1203-2-1, performs multiplexing, and outputs the result. Similarly, the multiplexing unit 1204-2 receives the sequences output from the power calculation unit 1203-1-2 and the power calculation unit 1203-2-2, performs multiplexing, and outputs the result.

The averaging filter unit 1205-1 receives sequences output from the multiplexing unit 1204-1, performs averaging, and outputs the result of the averaging. Similarly, the averaging filter unit 1205-2 receives sequences output from the multiplexing unit 1204-2, performs averaging, and outputs the result of the averaging.

Figure 14:
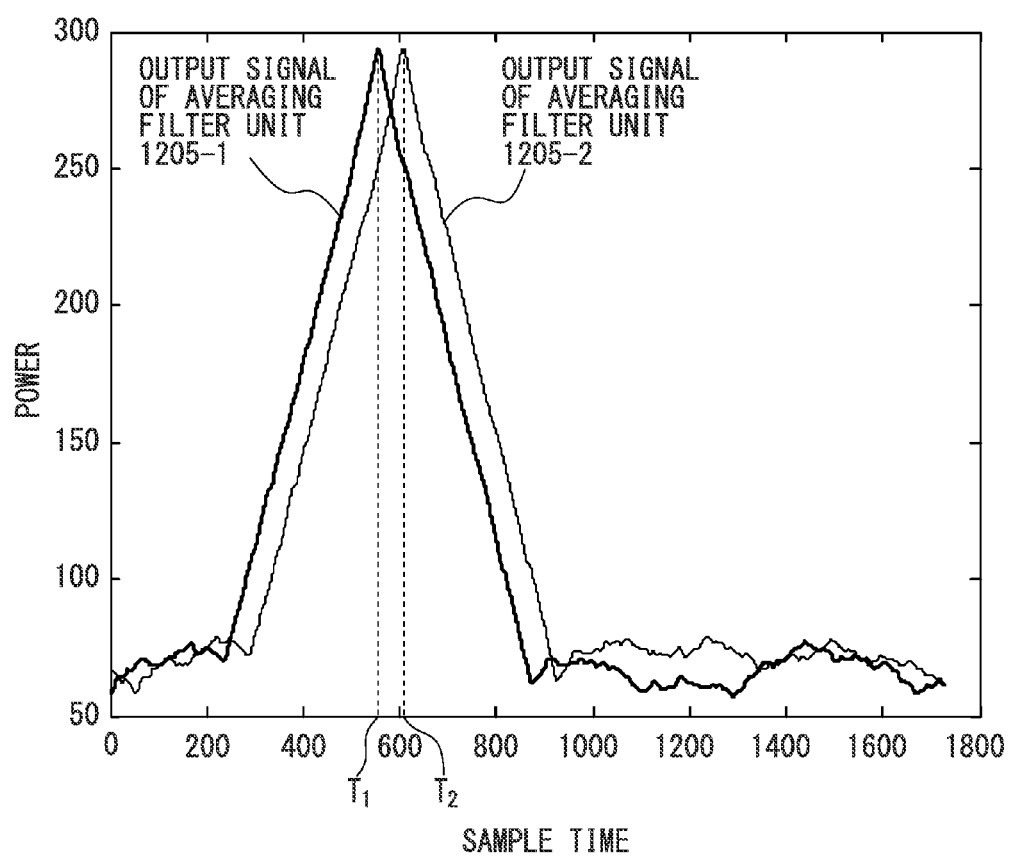
FIG. 14 is a diagram illustrating output results of a first averaging filter unit 1205-1 and a second averaging filter unit 1205-2 in the first embodiment.

FIG. 14 is a diagram illustrating the output results of the first averaging filter unit 1205-1 and the second averaging filter unit 1205-2. In FIG. 14, a horizontal axis indicates a sample time, and a vertical axis indicates power. The delay time calculation unit 1206 receives the sequences output from the first averaging filter unit 1205-1 and the second averaging filter unit 1205-2, detects a sample time $T_1$ and a sample time $T_2$ when the power reaches a maximum value in the sequences as illustrated in FIG. 14, and calculates a time difference $\tau_{2-1}=T_2-T_1$. Further, a chromatic dispersion amount D' can be calculated using the time difference $\tau_{2-1}$ based on Equation (2).

By performing the above process, the amount of chromatic dispersion can be calculated using the specific frequency band signal sequence. It is to be noted that when the specific frequency band signal sequence illustrated in FIG. 4 is time-division multiplexed with the transmission signal as the training signal sequence serving as a training signal sequence, the first frequency band pass filter units 1202-1-1 and 1202-2-1 perform the band limitation using a band pass filter with a bandwidth of 2 W in which a passband is from (7.5−W) GHz to (7.5+W) GHz on the input reception signal subjected to the frequency offset compensation to obtain a signal at 7.5 GHz on the high frequency side in the X polarization and the Y polarization, based on the information on the type of the specific frequency band signal from the training signal sequence detection unit 1102 or the frequency offset calculation unit 1103, and output results, respectively. Similarly, the second frequency band pass filter units 1202-1-2 and 1202-2-2 perform the band limitation using a band pass filter with a bandwidth of 2 W in which a passband is from (−7.5−W) GHz to (−7.5+W) GHz on the input reception signal subjected to the frequency offset compensation to obtain a signal at −7.5 GHz on the low frequency side in the X polarization and the Y polarization, and output results.

When the specific frequency band signal sequence illustrated in FIG. 4 is used as the training signal sequence, the time difference $\tau_{2-1}=T_2-T_1$ calculated by the delay time calculation unit 1206 and the bandwidth between the two peak values of the frequency spectrum are halved, as compared to the case in which the specific frequency band signal sequence illustrated in FIG. 3 is used as the training signal. However, since the bandwidth $B_{2-1}$ in Equation (2) is also halved, the finally estimated chromatic dispersion amount D' becomes equal.

It is to be noted that by inserting the second specific frequency band signal sequence in which the power is concentrated only at a specific frequency different from that of the specific frequency band signal sequence, as training signal sequences, before and after the specific frequency band signal sequence, interference by transmission signal sequences before and after the training signal with the frequency band used by the specific frequency band signal sequence is prevented, and thus peak power values clearly appear as illustrated in FIG. 14, and the sample time $T_1$ and the sample time $T_2$ when the power reaches maximum values can be accurately detected. Further, by setting the frequency band pass filter so that the second specific frequency band signal sequence is removed in the first frequency band pass filter units 1202-1-1 and 1202-2-1 and the second frequency band pass filter units 1202-1-2 and 1202-2-2, when the delay time difference is calculated, the signals of the second specific frequency band signal sequences immediately before and immediately after the specific frequency band signal sequence are removed, and thus only the first specific frequency band signal sequence can be extracted. Accordingly, the estimation accuracy of the chromatic dispersion is improved. It is to be noted that the same effects can be obtained even when a no-signal section, that is, a section in which no signal is transmitted is set in place of the second specific frequency band signal sequences.

General band pass filters such as a rectangular filter, a Nyquist filter, a Hanning window, a Kaiser window, or a Hamming window can be used as the band pass filters of the $n^{th}$ frequency band pass filter units 1202-1-$n$ and 1202-2-$n$ (n=1, 2, . . . , N) shown above. Further, when the frequency band pass filter is used, the signal sequence is converted into a signal in a frequency domain using a fast Fourier transform (FFT) or discrete Fourier transform (DFT), filtering is performed using a band pass filter in the frequency domain, and then the signal sequence is converted into a time signal using inverse fast Fourier transform (IFFT) or inverse discrete Fourier transform (IDFT), and thus it is possible to increase the speed of computation.

It is to be noted that for the band pass filter units 2101-1-1 to 2101-2-L and the band pass filter units 3101-1-1 to 3101-2-L, filtering using the general band pass filter is performed or the signal sequence is converted into a signal in a frequency domain using FFT or DFT, filtering is performed using a band pass filter in the frequency domain, and the filtered signal sequence is converted into a time signal using IFFT or IDFT, similarly to the band pass filters of the $n^{th}$ frequency band pass filter units 1202-1-$n$ and 1202-2-$n$. Thus, it is possible to increase the speed of computation.

It is to be noted that when the $n^{th}$ frequency band pass filter units 1202-1-$n$ and 1202-2-$n$ of the delay amount calculation unit 1104 and the band pass filter units 3101-1-1 to 3101-L and 3101-2-1 to 3101-2-L of the frequency offset calculation unit 1103 are realized using the FFT and the IFFT, the frequency offset calculation unit 1103 and the delay amount calculation unit 1104 may calculate the frequency offset amount and the delay amount using only the signals buffered in the memories 1101-1 and 1101-2 in a section of the insertion period Ns of the training signal sequence, as described above. Therefore, taking advantage of the fact that the FFT and the IFFT can be realized in a butterfly operation, the process is repeatedly performed using FFT or IFFT having a smaller FFT size than an FFT size (or the number of points) originally applied, and thus it is possible to reduce a scale of a circuit while allowing a delay. Further, a circuit that performs FFT and a circuit that performs IFFT may be shared in the $n^{th}$ frequency band pass filter units 1202-1-$n$ and 1202-2-$n$ (n=1, 2, . . . , N) of the delay amount calculation unit 1104 and/or the band pass filter units 3101-1-1 to 3101-L and 3101-2-1 to 3101-2-L of the frequency offset calculation unit 1103, so that it is possible to reduce the circuit scale.

Hereinafter, an example of a configuration of the chromatic dispersion amount calculation unit 1007, the frequency offset calculation unit 1103, and the delay amount calculation unit 1104 when FFT and IFFT are used to perform filtering in the frequency domain will be described by way of example.

Figure 15:
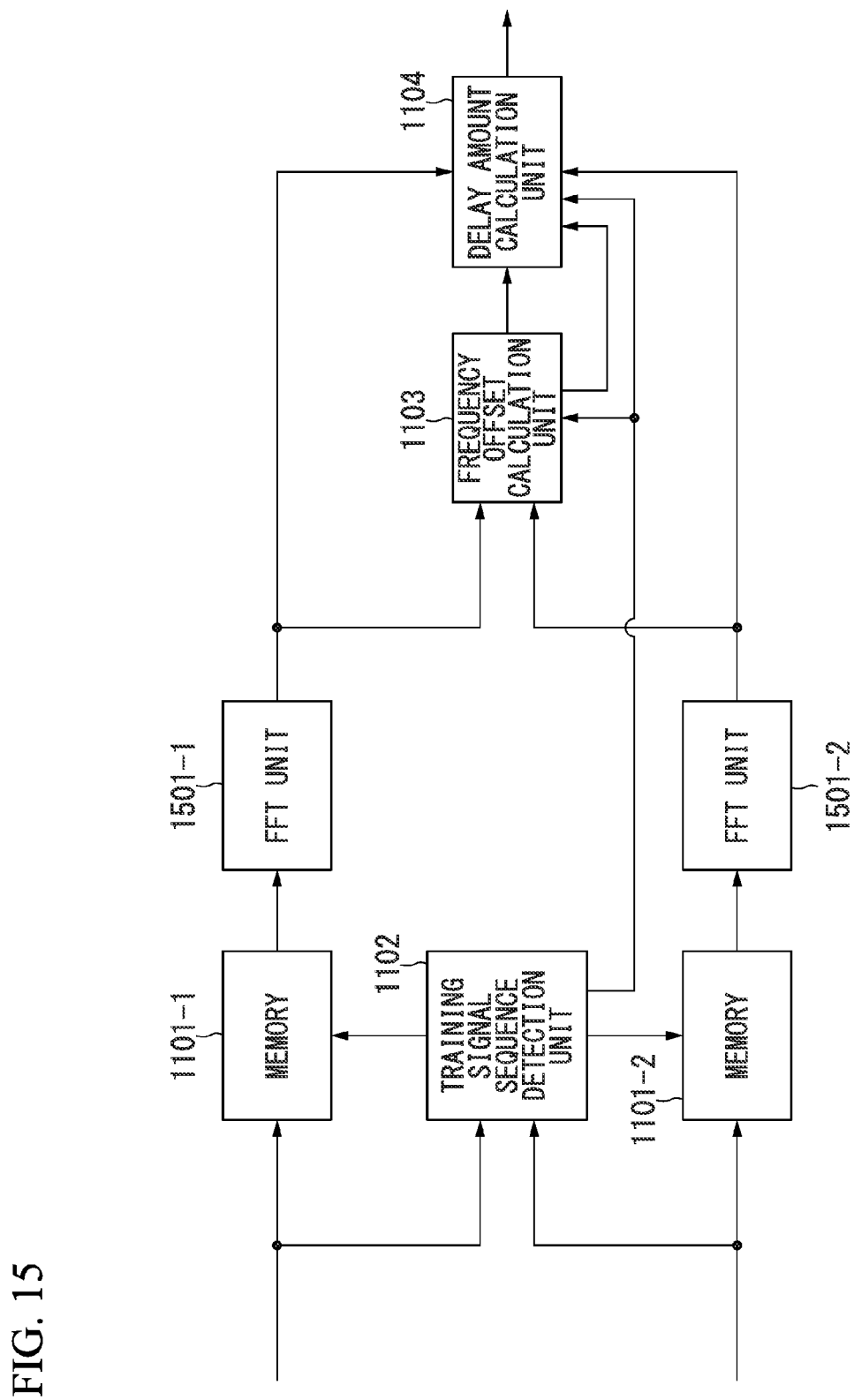
FIG. 15 is a block diagram illustrating an example of a configuration of a chromatic dispersion amount calculation unit 1007 when FFT and IFFT are used to perform filtering in a frequency domain.

FIG. 15 is a block diagram illustrating an example of a configuration of the chromatic dispersion amount calculation unit 1007 when FFT and IFFT are used to perform filtering in the frequency domain. The chromatic dispersion amount calculation unit 1007 illustrated in FIG. 15 includes memories 1101-1 and 1101-2, a training signal sequence detection unit 1102, a frequency offset calculation unit 1103, a delay amount calculation unit 1104, and FFT units 1501-1 and 1501-2. The configuration of the chromatic dispersion amount calculation unit 1007 illustrated in FIG. 15 is different from the configuration of the chromatic dispersion amount calculation unit 1007 illustrated in FIG. 8 in that the FFT units 1501-1 and 1501-2 are added. It is to be noted that a description of the common units is omitted.

The FFT unit 1501-1 receives a signal sequence stored in the memory 1101-1, performs FFT, and converts the signal sequence into a signal in a frequency domain. The FFT unit 1501-1 outputs the signal in the frequency domain obtained through the conversion to the frequency offset calculation unit 1103 and the delay amount calculation unit 1104. Similarly to the FFT unit 1501-1, the FFT unit 1501-2 receives a signal sequence stored in the memory 1101-2, performs FFT, and converts the signal sequence into a signal in the frequency domain, similarly to the FFT unit 1501-1. The FFT unit 1501-2 outputs the signal in the frequency domain obtained through the conversion to the frequency offset calculation unit 1103 and the delay amount calculation unit 1104. That is, in the chromatic dispersion amount calculation unit 1007 illustrated in FIG. 15, the frequency offset calculation unit 1103 and the delay amount calculation unit 1104 operate using the signals in the frequency domain as the inputs.

Figure 16:
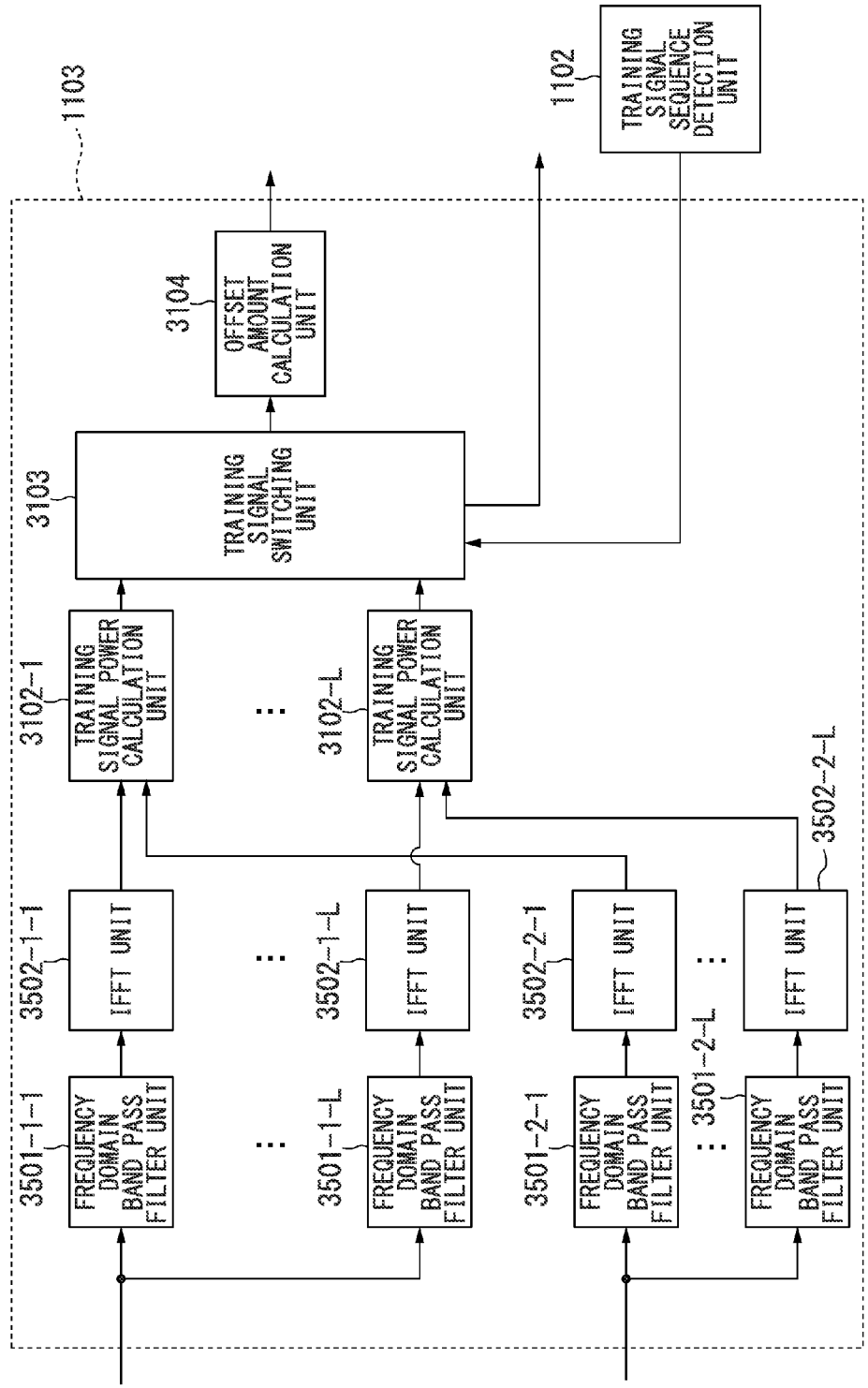
FIG. 16 is a block diagram illustrating an example of a configuration of the frequency offset calculation unit 1103 when FFT and IFFT are used to perform filtering in a frequency domain.

FIG. 16 is a block diagram illustrating an example of a configuration of the frequency offset calculation unit 1103 when FFT and IFFT are used to perform filtering in the frequency domain. The frequency offset calculation unit 1103 illustrated in FIG. 16 includes 2×L frequency domain band pass filter units 3501-1-1 to 3501-1-L and 3501-2-1 to 3501-2-L, 2×L IFFT units 3502-1-1 to 3502-1-L and 3502-2-1 to 3502-2-L, L training signal power calculation units 3102-1 to 3102-L, a training signal switching unit 3103, and an offset amount calculation unit 3104.

The configuration of the frequency offset calculation unit 1103 illustrated in FIG. 16 is different from the configuration of the frequency offset calculation unit 1103 illustrated in FIG. 10 in that the frequency domain band pass filter units 3501-1-1 to 3501-1-L and the IFFT units 3502-1-1 to 3502-1-L are provided instead of the band pass filter units 3101-1-1 to 3101-1-L, and the frequency domain band pass filter units 3501-2-1 to 3501-2-L and the IFFT units 3502-2-1 to 3502-2-L are provided instead of the band pass filter units 3101-2-1 to 3101-2-L. It is to be noted that a description of common units is omitted.

The frequency domain band pass filter unit 3501-1-$l$ ($1 \leq l \leq L$ and $L \geq 2$) performs, in the frequency domain, a process of a band pass filter (BPF) that passes a component in a predetermined frequency band on the frequency component of the sequence of the X polarization output from the FFT unit 1501-1 (FIG. 15). The frequency domain band pass filter unit 3501-2-$l$ ($1 \leq l \leq L$ and $L \geq 2$) performs, in the frequency domain, a process of a band pass filter (BPF) that passes a component in a predetermined frequency band on the frequency component of the sequence of the Y-polarization output from the FFT unit 1501-2 (FIG. 15). The frequency domain band pass filter units 3501-1-$l$ and 3501-2-$l$ ($1 \leq l \leq L$ and $L \geq 2$) as L types of BPFs are filters that pass the signal components of different training signal sequences and are provided corresponding to the type of all the training signal sequences used at the transmitter end, similarly to the band pass filter units 3101-1-$l$ and 3101-2-$l$ ($1 \leq l \leq L$ and $L \geq 2$).

Each IFFT unit 3502-1-$l$ ($1 \leq l \leq L$ and $L \geq 2$) performs IFFT on the frequency component after BPF of the sequence of the X polarization output from the corresponding frequency domain band pass filter unit 3501-1-$l$, and converts the frequency component into a signal in the time domain. Each IFFT unit 3502-1-$l$ outputs the signal in the time domain obtained through the conversion to the training signal power calculation unit 3102-$l$. Each IFFT unit 3502-2-$l$ ($1 \leq l \leq L$ and $L \geq 2$) performs IFFT on the frequency component after BPF of the sequence of Y-polarization output from the corresponding frequency domain band pass filter unit 3501-2-$l$, and converts the frequency component into a signal in the time domain. Each IFFT unit 3502-1-2 outputs the signal in the time domain obtained through the conversion to the training signal power calculation unit 3102-$l$.

Figure 17:
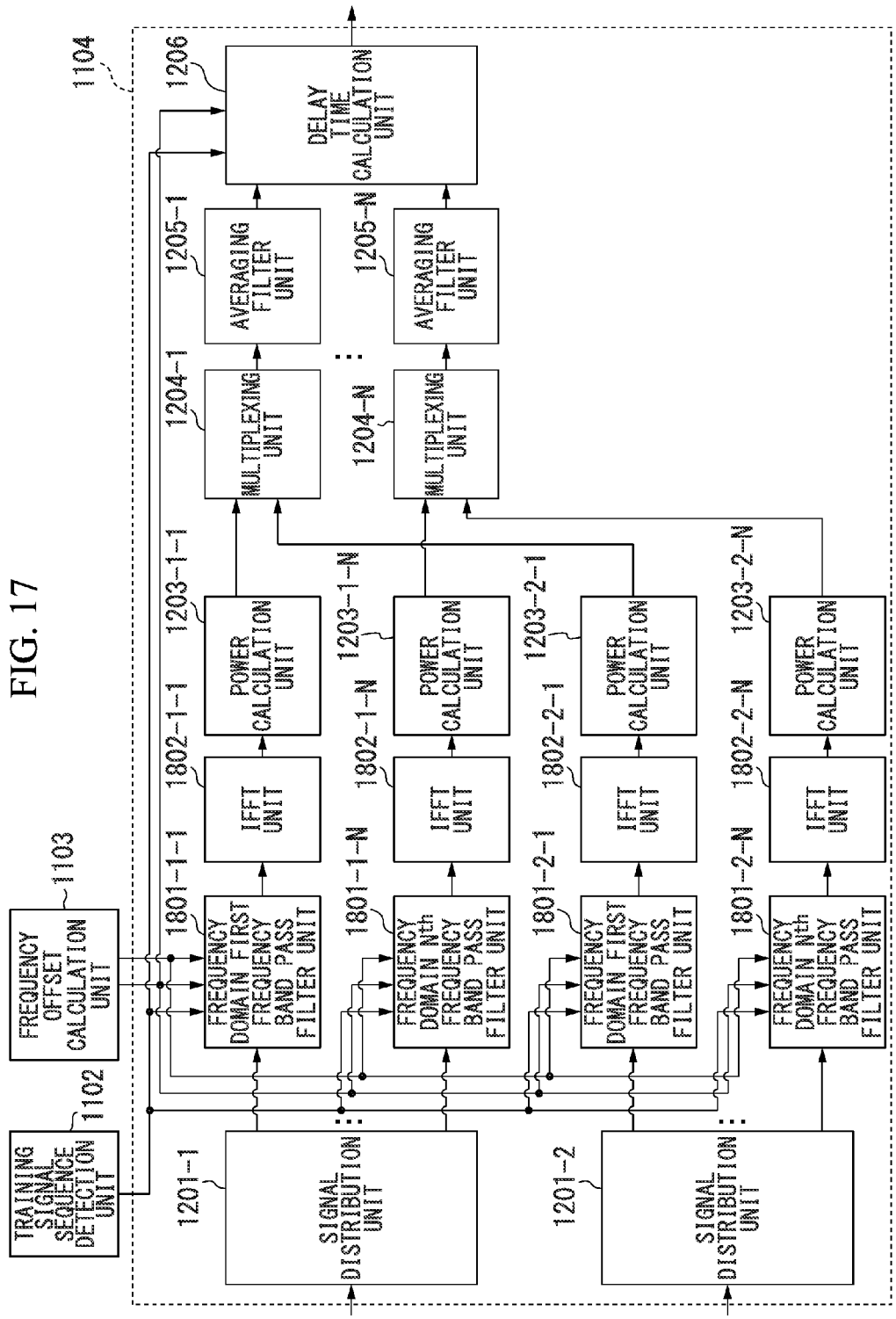
FIG. 17 is a block diagram illustrating an example of a configuration of the delay amount calculation unit 1104 when FFT and IFFT are used to perform filtering in a frequency domain.

FIG. 17 is a block diagram illustrating an example of a configuration of the delay amount calculation unit 1104 when FFT and IFFT are used to perform filtering in the frequency domain. The delay amount calculation unit 1104 illustrated in FIG. 17 includes two signal distribution units 1201-1 and 1201-2, 2×N frequency domain $n^{th}$ frequency band pass filter units 1801-1-1 to 1801-1-N and 1801-2-1 to 1801-2-N, 2×N IFFT units 1802-1-1 to 1802-1-N and 1802-2-1 to 1802-2-N, 2×N power calculation units 1203-1-1 to 1203-1-N and 1203-2-1 to 1203-2-N, N multiplexing units 1204-1 to 1204-N, N averaging filter units 1205-1 to 1205-N, and a delay time calculation unit 1206.

The configuration of the delay amount calculation unit 1104 illustrated in FIG. 17 is different from the configuration of the delay amount calculation unit 1104 illustrated in FIG. 11 in that the frequency domain $n^{th}$ frequency band pass filter units 1801-1-1 to 1801-1-N and the IFFT units 1802-1-1 to 1802-1-N are provided in place of the $n^{th}$ frequency band pass filter unit 1202-1-$n$ ($1 \leq n \leq N$ and $N \geq 2$), and the frequency domain $n^{th}$ frequency band pass filter units 1801-2-1 to 1801-2-N and the IFFT units 1802-2-1 to 1802-2-N are provided in place of the $n^{th}$ frequency band pass filter unit 1202-2-$n$ ($1 \leq n \leq N$ and $N \geq 2$). It is to be noted that a description of common units is omitted.

The frequency domain $n^{th}$ frequency band pass filter unit 1801-1-$n$ ($1 \leq n \leq N$ and $N \geq 2$) compensates for the frequency offset for the signal sequence of the X polarization that is the output signal from the signal distribution unit 1201-1, which is the frequency component after the FFT in the FFT unit 1501-1 (FIG. 15), based on the frequency offset calculated by the frequency offset calculation unit 1103. Further, the frequency domain $n^{th}$ frequency band pass filter unit 1801-1-$n$ passes the signal through the process of the frequency band pass filter which passes the specific frequency band signal, based on control information on the specific frequency band signal (information indicating the type of specific frequency band signal) output by the training signal sequence detection unit 1102 or the frequency offset calculation unit 1103. The frequency domain $n^{th}$ frequency band pass filter unit 1801-1-$n$ outputs the passed signal to the IFFT unit 1802-1-$n$ as the result of the process.

The frequency domain $n^{th}$ frequency band pass filter unit 1801-2-$n$ ($1 \leq n \leq N$ and $N \geq 2$) compensates for the frequency offset for the signal sequence of the Y-polarization that is the output signal from the signal distribution unit 1201-2, which is the frequency component after the FFT in the FFT unit 1501-2 (FIG. 15), based on the frequency offset calculated by the frequency offset calculation unit 1103. Further, the frequency domain $n^{th}$ frequency band pass filter unit 1801-2-$n$ passes the signal through the process of the frequency band pass filter which passes the specific frequency band signal, based on control information on the specific frequency band signal (information indicating the type of specific frequency band signal) output by the training signal sequence detection unit 1102 or the frequency offset calculation unit 1103. The frequency domain $n^{th}$ frequency band pass filter unit 1801-2-$n$ outputs the passed signal to the IFFT unit 1802-2-$n$ as the result of the process.

Alternatively, the frequency domain $n^{th}$ frequency band pass filter units 1801-1-$n$ and 1801-2-$n$ ($1 \leq n \leq N$ and $N \geq 2$) shift the central frequency of the frequency domain band pass filter (that is, shifts an FFT index) in the frequency domain based on the value of the frequency offset calculated by the frequency offset calculation unit 1103 and the type of the specific frequency band signal, pass the X polarization and the Y polarization, and then output the result thereof. It is to be noted that filter units of the frequency domain $n^{th}$ frequency band pass filter unit 1801-1-$n$ and the frequency domain $n^{th}$ frequency band pass filter unit 1801-2-$n$ ($1 \leq n \leq N$ and $N \geq 2$) are filter units that pass the same frequency band, and the frequency domain band pass filters are set so as to include part (for example, a frequency band having a bandwidth greater than or equal to a line width of a light source around a peak value of power of a frequency spectrum of the specific frequency band signal) or all of the specific frequency band signals in the frequency band different for each sequence n.

The IFFT unit 1802-1-$n$ ($1 \leq n \leq N$ and $N \geq 2$) performs IFFT on the frequency component of the sequence of the X polarization output from the corresponding frequency domain $n^{th}$ frequency band pass filter unit 1801-1-$n$ to convert the frequency component into a signal in the time domain. The IFFT unit 1802-1-$n$ outputs the signal in a time domain obtained through the conversion to the power calculation unit 1203-1-$n$. The IFFT unit 1802-2-$n$ ($1 \leq n \leq N$ and $N \geq 2$) performs IFFT on the frequency component of the sequence of the Y-polarization output from the corresponding frequency domain $n^{th}$ frequency band pass filter unit 1801-2-$n$ to convert the frequency component into a signal in the time domain. The IFFT unit 1802-2-$n$ outputs the signal in the time domain obtained through the conversion to the power calculation unit 1203-2-$n$.

It is to be noted that the FFT units 1501-1 and 1501-2 of the chromatic dispersion amount calculation unit 1007 may share a circuit (computation unit) that performs the FFT computation. This makes it possible to reduce the circuit scale of the chromatic dispersion amount calculation unit 1007. Further, a circuit (computation unit) that performs the IFFT operation of part or all of the IFFT units 3502-1-$l$ and 3502-2-$l$ ($1 \leq l \leq L$ and $L \geq 2$) of the frequency offset calculation unit 1103 and the IFFT units 1802-1-$n$ and 1802-2-$n$ ($1 \leq n \leq N$ and $N \geq 2$) of the delay amount calculation unit 1104 may also be shared. This makes it possible to reduce the circuit scale of the frequency offset calculation unit 1103 and the delay amount calculation unit 1104. Further, the FFT units 1501-1 and 1501-2, the IFFT units 3502-1-$l$ and 3502-2-$l$ ($1 \leq l \leq L$ and $L \geq 2$) and the IFFT units 1802-1-$n$ and 1802-2-$n$ ($1 \leq n \leq N$ and $N \geq 2$) may share a circuit that performs a common operation in the computation of FFT and IFFT.

Further, with the configuration as illustrated in FIG. 15, the training signal sequence detection unit 1102 detects the insertion position of the training signal sequence and outputs a control signal to the memory 1101-1 and the memory 1101-2 so as to buffer only the signal sequence in a section in which the training signal sequence is included and sections before and after that section based on the detected insertion position of the training signal sequence. Therefore, it is only necessary for the FFT units 1501-1 and 1501-2, the frequency offset calculation unit 1103, and the delay amount calculation unit 1104 to perform the FFT using only the signals buffered in the memories 1101-1 and 1101-2 in a section of the insertion period Ns of the training signal sequence and calculate the frequency offset amount and the delay amount. In this case, if the insertion period Ns of the training is longer than the buffered signal sequence, an operating clock of a synchronization circuit that realizes the functions of the FFT units 1501-1 and 1501-2, the frequency offset calculation unit 1103, and the delay amount calculation unit 1104 can be at a lower frequency than that of an operating clock of a synchronization circuit that realizes the function of the training signal sequence detection unit 1102, resulting in lower power consumption and a reduced circuit scale. Further, when it is only necessary for the frequency offset amount and the delay amount to be estimated for every U ($U \geq 2$; U is an integer) frames, it is possible to decrease the operating clock as compared to a case in which estimation is performed for each frame, and to achieve lower power consumption and the reduced circuit scale.

The averaging filter unit 1205-$n$ shown above sums the Q consecutive signal sequences and outputs a resultant sequence and thus an estimation error caused by noise or an interference component can be reduced, but other methods may be used. For example, by calculating an expected value using power and time near a maximum value, it is possible to increase the accuracy.

While a sample time at which power is a maximum value has been used in the delay time calculation unit 1206 shown above, an arbitrary threshold may be set, and a time at which the power exceeds the threshold, a time at which the power is below the threshold after exceeding the threshold, or both of the times may be used. In this case, there is a method for comparing a time position in which the power reaches X % of the peak between a high frequency component and a low frequency component, and measuring a time difference therebetween.

Further, signals other than the alternating signal, interference components, and noise components are included in the signal components passing through the band pass filter. This is because the data signal also includes components in the passband of the band pass filter, and because optical noise also includes components in the passband of the band pass filter. Therefore, a noise floor in a region in which no peak value is generated (a data signal region) and the peak may be detected, and a time position rising to and a time position falling to X % of the peak relative to the noise floor may be compared between the high frequency component and the low frequency component to detect the delay time.

Further, the delay time calculation unit 1206 may calculate a plurality of delay times using a plurality of reception signals including the training signal sequence at each period Ns and output an average value thereof as an output value, so that it is possible to reduce the noise and interference components to improve the accuracy. Further, it is possible to calculate the delay time by calculating the expected value of a time at which the peak value appears using two values of the power and the time.

Further, since reception power varies depending on the frequency components due to amplitude variation of the frequency in the propagation path, including polarization mode dispersion (PMD), two or more specific frequency band signal sequences may be prepared, for example, a reception signal power to noise power ratio (SNR), signal power, or the like may be measured, and the sequence in which the SNR, the signal power, or the like are the greatest may be transmitted as the training signal sequence. Further, since the amplitude of the high frequency component is attenuated and group delay is generated depending on frequency characteristics of an analog front end unit, such as the power amplifier, the ADC, or the DAC, a specific frequency band signal sequence in a frequency band not influenced by their frequency characteristics may be used as the training signal sequence, so that it is possible to suppress degradation of the calculation accuracy in the chromatic dispersion amount calculation unit 1007.

Further, when the transmission path is designed, a specific frequency band signal sequence not influenced by the interference may be transmitted as the training signal sequence in consideration of the influence of interference waves from adjacent channels.

In the above description, one specific frequency band signal sequence has been selected from among the plurality of specific frequency band signal sequences and transmitted as the training signal sequence, but the number of selected specific frequency band signal sequences does not necessarily have to be one. The transmission end may select two or more sequences and transmit it as the training signal sequence and the reception end may perform the reception signal processing on the sequences to calculate the chromatic dispersion and determine any one of calculation results, an average value of all estimation results, or the like as a calculation value of the chromatic dispersion.

Further, since the amount of the delay time of the delay amount calculation unit 1104 increases proportional to the bandwidth between the peaks of the spectra of the specific frequency band signals, the chromatic dispersion amount calculation unit 1007 may change the specific frequency band signal sequences in accordance with the amount of chromatic dispersion. For example, when it is necessary to calculate a large amount of the chromatic dispersion in long distance transmission, the specific frequency band signal sequences in which the bandwidth between the peaks of the spectra is small is used so that the amount of time delay is reduced. Accordingly, a region in which the training signal sequence is included in the signal sequence on the reception end is reduced, and thus it is possible to reduce the amount of computation of the chromatic dispersion amount calculation unit 1007. On the other hand, in the case of relatively short distance transmission or when the amount of chromatic dispersion calculated by using a dispersion shifted fiber (DSF) is relatively small, the specific frequency band signal sequence in which the bandwidth between the peaks of the spectra is large is used, and thus it is possible to improve the estimation accuracy.

It is to be noted that in the above description, the $n^{th}$ frequency band pass filter units 1202-1-$n$ and 1202-2-$n$ ($1 \leq n \leq N$ and $N \geq 2$) or the frequency domain $n^{th}$ frequency band pass filter units 1801-1-$n$ and 1801-2-$n$ have performed the filter process to pass the specific frequency band signal based on the control information on the specific frequency band signal (information indicating the type of the specific frequency band signal) output from the training signal sequence detection unit 1102 or the frequency offset calculation unit 1103. However, it is possible to estimate the noise power by passing frequency band components other than the frequency band component of the specific frequency band signal, which is the training signal sequence, through the filter process. This is because there is no signal component other than the specific frequency component at which the power is concentrated in a training signal sequence section and there is only noise in the training signal sequence section as a characteristic of the specific frequency band signal, which is the training signal sequence.

When the noise power is estimated, in the case of the configuration of FIG. 11, the $n^{th}$ frequency band pass filter units 1202-1-$n$ and 1202-2-$n$ perform a filter process to pass the noise component, that is, to remove the specific frequency band signal, the power calculation units 1203-1-$n$ and 1203-2-$n$ calculate power of each sample for the output of the $n^{th}$ frequency band pass filter units 1202-1-$n$ and 1202-2-$n$, the multiplexing unit 1204-$n$ combines polarizations using the outputs of the power calculation units 1203-1-$n$ and 1203-2-$n$, and the delay time calculation unit 1206 calculates the noise power using the power value for each of samples after the combining of the polarizations that are calculated by the multiplexing unit 1204-$n$. It is to be noted that when the noise power is calculated, the averaging filter unit 1205-$n$ may not be provided. Further, since the delay time calculation unit 1206 has a function of calculating the amount of chromatic dispersion and a function of calculating the noise power, the delay time calculation unit 1206 can be referred to as a transmission path information calculation unit.

Similarly, in the case of the configuration of FIG. 17, the $n^{th}$ frequency band pass filter units 1801-1-$n$ and 1801-2-$n$ perform a filter process to pass the noise component, that is, to remove the specific frequency band signal, the IFFT units 1802-1-$n$ and 1802-2-$n$ perform IFFT on the outputs of the $n^{th}$ frequency band pass filter units 1801-1-$n$ and 1801-2-$n$, the power calculation units 1203-1-$n$ and 1203-2-$n$ calculate the power for each sample of the outputs of the IFFT units 1802-1-$n$ and 1802-2-$n$, the multiplexing unit 1204-$n$ combines polarizations using the outputs of the power calculation units 1203-1-$n$ and 1203-2-$n$, and the delay time calculation unit 1206 calculates the noise power using the power value for each of samples after the combining of the polarizations that are calculated by the multiplexing unit 1204-$n$. It is to be noted that when the noise power is calculated, the averaging filter unit 1205-$n$ may not be provided.

Hereinafter, the SN ratio calculation apparatus that calculates the noise power and the signal power, and calculates a signal to noise power ratio (SN ratio) using the calculated noise power and the calculated signal power will be described. It is to be noted that hereinafter, a description will be given on the assumption that the SN ratio calculation apparatus is provided outside the optical signal reception apparatus, but a configuration in which the SN ratio calculation apparatus is provided inside the optical signal reception apparatus may be adopted.

The SN ratio calculation apparatus 4 to be described below calculates an SN ratio of an optical signal in a coherent communication system based on the electrical signals output from the memories 1101-1 and 1101-2. This SN ratio is a value regarding the transmission data.

It is to be noted that when the SN ratio calculation apparatus 4 outputs the SN ratio, the SN ratio calculation apparatus 4 may transfer the SN ratio as any one of an electrical signal or an optical signal.

Figure 20:
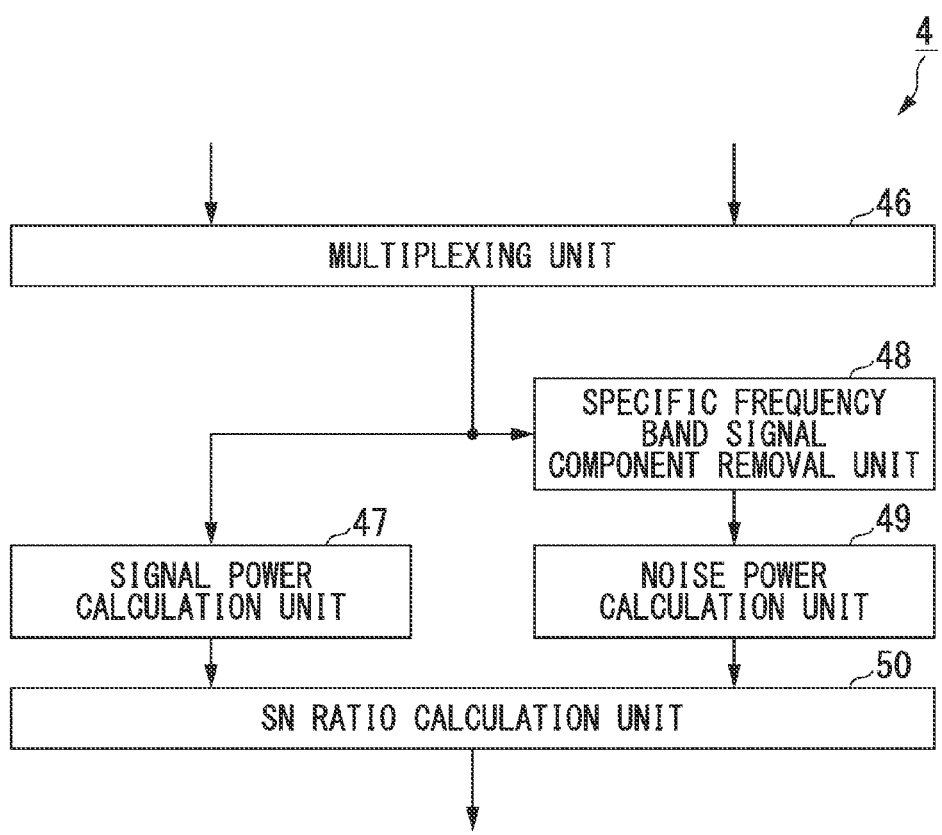
FIG. 20 is a block diagram illustrating an example of a configuration of an SN ratio calculation apparatus 4 in the first embodiment.

FIG. 20 is a block diagram illustrating an example of a configuration of the SN ratio calculation apparatus 4 in the present embodiment. The SN ratio calculation apparatus 4 includes a multiplexing unit 46, a signal power calculation unit 47, a specific frequency band signal component removal unit 48, a noise power calculation unit 49, and an SN ratio calculation unit 50. These units correspond to the units in FIG. 11, as follows. That is, the multiplexing unit 46 corresponds to the multiplexing unit 1204-$n$, the signal power calculation unit 47 or the noise power calculation unit 49 corresponds to the power calculation units 1203-1-$n$ and 1203-2-$n$, the specific frequency band signal component removal unit 48 corresponds to the $n^{th}$ frequency band pass filter units 1202-1-$n$ and 1202-2-$n$, and the SN ratio calculation unit 50 corresponds to the delay time calculation unit 1206. It is to be noted that FIG. 11 differs from FIG. 20 in terms of positions of the multiplexing unit 46 and the multiplexing unit 1204-$n$; however, when noise power is calculated, the power is calculated unlike the case in which the delay time is calculated, and thus the position in which the multiplexing unit is arranged may be either the frequency domain before the IFFT computation or the time domain after the IFFT computation, and performing a filter process and a power calculation process after combining can reduce the circuit scale. Hereinafter, a description in the case of the configuration of FIG. 20 will be given.

The signal from the FFT unit 1501-1 and the signal from the FFT unit 1501-2 are input to the multiplexing unit 46. The signals in the frequency domain input to the multiplexing unit 46 do not include the transmission data sequence because digital signals corresponding to the specific frequency band signal sequences (training signal sequences) are extracted in the memories 1101-1 and 1101-2 or the time domain window units 1105-1 and 1105-2. That is, frequency components of the specific frequency band signal sequences and frequency components of the noise are included in the input signals in the frequency domain. The multiplexing unit 46 multiplexes the signal in the frequency domain sequentially output from the FFT unit 1501-1 with the signal in the frequency domain sequentially output from the FFT unit 1501-2. The multiplexing unit 46 outputs a signal obtained through multiplexing to the signal power calculation unit 47 and the specific frequency band signal component removal unit 48. It is to be noted that when the FFT units 1501-1 and 1501-2 are not provided as in the configurations of FIG. 8 and FIG. 18, the above-described configuration can be realized by providing FFT circuits for outputs from the memories 1101-1 and 1101-2 and inputting outputs thereof to the multiplexing unit 46. As a multiplexing method in the SN ratio calculation apparatus, phases of the frequency components may be matched and the signals may be summed, or powers of the frequency components may be calculated and the signals may be summed.

The signal power calculation unit 47 calculates signal power that is power of the specific frequency band signal sequence based on the signal output from the multiplexing unit 46. The signal power calculation unit 47 outputs a power value of the calculated signal power to the SN ratio calculation unit 50.

The specific frequency band signal component removal unit 48 removes a component of the specific frequency band signal sequence from the signal output from the multiplexing unit 46, and outputs a signal from which the component of the specific frequency band signal sequence has been removed to the noise power calculation unit 49. In the specific frequency band signal component removal unit 48, the component of the specific frequency band signal sequence can be removed using, for example, a band pass filter since a frequency at which the power of the specific frequency band signal sequence is concentrated is known. It is to be noted that signal processing in the specific frequency band signal component removal unit 48 may be performed in the frequency domain or may be performed in the time domain. The noise power calculation unit 49 calculates noise power, which is power of the noise, based on the signal output from the specific frequency band signal component removal unit 48. The noise power calculation unit 49 outputs a power value of the calculated noise power to the SN ratio calculation unit 50. It is to be noted that the specific frequency band signal component removal unit 48 can also correct the frequency offset based on the calculation value of the frequency offset from the frequency offset calculation unit 1103.

The SN ratio calculation unit 50 calculates an SN ratio as a ratio of the power of the transmission data sequence to the noise power based on the noise power calculated by the noise power calculation unit 49 and the signal power calculated by the signal power calculation unit 47. The SN ratio calculation unit 50 outputs an SN ratio signal indicating the calculated SN ratio.

The calculation of the SN ratio in the SN ratio calculation unit 50 is performed by calculating an SN ratio of the specific frequency band signal sequence and then calculating an SN ratio of the transmission data sequence through conversion. As a method for the conversion, for example, a power ratio per unit time of the specific frequency band signal sequence and the transmission data sequence is set as a conversion coefficient, and the SN ratio of the specific frequency band signal sequence is multiplied by the conversion coefficient to calculate the SN ratio of the transmission data sequence. The conversion coefficient is obtained in advance, for example, by comparing powers when the transmission data sequence and the specific frequency band signal sequence are time-division multiplexed. Alternatively, the conversion coefficient may be derived by a simulation based on a ratio of the length of the transmission data sequence and the length of the specific frequency band signal sequence. Alternatively, an accurate SN ratio measured using, for example, a spectrum analyzer may be compared with an SN ratio calculated by the SN ratio calculation apparatus 4, and calibration for the SN ratio calculated by the SN ratio calculation apparatus 4 may be performed to determine the conversion coefficient.

Further, the SN ratio calculation unit 50 may calculate the SN ratio using power of the signals input from the chromatic dispersion compensation units 1004-1 and 1004-2 (hereinafter referred to as a first digital signal sequence and a second digital signal sequence) rather than the power of the specific frequency band signal sequence. Alternatively, the SN ratio calculation unit 50 may extract digital signals including a component of the transmission data sequence from the first digital signal sequence and the second digital signal sequence based on the section specified by the training signal sequence detection unit 1102, calculate the power of the transmission data sequence from the extracted digital signals, and calculate the SN ratio using the power of the transmission data sequence in place of the power of the specific frequency band signal sequence. In this case, since the power other than the power of the specific frequency band signal sequence is used, it is possible to improve the accuracy as compared to a case in which the power of the first digital signal sequence and the second digital signal sequence is used.

Further, the power of the first digital signal sequence and the second digital signal sequence can also be obtained by using the power of the optical signal incident on the optical signal reception apparatus or the power of the electrical signal subjected to optical/electrical conversion. With respect to a power ratio of the transmission data sequence and the specific frequency band signal sequence in the optical signal received by the optical signal reception apparatus, the power of the transmission data sequence occupies most of the power of the received optical signal or electrical signal, and thus, for example, the transmission data sequence may be considered as an optical signal incident on the optical-to-electrical conversion units 1002-1 and 1002-2. Signal power can be obtained by subtracting the noise power calculated in the noise power calculation unit 49 from the obtained optical signal power.

As described above, the signal in which the component of the transmission data sequence has been removed from the first digital signal sequence and the signal in which the component of the transmission data sequence has been removed from the second digital signal sequence are combined by the multiplexing unit 46, and the multiplexed signal is input to the signal power calculation unit 47 and the specific frequency band signal component removal unit 48.

The signal power calculation unit 47 determines whether the power of the frequency component is K times or higher the average power for each frequency component of the frequency spectrum input from the multiplexing unit 46. The signal power calculation unit 47 calculates the average value of the power of the frequency component having power that is K times or higher the average power. The signal power calculation unit 47 outputs the calculated average value of the power to the SN ratio calculation unit 50 as the signal power.

The noise power calculation unit 49 determines whether the power of the frequency component is K times or higher the average power for each frequency component of the frequency spectrum input from the specific frequency band signal component removal unit 48. The noise power calculation unit 49 calculates the average value of the power of the frequency component having power lower than K times the average power. The noise power calculation unit 49 outputs the calculated average value of the power to the SN ratio calculation unit 50 as the noise power. It is to be noted that noise power calculation unit 49 may calculate the average value of the power of the frequency component from the signal input from the specific frequency band signal component removal unit 48 without performing the above determination.

Using the above-described configuration and process, even when optical transmission based on the polarization-division multiplexing is performed or when a frequency band to be used for measurement of the noise power is unable to be secured through high-density frequency-division multiplexing, the SN ratio calculation apparatus 4 in the present embodiment can stably calculate and measure the SN ratio from the digital signal sequence including the components of the frequency band signal sequence. Further, in the specific frequency band signal sequence (training signal sequence) used in the present embodiment, the interference with the transmission data sequence is maintained to be low, and thus it is possible to stably calculate the SN ratio even when optical transmission based on the polarization-division multiplexing is performed or when the transmission data sequence occupies a broad band due to high-density frequency-division multiplexing, high-speed modulation or the like.

Further, the present embodiment describes the configuration in which when the signal power calculation unit 47 and the noise power calculation unit 49 determine the component of the specific frequency band signal sequence, the determination is made based on the power that is K times the average power. However, the present embodiment is not limited thereto, and the components of the specific frequency band signal sequence may be determined based on previously determined threshold power. Further, when the signal power calculation unit 47 calculates the power of the specific frequency band signal sequence, the noise power calculated in the noise power calculation unit 49 may be subtracted.

Further, the calculation of the noise power may be performed for a frequency band (for example, a band of 12.5 GHz, including 0 GHz) near an intermediate frequency of the frequency at which the power of the specific frequency band signal sequence is concentrated. As the band of 12.5 GHz, for example, a band from −6.75 GHz to 6.75 GHz is selected. This is intended to obtain an optical SN ratio (Optical Signal to Noise Ratio: OSNR). The OSNR is often used to indicate a state of a signal in optical communication, and its definition is a ratio of the noise power and the signal power in the band of 12.5 GHz. It is to be noted that the OSNR is calculated using Equation (4) below.

OSNR=(total signal power)/(noise power in 12.5 GHz band) (4)

Further, the present embodiment describes the configuration in which the signal power calculation unit 47 and the noise power calculation unit 49 calculate the average values of the powers in the band of a processing target and determine the calculated average values as the signal power and the noise power. However, the present embodiment is not limited thereto, and the signal power and the noise power per sample may be obtained and the SN ratio per sample may be calculated. In this case, the OSNR may be calculated by increasing or decreasing the SN ratio per sample to correspond to 12.5 GHz in accordance with interval between the samples. For example, when the interval between the samples corresponds to 10 MHz, the SN ratio per sample is increased by 1250 times to be converted into a value corresponding to 12.5 GHz.

Further, the present embodiment describes the configuration in which the noise power calculation unit 49 calculates the noise power based on the noise component in the section in which the specific frequency band signal sequence is included. However, when the dispersion in the optical transmission path is large, a speed at which the signal propagates in the optical transmission path varies depending on the frequency. Therefore, in the digital signal sequence, there is a difference between the section in which the component of the specific frequency band signal sequence is included and the section in which the noise component to be used for calculation of the SN ratio is included. For example, as described above, when the outputs of the analog-to-digital conversion units 1003-1 and 1003-2 are used as the inputs of the chromatic dispersion amount calculation unit 1007 (the first digital signal sequence and the second digital signal sequence), the section used to calculate the noise power may be determined based on the frequency at which the power of the specific frequency band signal sequence is concentrated. Specifically, the section in which the noise power is calculated is determined as illustrated in FIG. 21.

Figure 21:
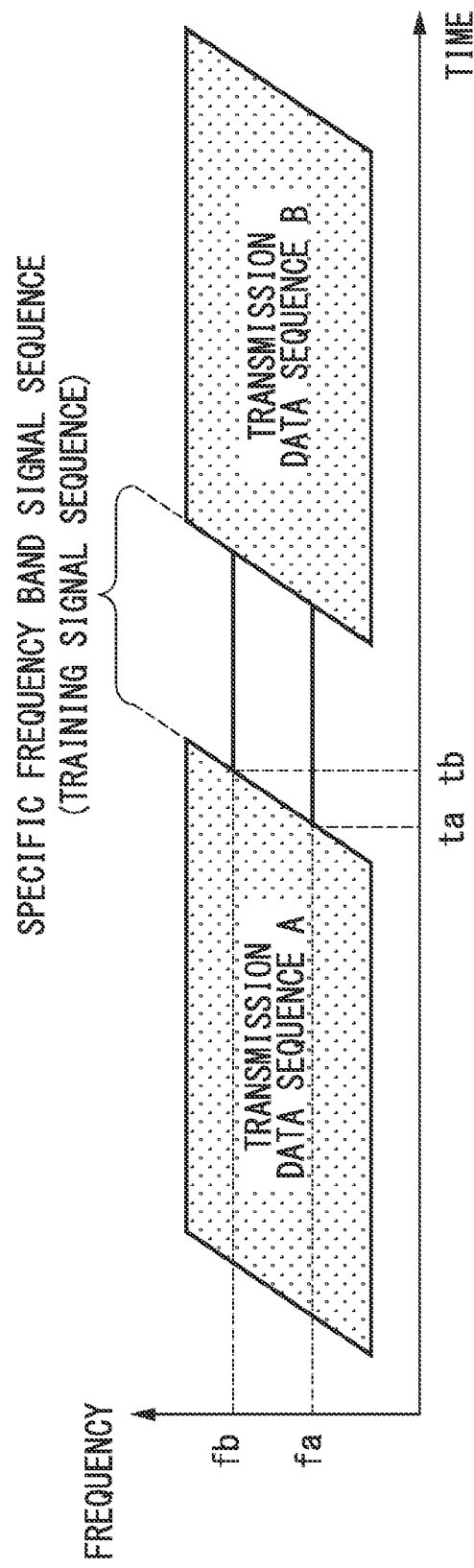
FIG. 21 is a diagram illustrating an overview of determination of a section used for calculation of noise power in the first embodiment.

FIG. 21 is a diagram illustrating an overview of determination of the section used for calculation of the noise power in the present embodiment. In FIG. 21, a horizontal axis indicates time, and a vertical axis indicates a frequency. In an example illustrated in FIG. 21, power of the specific frequency band signal sequence is concentrated at frequencies fa and fb. A dispersion value at the frequency fa is denoted as Da, and a dispersion value at the frequency fb is denoted as Db. A section in which only the specific frequency band signal sequence is included varies depending on the frequency due to the influence of the dispersion. A time ta at which a component of the specific frequency band signal sequence appears at the frequency fa is different from a time tb at which the component of the specific frequency band signal sequence appears at the frequency fb. However, using the time ta and the time tb, a start time of the section in which the transmission data sequence is not included at an intermediate frequency between the frequency fa and the frequency fb can be obtained as ((ta+tb)/2). Further, dispersion at the intermediate frequency can also be obtained as ((Da+Db)/2). The noise power is measured in a section having the same length as that of the specific frequency band signal sequence using the time ((ta+tb)/2) as the start time, and thus the noise power can be acquired without including components of transmission data sequence A and transmission data sequence B. Further, the noise power at frequencies other than the frequencies fa and fb can be acquired by using the time ta, the time tb, the distribution Da, and the distribution Db, in place of the intermediate frequency ((fa+fb)/2).

Further, it is possible to compensate for the dispersion of the received optical signal by using the information of the time ta and the time tb. The time difference of the optical signal for each frequency is eliminated by performing the compensation of the dispersion, and thus it is possible to extract the specific frequency band signal sequence in the entire band without the need for separation for each frequency.

In this case, the training signal sequence detection unit 1102 identifies a section for each frequency at which the power of the specific frequency band signal sequence is concentrated, and identifies a section for the frequency band for measuring the noise power which is used when the SN ratio is calculated. Further, the memories 1101-1 and 1101-2 or the time domain window units 1105-1 and 1105-2 individually extract a section corresponding to each frequency of the specific frequency band signal sequence and a section for the noise. Accordingly, even when the dispersion is large, the noise power can be accurately acquired without including the component of the transmission data sequence, and thus it is possible to improve the accuracy of the SN ratio.

Figure 22:
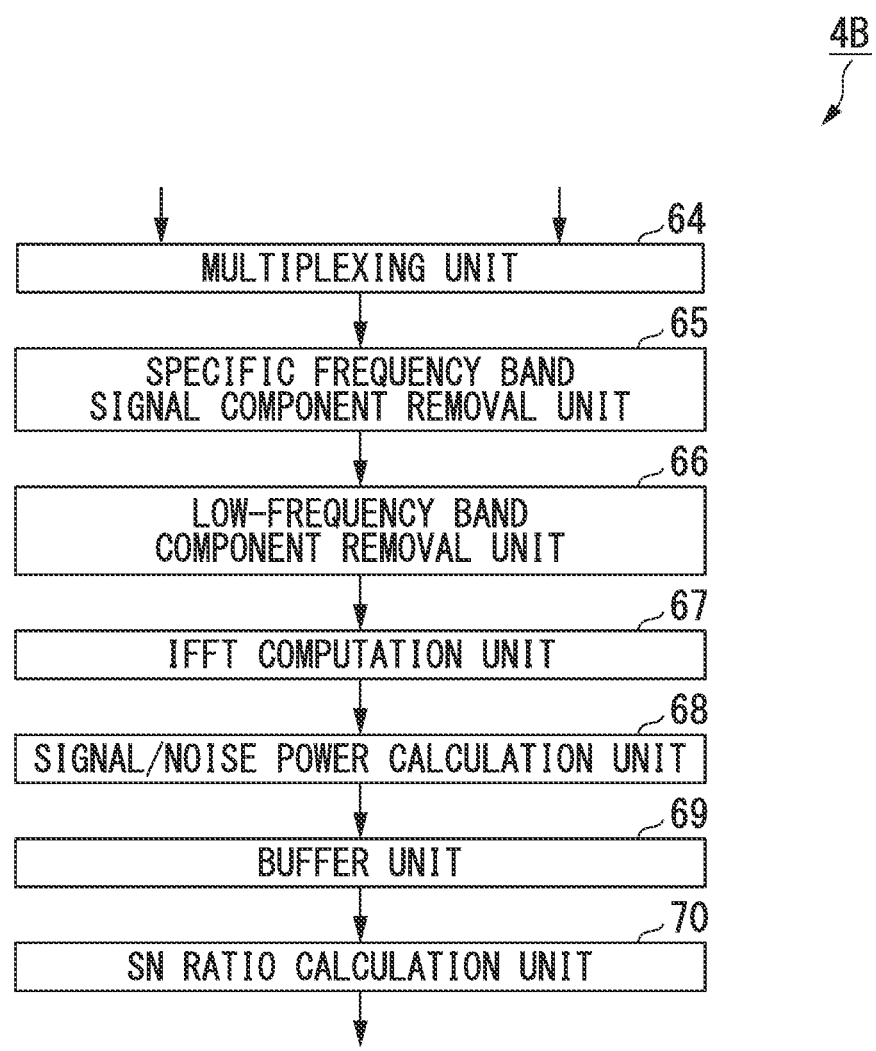
FIG. 22 is a block diagram illustrating an example of a configuration of an SN ratio calculation apparatus 4B in the first embodiment.

FIG. 22 is a block diagram illustrating another example of the configuration of the SN ratio calculation apparatus. As illustrated in FIG. 22, an SN ratio calculation apparatus 4B includes a multiplexing unit 64, a specific frequency band signal component removal unit 65, a low-frequency band component removal unit 66, an IFFT computation unit 67, a signal/noise power calculation unit 68, a buffer unit 69, and an SN ratio calculation unit 70. These units correspond to the units in FIG. 17, as follows. That is, the multiplexing unit 64 corresponds to the multiplexing unit 1204-$n$, the specific frequency band signal component removal unit 65 and the low-frequency band signal component removal unit 66 correspond to the frequency domain $n^{th}$ frequency band filter units 1801-1-$n$ and 1801-2-$n$, the IFFT computation unit 67 corresponds to the IFFT units 1802-1-$n$ and 1802-2-$n$, the signal/noise power calculation unit 68 corresponds to the power calculation unit 1203-1-$n$ and 1203-2-$n$, and the SN ratio calculation unit 70 corresponds to the delay time calculation unit 1206. It is to be noted that FIG. 17 differs from FIG. 22 in terms of positions of the multiplexing unit 64 and the multiplexing unit 1204-$n$, but the position at which the multiplexing unit is disposed may be either the frequency domain before IFFT computation or the time domain after the IFFT computation because the power is calculated when the signal power or the noise power is calculated, unlike the case in which the delay time is calculated. Performing a filter process and a power calculation process after multiplexing can reduce the circuit scale. Hereinafter, a case of the configuration illustrated in FIG. 22 will be described.

The multiplexing unit 64 combines the signals in the frequency domain input from the memories 1101-1 and 1101-2 or the respective time domain window units 1105-1 and 1105-2, and outputs a signal in the frequency domain obtained through the combination to the specific frequency band signal component removal unit 65. When the signal sequence has been extracted from the training signal sequence in the memories 1101-1 and 1101-2 or the time domain window units 1105-1 and 1105-2, the component of the transmission data sequence is not included in the signal in the frequency domain combined by the multiplexing unit 64 and the signal in the frequency domain output from the multiplexing unit 64, and components of the training signal sequence and the noise are included. Further, when the signal sequence has been extracted from the transmission data sequence in the memories 1101-1 and 1101-2 or the time domain window units 1105-1 and 1105-2, the component of the training signal sequence is not included in the signal in the frequency domain combined by the multiplexing unit 64 and the signal in the frequency domain output from the multiplexing unit 64, and components of the transmission data sequence and the noise are included. It is to be noted that as a multiplexing method in the SN ratio calculation apparatus, phases of the frequency components may be matched and the signals may be summed, or powers of the frequency components may be calculated and the signals may be summed.

The specific frequency band signal component removal unit 65 removes the frequency components of the specific frequency band signal sequence from the signal in the frequency domain input from the multiplexing unit 64, and outputs a resultant signal to the low-frequency band component removal unit 66. When the signal sequence is extracted from the training signal sequence in the memories 1101-1 and 1101-2 or the time domain window units 1105-1 and 1105-2, the signal in the frequency domain output from the specific frequency band signal component removal unit 65 becomes a signal including the noise components. In contrast, when the signal sequence is extracted from the transmission data sequence in the memories 1101-1 and 1101-2 or the time domain window units 1105-1 and 1105-2, the signal in the frequency domain output from the specific frequency band signal component removal unit 65 becomes a signal including the component of the transmission data sequence and the noise component.

Signal processing in the specific frequency band signal component removal unit 65 is performed in the frequency domain. The frequency component removed in the specific frequency band signal component removal unit 65 is a component of the frequency at which the power of the specific frequency band signal sequence is concentrated. Since the frequency at which the power of the specific frequency band signal sequence is concentrated is known, the specific frequency band signal component removal unit 65 may be configured by a band pass filter to remove the component of the frequency at which the power is concentrated. Further, the specific frequency band signal component removal unit 65 may be configured by a low-pass filter to extract the components in the low-frequency band that does not include the component of the frequency at which the power is concentrated.

The low-frequency band component removal unit 66 removes the frequency components near direct current from the signal in the frequency domain input from the specific frequency band signal component removal unit 65 and outputs a resultant signal to the IFFT computation unit 67. A frequency range of the components to be removed by the low-frequency band component removal unit 66 is a range from direct current (0 Hz) to a predetermined frequency that is determined in advance. For example, the predetermined frequency is determined based on, for example, frequency components included in the transmission data sequence.

Here, removal of the frequency components near the direct current is directed to remove direct current components that are generated in the transmission signal due to temporal fluctuation of a bias for driving a modulator in the optical signal transmission apparatus. This is because, when noise power is measured, power of the frequency component near the direct current may be calculated as a higher power than its actual power, and accuracy of the calculated SN ratio is degraded.

Figure 23:
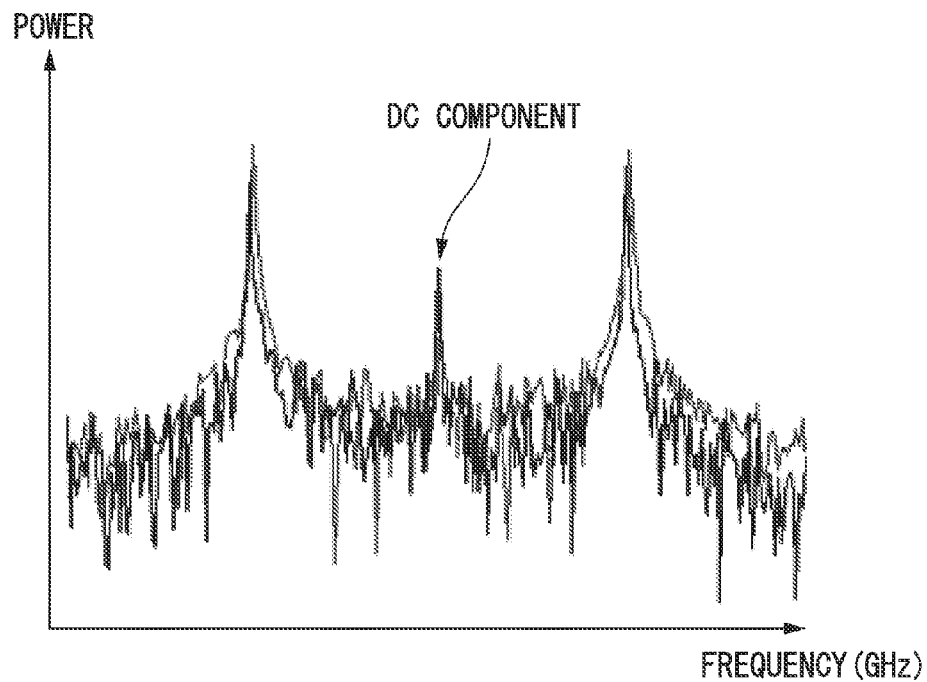
FIG. 23 is a diagram illustrating a spectrum of a specific frequency band signal sequence after transmission measured in an experiment.
Figure 24:
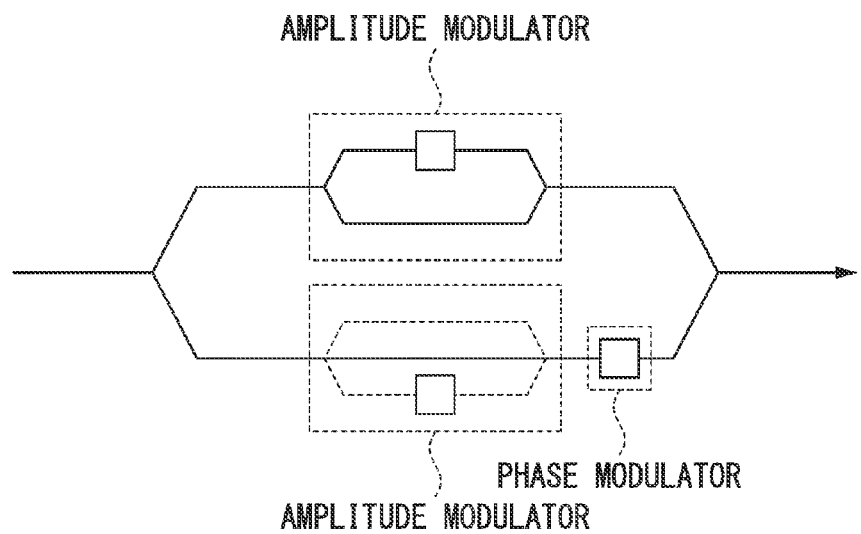
FIG. 24 is a diagram illustrating a configuration of a Mach-Zehnder optical modulator.

FIG. 23 is a diagram illustrating a spectrum of a specific frequency band signal sequence after transmission, which is measured in an experiment. In FIG. 23, a horizontal axis indicates a frequency and a vertical axis indicates power. As illustrated in FIG. 23, it can be observed that power of the direct current component appears at a frequency corresponding to a carrier frequency. An example of a modulator for use in optical communication includes a Mach-Zehnder optical modulator. FIG. 24 is a diagram illustrating a configuration of a Mach-Zehnder optical modulator. As illustrated in FIG. 24, the Mach-Zehnder optical modulator includes two amplitude modulators and one phase modulator, and performs single-sideband modulation.

The single-sideband modulation is also known as single-sideband modulation, and is a scheme of combining two amplitude modulation components having a phase difference of 90° to thereby perform modulation in a half band as compared to double-sideband modulation. In FIG. 24, amplitude modulation signals are output from the two amplitude modulators. One of the two amplitude modulation signals is modulated by the phase modulator to have a 90° phase difference from the other amplitude modulation signal. In order to cancel the direct current component, it is necessary for the biases in the two amplitude modulators to be appropriately controlled. However, since the biases that drive the modulators fluctuate due to a temperature change, it is difficult to perfectly remove the direct current component. Further, since lasers at the transmission end and the reception end have a line width, a frequency thereof is a frequency band corresponding to the line width, rather than the direct current.

A method for removing the low frequency components near the direct current includes a method using a band stop filter or a band pass filter. When the band stop filter is used, a filter having frequency characteristics for suppressing the low frequency components near the direct current for the signal in the frequency domain input to the low-frequency band component removal unit 66 is applied to the low-frequency band component removal unit 66. When the band pass filter is used, a filter having frequency characteristics that do not include a component of the specific frequency band signal sequence and a component of the low frequency components near the direct current for the signal in the frequency domain input to the low-frequency band component removal unit 66 is applied. When the band pass filter is used, the specific frequency band signal component removal unit 65 and the low-frequency band component removal unit 66 can be configure as a single circuit. The low-frequency band component removal unit 66 performs signal processing in the frequency domain, similarly to the specific frequency band signal component removal unit 65. It is to be noted that the above description describes the configuration in which the specific frequency band signal component removal unit 65 and the low-frequency band component removal unit 66 include separate filter circuits, but the two removal units may be formed as a single removal unit to perform a filter process. Further, the specific frequency band signal component removal unit 65 and the low-frequency band component removal unit 66 can also correct the frequency offset based on the calculation value of the frequency offset from the frequency offset calculation unit 1103.

The description of the configuration of the SN ratio calculation apparatus 4B will be continued with reference to FIG. 22.

The IFFT computation unit 67 performs an IFFT on the signal in the frequency domain input from the low-frequency band component removal unit 66 to convert the signal into a signal in the time domain. The IFFT computation unit 67 outputs the signal in the time domain obtained through the IFFT to the signal/noise power calculation unit 68. In the IFFT in the IFFT computation unit 67, a frequency section that is an IFFT target is cut from the frequency spectrum so as to partially overlap a frequency section that is a target in a previous IFFT.

The signal/noise power calculation unit 68 calculates power of the signal in the time domain input from the IFFT computation unit 67. When the input signal in the time domain is a signal based on the training signal sequence (specific frequency band signal sequence), the signal/noise power calculation unit 68 stores the calculated power in the buffer unit 69 as noise power. Further, when the input signal in the time domain is a signal based on the transmission data sequence, the signal/noise power calculation unit 68 stores the calculated power in the buffer unit 69 as signal power.

The signal power and the noise power calculated by the signal/noise power calculation unit 68 are stored in the buffer unit 69.

When a predetermined number (M: M is an integer greater than or equal to 1) of power calculations are performed by the signal/noise power calculation unit 68, that is, when M signal powers and M noise powers are calculated, the SN ratio calculation unit 70 calculates an SN ratio based on the signal power and the noise power stored in the buffer unit 69. When the SN ratio calculation unit 70 calculates the SN ratio, the SN ratio calculation unit 70 reads the signal power stored in the buffer unit 69 to calculate an average value of the signal power, and reads the noise power stored in the buffer unit 69 to calculate an average value of the noise power. Further, since power of a noise component is included in the signal power stored in the buffer unit 69, the SN ratio calculation unit 70 subtracts the average value of the noise power from the average value of the signal power, and calculates the SN ratio from the result of the subtraction and the average value of the noise power. It is to be noted that when the average value of the noise power is smaller than the average value of the signal power, the SN ratio may be calculated without performing the above-described subtraction.

In the SN ratio calculation apparatus 4B, a circuit for calculating the signal power from the transmission data sequence and a circuit for calculating the noise power from the training signal sequence can also be realized by a common circuit by switching the transmission data sequence and the training signal sequence that are targets when the power value is calculated, so that it is possible to reduce the circuit scale. Further, since the SN ratio calculation apparatus 4B includes the low-frequency band component removal unit 66, it is possible to remove a component near the direct current contained in the optical signal in the optical signal transmission apparatus, and to improve accuracy of the SN ratio by stabilizing the accuracy of measurement of the noise power.

Further, the SN ratio calculation apparatus 4B employs the configuration in which the IFFT computation unit 67 is provided before the signal/noise power calculation unit 68, and the procedure of the computation process in the optical signal reception apparatus is the same as the procedure of the computation process in the SN ratio calculation apparatus 4B. That is, the configuration in which signal processing is performed in order of filter processing, IFFT processing, and power calculation is adopted. Accordingly, the circuits can be shared between the optical signal reception apparatus and the SN ratio calculation apparatus 4B, and circuit scales of the optical signal reception apparatus and the SN ratio calculation apparatus 4B can be reduced.

Further, in the SN ratio calculation apparatus 4B of the present embodiment, the configuration in which the signal/noise power calculation unit 68 that calculates the signal power and the noise power, and the SN ratio calculation unit 70 that calculates the ratio of the power of the transmission data sequence and the power of the noise from the signal power and the noise power has been illustrated. However, any one of both may be provided and the other may have a different configuration.

By using each SN ratio calculation apparatus described above, it is possible to obtain a signal to noise power ratio regardless of transmission based on polarization-division multiplexing and a configuration in the transmission path in the optical communication.

It is to be noted that the low-frequency band component removal unit 66 that removes the component near the direct current may be provided in the SN ratio calculation apparatus 4, similarly to the SN ratio calculation apparatus 4B. Accordingly, it is possible to remove the component near the direct current contained in the optical signal in the optical signal transmission apparatus, and to improve accuracy of the SN ratio by stabilizing the accuracy of measurement of the noise power.

Figure 25:
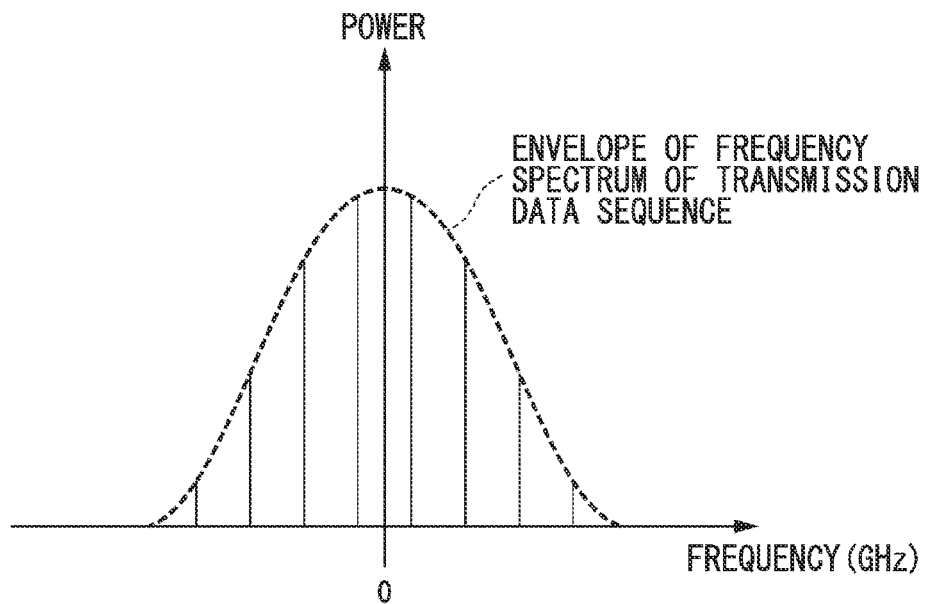
FIG. 25 is a diagram illustrating an example of a specific frequency band signal sequence in which a frequency spectrum of a transmission data sequence is proportional to a frequency spectrum of the specific frequency band signal sequence.

Further, the training signal sequence generation unit 104-1 may generate a specific frequency band signal sequence as described below. For example, a specific frequency band signal in which the shape of an envelope of the frequency spectrum of the transmission data sequence is proportional to the frequency spectrum of the specific frequency band signal sequence may be generated. FIG. 25 is a diagram illustrating an example of the specific frequency band signal sequence in which the frequency spectrum of the transmission data sequence is proportional to the frequency spectrum of the specific frequency band signal sequence. In FIG. 25, a horizontal axis indicates a frequency, and a vertical axis indicates power. FIG. 25 illustrates the frequency spectrum of a specific frequency band signal sequence in which power is concentrated at eight frequencies (N=8). Using such a specific frequency band signal sequence, it is possible to calculate the SN ratio in which effects of different degradation of the SN ratio at each frequency are reflected even in a situation in which a degree of degradation of the SN ratio is different at each frequency depending on characteristics of a filter or the like used in the coherent communication system. Further, it is possible to improve the accuracy of the calculated SN ratio. It is to be noted that the specific frequency band signal sequence having the frequency spectrum as illustrated in FIG. 25 can be obtained by adjusting a value of amplitude of an alternating signal. Further, an envelope of the frequency spectrum of the transmission data sequence can be obtained through simulation.

Figure 26:
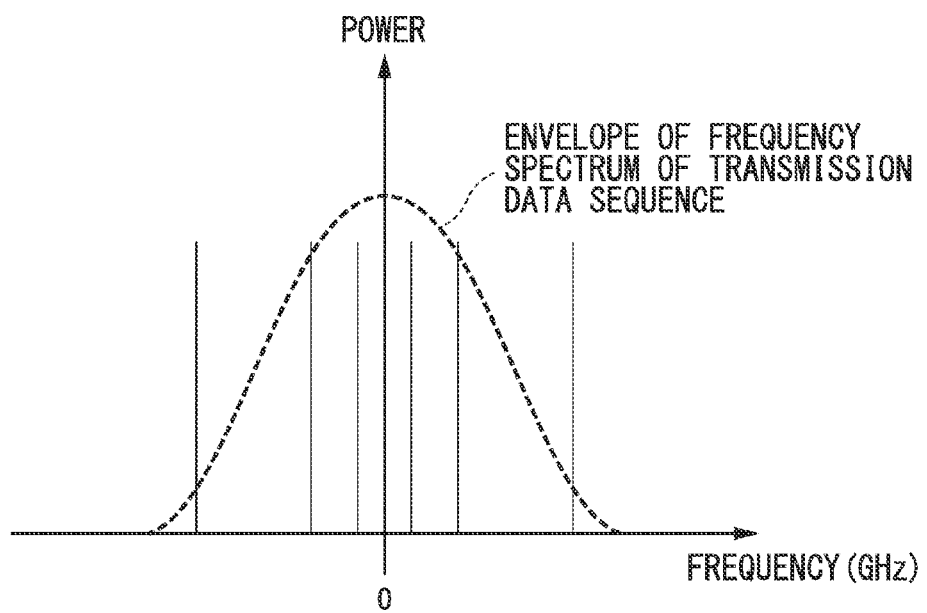
FIG. 26 is a diagram illustrating an example of a frequency spectrum of a specific frequency band signal sequence in which the density of intervals between frequencies at which power of the specific frequency band signal sequence concentrates is proportional to a power level of a transmission data sequence.

Further, a specific frequency band signal sequence in which the density of an interval of the frequencies at which the power of the specific frequency band signal sequence is concentrated is proportional to a power level of the transmission data sequence may be generated. FIG. 26 is a diagram illustrating an example of a frequency spectrum of a specific frequency band signal sequence in which the density of an interval of the frequencies at which the power of the specific frequency band signal sequence concentrates is proportional to a power level of the transmission data sequence. In FIG. 26, a horizontal axis indicates the frequency and a vertical axis indicates the power. FIG. 26 illustrates a frequency spectrum of a specific frequency band signal sequence in which the power is concentrated at six frequencies (N=6). In such a specific frequency band signal sequence, it is possible to adjust the density of an interval of the frequencies at which the power is concentrated by changing an interval between the alternating signals based on the frequency spectrum of the signal of the transmission data sequence.

The frequency spectrum of the specific frequency band signal sequence may be narrowed together with the frequency spectrum of the transmission data sequence depending on filters used during the transmission of the optical signal. In this case, if the signal power is estimated using the specific frequency band signal sequence that has been narrowed and of which the power level has been changed, accuracy is degraded. For example, it is assumed that, when the specific frequency band signal sequence having a spectrum in which power is concentrated at two frequencies on each side around a carrier wave is used, the power at the two frequencies on the high frequency side is degraded by 3 dB due to the influence of the filter. When the power of one specific frequency band signal sequence is 1, the power of a total of 4 is obtained when there is no influence of the filter, but only the power of a total of 3 is obtained when there is the influence of the filter. Accordingly, estimated signal power becomes ¾ as compared to a case in which there is no influence of the filter. The power of the transmission data sequence is also reduced due to the influence of the filter, but the power of the transmission data sequence is often not reduced to ¾ since the power of the transmission data sequence is concentrated at a center portion. In such a case, by using the specific frequency band signal sequence as illustrated in FIG. 26, it is possible to suppress the frequency-dependent influence of the power, and to improve the accuracy of the calculated SN ratio.

Figure 27:
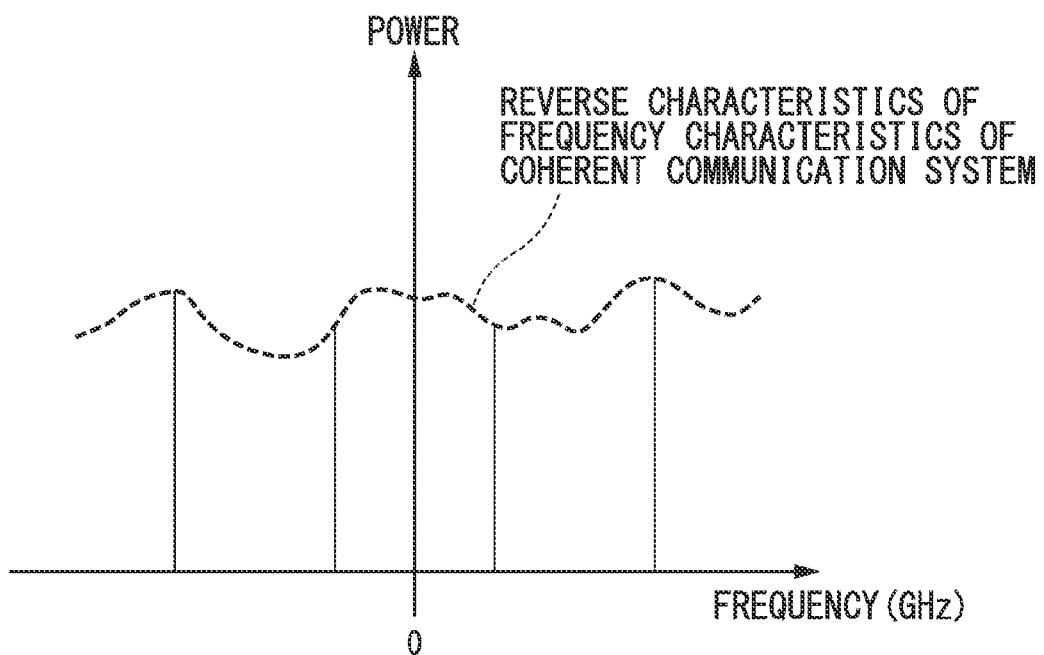
FIG. 27 is a diagram illustrating an example of a frequency spectrum of a specific frequency band signal sequence in which a power level at each frequency at which power of the specific frequency band signal sequence concentrates is inversely proportional to a loss rate of frequency characteristics in a coherent communication system.

Further, a specific frequency band signal sequence in which a power level at each frequency at which power of the specific frequency band signal sequence concentrates is inversely proportional to a loss rate of frequency characteristics in a coherent communication system may be generated. FIG. 27 is a diagram illustrating an example of a frequency spectrum of the specific frequency band signal sequence in which the power level at each frequency at which power of the specific frequency band signal sequence concentrates is inversely proportional to the loss rate of the frequency characteristics in the coherent communication system. In FIG. 27, a horizontal axis indicates frequency, and a vertical axis indicates power. FIG. 27 illustrates a frequency spectrum of the specific frequency band signal sequence in which power is concentrated at four frequencies (N=4).

The frequency characteristics of the coherent communication system can be obtained, for example, from tap coefficients of a finite impulse response (FIR) filter used in the optical signal reception apparatus using a computer simulation of a system having the same frequency characteristics as the optical signal transmission apparatus, the optical transmission path, and the optical signal reception apparatus. Alternatively, in the coherent communication system, a signal sequence having frequency components at the same level in all frequency bands used for transmission of the transmission data sequence may be transmitted, and each frequency component may be analyzed in the optical signal reception apparatus to obtain the frequency characteristics of the coherent communication system. It is possible to suppress the influence of the frequency characteristics generated in estimating the signal power and to improve the accuracy of calculated SN ratio by equalizing powers at frequencies at which the power of the specific frequency band signal sequence is concentrated using the specific frequency band signal sequence as illustrated in FIG. 27.

Further, the configuration in which the signal/noise power calculation unit 68 calculates the signal power and the noise power based on the signal in the time domain converted by the IFFT computation unit 67 has been described as the configuration of the SN ratio calculation apparatus 4B. However, the present embodiment is not limited to this configuration, and the signal/noise power calculation unit 68 may calculate any one or both of the signal power and the noise power based on the signal in the frequency domain output by the low-frequency band component removal unit 66, without using the signal in the time domain converted by the IFFT computation unit 67.

Second Embodiment

Next, a second embodiment of the present invention will be described. Here, a difference from the first embodiment will be described.

Figure 28:
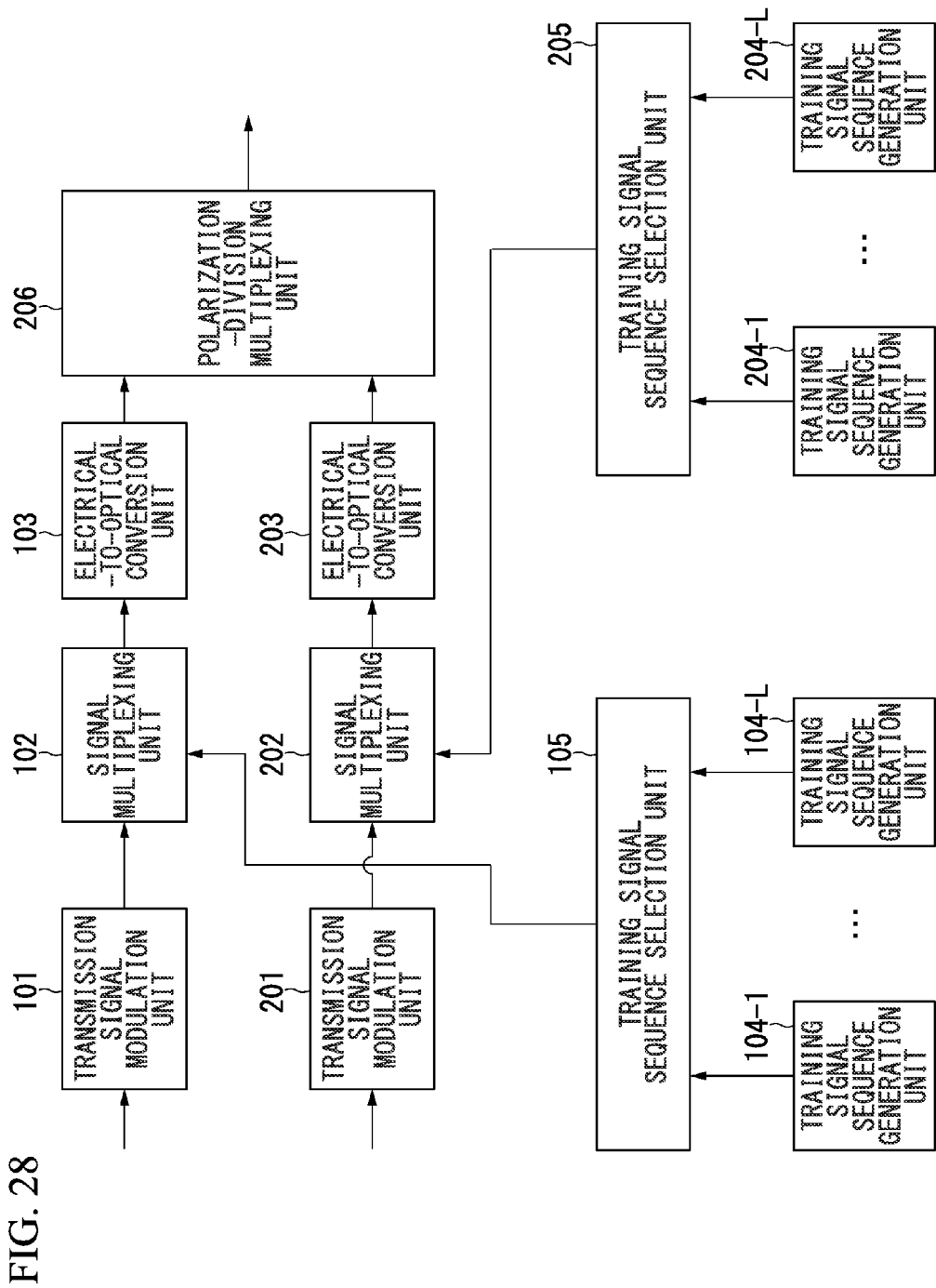
FIG. 28 is a block diagram illustrating an example of a configuration of an optical signal transmission apparatus in a second embodiment of the present invention.

FIG. 28 is a block diagram illustrating an example of a configuration of an optical signal transmission apparatus in the second embodiment. The optical signal transmission apparatus in the present embodiment includes transmission signal modulation units 101 and 201, signal multiplexing units 102 and 202, electrical-to-optical conversion units 103 and 203, 2×L training signal sequence generation units 104-1 to 104-L and 204-1 to 204-L, training signal sequence selection units 105 and 205, and a polarization-division multiplexing unit 206. In FIG. 28, a difference from the optical signal transmission apparatus in the first embodiment (FIG. 1) is that the transmission signal modulation unit 201, the signal multiplexing unit 202, the electrical/optical converter 203, the training signal sequence generation unit 204-$l$ ($1 \le l \le L$ and $L \ge 2$), the training signal sequence selection unit 205, and the polarization-division multiplexing unit 206 are added for polarization-division multiplexing.

The transmission signal modulation unit 201, the signal multiplexing unit 202, the electrical-to-optical conversion unit 203, the training signal sequence generation unit 204-$l$ ($1 \le l \le L$ and $L \ge 2$), and the training signal sequence selection unit 205 perform the same operation as the transmission signal modulation unit 101, the signal multiplexing unit 102, the electrical-to-optical conversion unit 103, the training signal sequence generation unit 104-$l$ ($1 \le l \le L$ and $L \ge 2$), and the training signal sequence selection unit 105 to generate an optical transmission signal using a data signal sequence to be polarization-division multiplexed. However, the training signal sequence generation units 104-$l$ ($1 \le l \le L$ and $L \ge 2$) and 204-$l$ ($1 \le l \le L$ and $L \ge 2$) and the training signal sequence selection units 105 and 205 can also be shared between polarizations.

Further, the training signal sequence generation units 104-$l$ ($1 \le l \le L$ and $L \ge 2$) and 204-$l$ ($1 \le l \le L$ and $L \ge 2$) and the training signal sequence selection units 105 and 205 may generate and transmit different signals for polarizations in part or all of the sequences or may generate and multiplex the same signals. When the same training signal sequences are multiplexed, one training signal sequence generation unit can be shared, instead of providing the training signal sequence generation units 104-$l$ ($1 \le l \le L$ and $L \ge 2$) and 204-$l$ ($1 \le l \le L$ and $L \ge 2$), and the training signal sequence selection units 105 and 205. Through the sharing, the optical signal transmission apparatus transmits the same specific frequency band signals at two orthogonal polarizations, and thus the optical signal reception apparatus can calculate the amount of chromatic dispersion for a signal not subjected to polarization separation.

Figure 29:
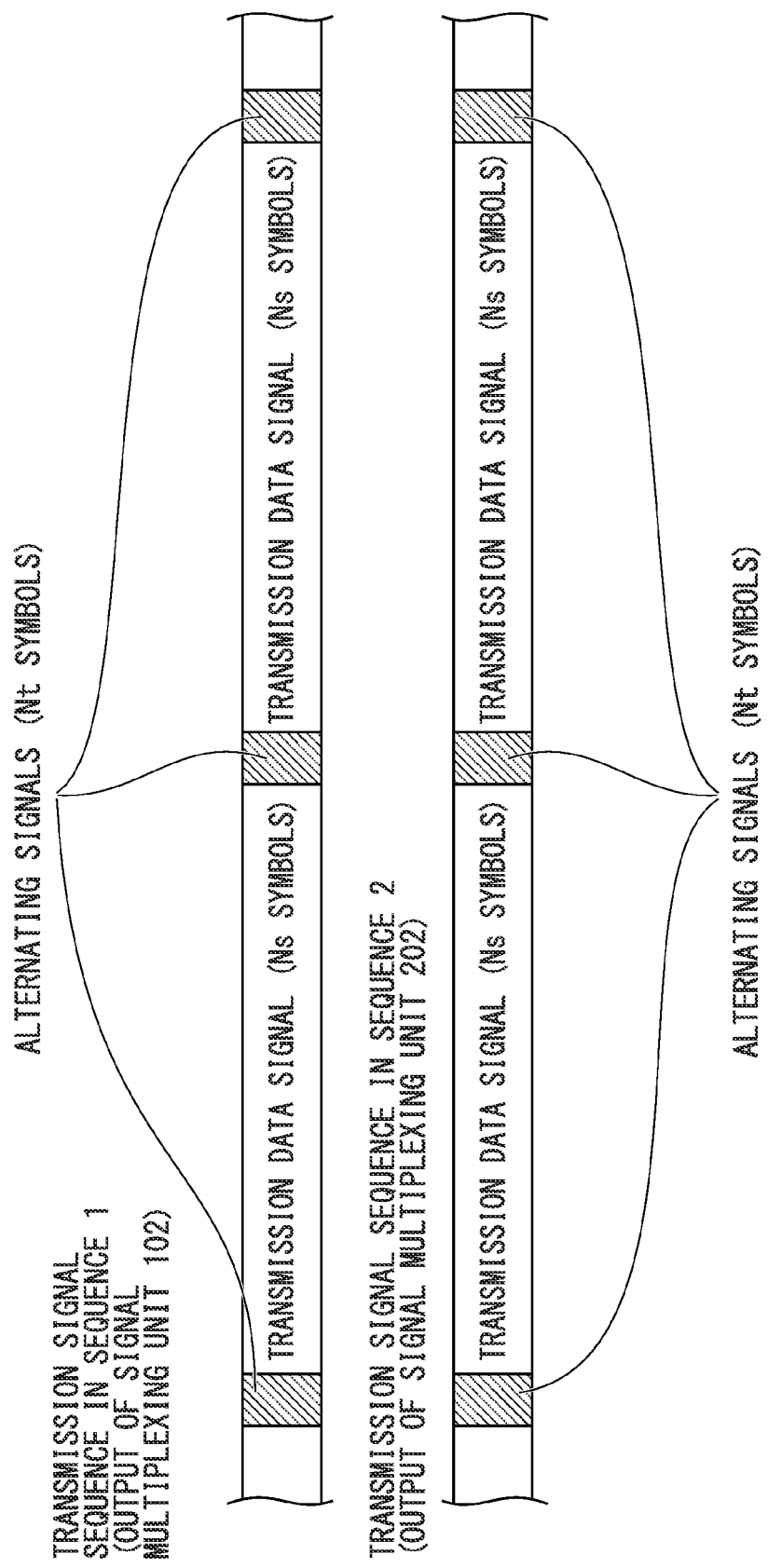
FIG. 29 is a schematic diagram illustrating a frame format of a transmission signal in the second embodiment.

For example, FIG. 29 illustrates a frame format when the same specific frequency band signal is time-division multiplexed with a data signal and transmitted. FIG. 29 is a schematic diagram showing an example of a frame format when the specific frequency band signal is time-division multiplexed with the data signal in the present embodiment. As illustrated in FIG. 29, for each of the two sequences, an alternating signal with Nt symbols is inserted into each transmission data signal with Ns symbols. The alternating signals correspond to the training signals in the first embodiment, and may all be the same sequences or may be different for each sequence. Further, the signal may be transmitted in a polarization plane different for each sequence. By transmitting training signals in the different polarization planes, at least one of the signals can be received at a reception end even if polarization rotation is generated in the transmission path.

Signals transmitted with two polarizations generated by the electrical-to-optical conversion unit 103 and the electrical-to-optical conversion unit 203 are polarization-division multiplexed by the polarization-division multiplexing unit 206, and a multiplexed signal is transmitted as a transmission signal.

Figure 30:
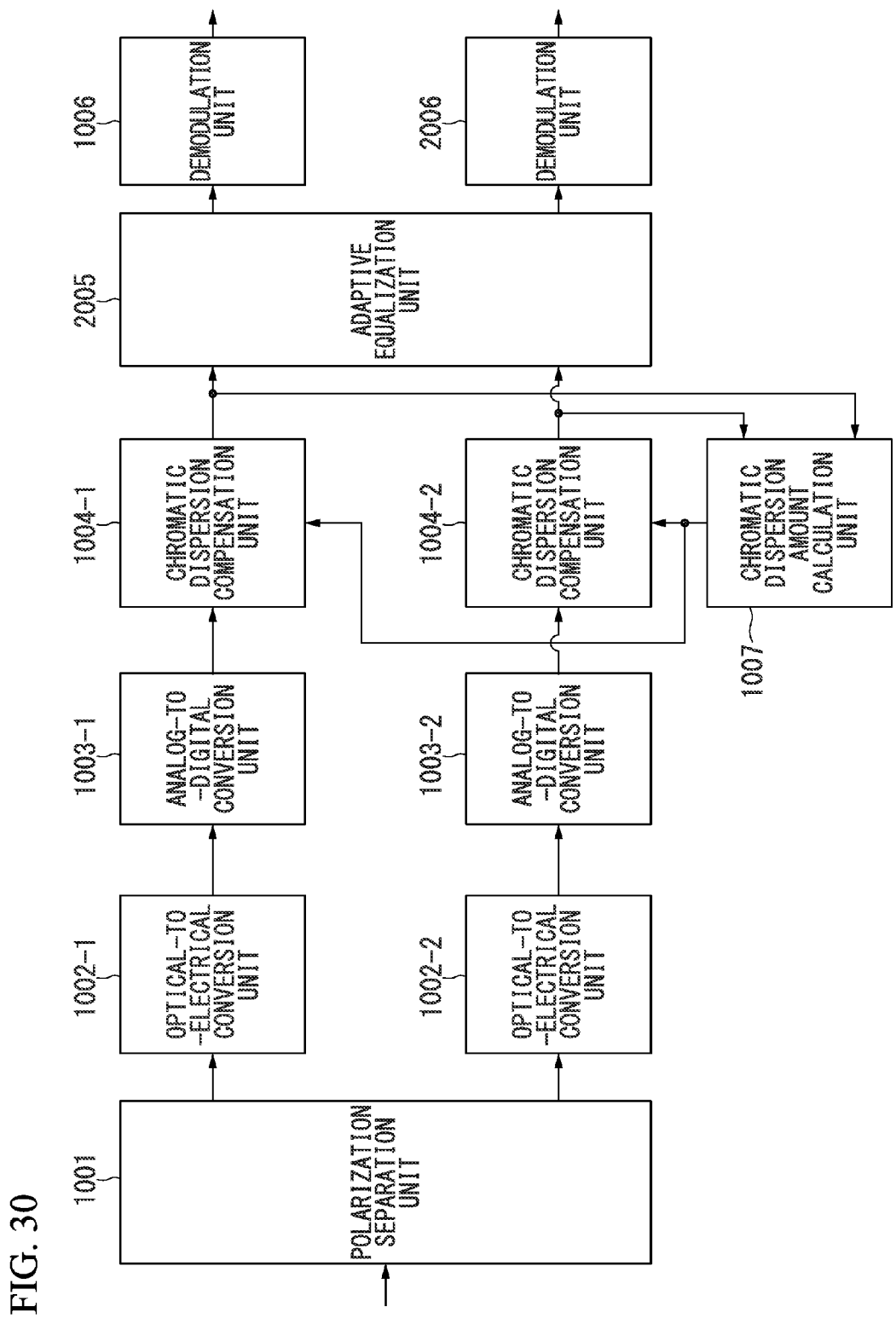
FIG. 30 is a block diagram illustrating a configuration of an optical signal reception apparatus in the second embodiment.

FIG. 30 is a block diagram illustrating an example of a configuration of the optical signal reception apparatus of the present embodiment. The optical signal reception apparatus in the present embodiment includes a polarization separation unit 1001, optical-to-electrical conversion units 1002-1 and 1002-2, analog-to-digital conversion units 1003-1 and 1003-2, chromatic dispersion compensation units 1004-1 and 1004-2, an adaptive equalization unit 2005, demodulation units 1006 and 2006, and a chromatic dispersion amount calculation unit 1007. In FIG. 30, a difference from the optical signal reception apparatus in the first embodiment (FIG. 7) is that the demodulation unit 2006 is further provided, and the adaptive equalization unit 2005 is provided in place of the adaptive equalization unit 1005.

The adaptive equalization unit 2005 separates the polarization-division multiplexed signals, and outputs the signal sequences for the polarizations to the demodulation units 1006 and 2006. Further, the two demodulation units 1006 and 2006 demodulate the signal sequences of the polarizations input from the adaptive equalization unit 2005.

It is to be noted that as in the first embodiment, the second specific frequency band signal sequence in which the power is concentrated only at the specific frequency different from the specific frequency band signal sequence is inserted before and after the specific frequency band signal sequence as the training signal sequences, and thus interference by the transmission signal sequences before and after the training signal on the frequency band used by the specific frequency band signal sequence is prevented. Accordingly, the peak of the power value clearly appears, as illustrated in FIG. 14, and the sample time T1 and the sample time T2 when the power reaches the maximum value can be accurately detected.

Further, the frequency band pass filter is set so that the second specific frequency band signal sequence is removed in the first frequency band pass filter unit 1202-1-1, the first frequency band pass filter unit 1202-2-1, the second frequency band pass filter unit 1202-1-2, and the second frequency band pass filter unit 1202-2-2. Accordingly, when the delay time difference is calculated, the signals of the second specific frequency band signal sequences immediately before and after the specific frequency band signal sequence are removed, and thus only the first specific frequency band signal sequence can be extracted. Accordingly, the estimation accuracy of the chromatic dispersion is improved.

Hereinafter, effects of the embodiments of the present invention will be described.

Figure 31:
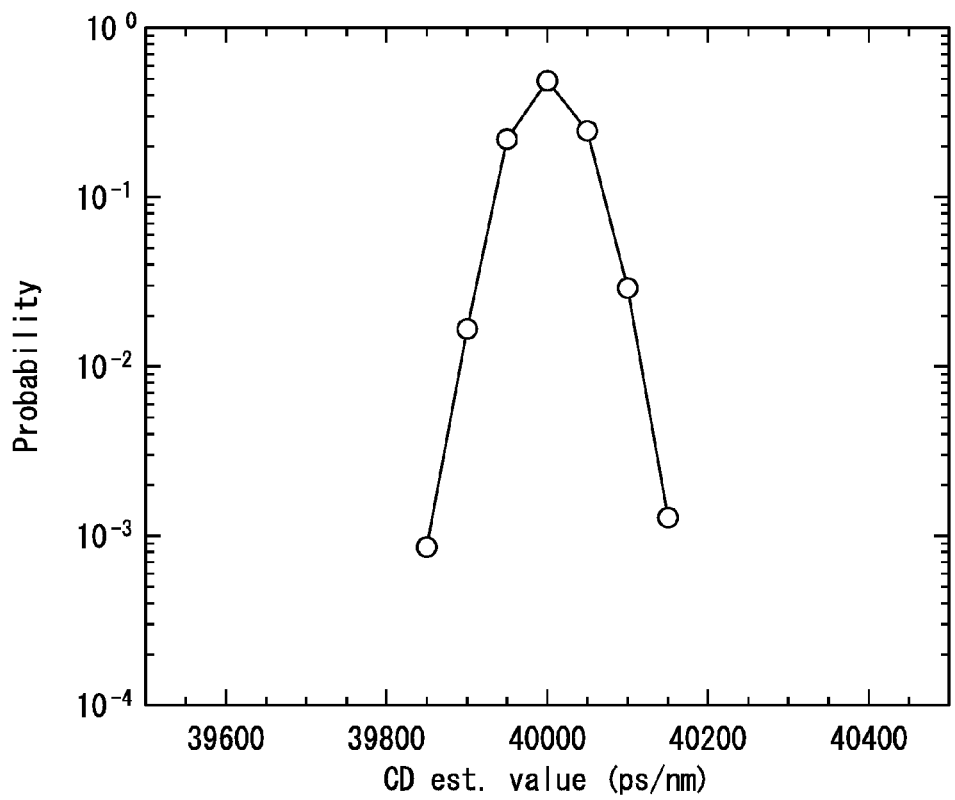
FIG. 31 is a diagram illustrating the result of calculating a chromatic dispersion value using computer simulation when the first specific frequency band signal is used as a training signal sequence.
Figure 32:
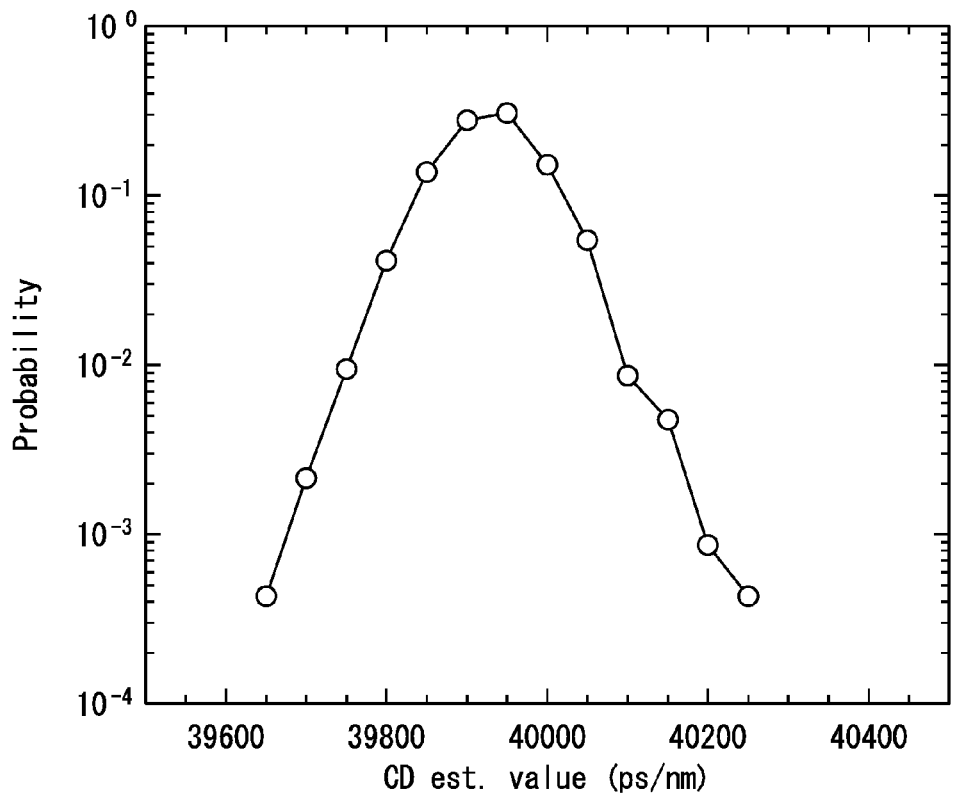
FIG. 32 is a diagram illustrating the result of calculating a chromatic dispersion value using computer simulation when a second specific frequency band signal is used as a training signal sequence.

FIGS. 31 and 32 are graphs showing results of computer simulations in which the specific frequency band signal sequences illustrated in FIGS. 3 and 4 are used as training signal sequences. A transmission baud rate was 31.8 Gbaud, and an OSNR was 12 dB. A transmission path is assumed to be a single-mode fiber (SMF), and the result of adding chromatic dispersion of 40,000 ps/nm and polarization mode dispersion (PMD) of 32 ps are illustrated in FIGS. 31 and 32. Further, in a transmission frame format, the specific frequency band signal sequence included 160 symbols.

The results demonstrates that the result of calculating the chromatic dispersion value when the first specific frequency band signal was used as a training signal sequence illustrated in FIG. 31 has a more excellent estimation accuracy than the result of calculating the chromatic dispersion value when the second specific frequency band signal was used as a training signal sequence illustrated in FIG. 32. Since the bandwidth of peak values of two spectra of the first specific frequency band signal is wider, a delay time difference increases, and thus the estimation error decreases because resolution increases accordingly. However, when a Nyquist filter is used as the band limit filter (transmission filter) on the transmission end and the first specific frequency band signal is used, the signal power of the specific frequency band signal decreases due to the influence of the filter as illustrated in FIG. 5, and the estimation is not possible.

In contrast, when the second specific frequency band signal is used, there is no influence of the transmission filter as illustrated in FIG. 6, and thus the same characteristics as the results illustrated in FIG. 32 are obtained. Therefore, when there is no transmission filter, the first specific frequency band signal sequence with which the estimation accuracy is high is used, and when there is a transmission filter, the second specific frequency band signal sequence with which the estimation is possible in such a case is used, and thus the chromatic dispersion can be estimated at the reception end. In this case, the estimation accuracy is sacrificed, and thus, in order to improve the estimation accuracy, the number of estimations is increased or the number of estimation values used for averaging of the estimation values is increased.

Alternatively, the first specific frequency band signal sequence, and the second specific frequency band signal sequence in which the power is concentrated in a frequency band that is different from the first frequency band are generated, one of the first specific frequency band signal sequence and the second specific frequency band signal sequence is selected by the training signal sequence selection unit, time-division multiplexed, and transmitted. Accordingly, the specific frequency band signal sequence is adaptively switched in accordance with the influence of narrowing of the signal at a repeater in the transmission path (PBN: path band narrowing), and frequency characteristics of the front end (FE) unit such as a power amplifier, a digital-to-analog converter (DAC), an analog-to-digital converter (ADC), or an analog band pass filter (BPF) of a transceiver, so that estimation of the chromatic dispersion at the reception unit is possible.

As described above, in the coherent communication system using the optical signal transmission apparatus and the optical signal transmission apparatus in the embodiments of the present invention, even when the central frequency of the training signal in the reception signal is shifted, the estimation of the amount of chromatic dispersion is possible and the decoding accuracy of the reception signal can be improved by compensating for the estimated amount of chromatic dispersion. Further, when the center frequency of the training signal in the reception signal is shifted due to the filters of each apparatus and the propagation path, a frequency offset, a phase offset, or the like, estimation is performed robustly against narrowing using a training signal of which the frequencies are in a narrow band included in the reception signal if the reception signal is narrowed by a reconfigurable optical add/drop multiplexer (ROADM), the Nyquist filter, or the like, and the estimation accuracy can be improved using a wideband training signal if the reception signal is not narrowed.

Further, in the optical signal transmission apparatus, the training signal sequence generation units 104-1 to 104-L generate a plurality of alternating signals as a training signal sequence, and the training signal sequence selection unit 105 selects the training signal sequence which is time-division multiplexed with the transmission signal sequence in accordance with the frequency characteristics in the coherent communication system. In the optical signal reception apparatus, the training signal sequence detection unit 1102 detects the training signal sequence included in the reception signal, the frequency offset calculation unit 1103 calculates the frequency offset in the reception signal, and the delay amount calculation unit 1104 compensates for the frequency offset and then calculates the amount of delay. Thus, in the coherent communication system using the optical signal transmission apparatus and the optical signal transmission apparatus in accordance with the embodiments of the present invention, it is possible to estimate the amount of chromatic dispersion by suppressing the influence of the frequency characteristics in the propagation path or the like.

For example, when there is no influence of the filter, use of an alternating signal of "1010" in which the training signal becomes a broad band can suppress the estimation error to ½ as compared to use of an alternating signal of "1100" in which the training signal becomes a narrow band, as illustrated in FIGS. 31 and 32. On the other hand, when the Nyquist filter is used, the alternating signal of "1010" degrades S/N by about 6 dB and degrades the accuracy of the estimation, as illustrated in FIG. 5. In contrast, with the alternating signal of "1100," the estimation can be performed without being influenced.

A description will be further given using a specific example. When a maximum value of the absolute value of the deviation of the frequency offset or phase offset is 5 GHz, the baud rate Rs=31.8 Gbaud, and the bandwidth of the BPF that is the Nyquist filter used in the transceiver is ±Rs/2 (=15.9 GHz), if the specific frequency band signal sequence in which the power is concentrated at ±15.9 GHz is used, part of the spectra are present at frequencies that are the same as or higher than the cut-off frequency of the filter, and power of at least one of the spectra of the specific frequency band signal sequence is lost. In contrast, if the specific frequency band signal sequence in which the power is concentrated at ±7.95 GHz is used, since the power is concentrated at a maximum of ±12.95 GHz even when there is a frequency offset, these frequencies are lower than the cut-off frequency of the filter, and thus it is possible to calculate the amount of chromatic dispersion. For example, in the conditions illustrated in FIG. 12, it is possible to achieve the estimation error of ±250 ps/nm with the probability of $10^{-2}$.

While the embodiments of the present invention have been described above with reference to the drawings, it is apparent that the above embodiments are only examples of the present invention and the present invention is not limited to the embodiments. Therefore, additions, omissions, substitutions, and other modifications of the components may be performed without departing from the technical idea and scope of the present invention.

INDUSTRIAL APPLICABILITY

In accordance with the present invention in which the specific frequency band signal is used in the optical signal transmission apparatus and the optical signal reception apparatus, it is possible to estimate the amount of chromatic dispersion without being influenced by the filter and the frequency characteristics of the transmission path and the transceiver, and to compensate for distortion of the transmission signal due to chromatic dispersion.

DESCRIPTION OF REFERENCE SIGNS 4, 4B SN ratio calculation apparatus
46 multiplexing unit
47 signal power calculation unit
48 specific frequency band signal component removal unit
49 noise power calculation unit 50 SN ratio calculation unit
64 multiplexing unit
65 specific frequency band signal component removal unit
66 low-frequency band component removal unit
67 IFFT computation unit
68 signal/noise power calculation unit
69 buffer unit
70 SN ratio calculation unit
101, 201 transmission signal modulation unit
102, 202 signal multiplexing unit
103, 203 electrical-to-optical conversion unit
104-1, 104-2, 104-L, 104-$l$, 204-1, 204-L, 204-$l$ training signal sequence generation unit
105, 205 training signal sequence selection unit
206 polarization-division multiplexing unit
1001 polarization separation unit
1002-1, 1002-2, 1002-$i$ optical-to-electrical conversion unit
1003-1, 1003-2, 1003-$i$ analog-to-digital conversion unit
1004-1, 1004-2, 1004-$i$ chromatic dispersion compensation unit
1005, 2005 adaptive equalization unit
1006, 2006 demodulation unit
1007 chromatic dispersion amount calculation unit
1101-1, 1101-2, 1101-$i$ memory
1102 training signal sequence detection unit
1103 frequency offset calculation unit
1104 delay amount calculation unit
1105-1, 1105-2 time domain window unit
1201-1, 1201-2 signal distribution unit
1202-1-1, 1202-1-2, 1202-1-N, 1202-2-1, 1202-2-2, 1202-2-N, 1202-1-$h$, 1202-1-$k$, 1202-1-$n$ and 1202-2-$n$ frequency band pass filter unit
1203-1-1, 1203-1-2, 1203-1-N, 1203-2-1, 1203-2-2, 1203-2-N, 1203-1-$n$, 1203-2-$n$ power calculation unit
1204-1, 1204-2, 1204-N, 1204-$h$, 1204-$k$, 1204-$n$ multiplexing unit
1205-1, 1205-2, 1205-N, 1205-$n$ averaging filter unit
1206 delay amount calculation unit
1501-1, 1501-2 FFT unit
1801-1-1, 1801-1-N, 1801-1-$n$, 1801-2-1, 1801-2-N, 1801-2-$n$ frequency domain n$^{th}$ frequency band pass filter unit
1802-1-1, 1802-1-N, 1802-1-$n$, 1802-2-1, 1802-2-N, 1802-2-$n$ IFFT unit
2101-1-1, 2101-1-2, 2101-1-L, 2101-2-1, 2101-2-2, 2101-2-L, 2101-1-$l$, 2101-2-$l$ band pass filter unit
2102-1, 2102-2, 2102-L, 2102-$l$ signal power calculation unit
2103 training signal switching unit
2104 timing determination unit
3101-1-1, 3101-1-L, 3101-2-1, 3101-2-L, 3101-1-$l$, 3101-2-$l$ band pass filter unit
3102-1, 3102-L, 3102-$l$ training signal power calculation unit
3103 training signal switching unit
3104 offset amount calculation unit
3501-1-1, 3501-1-L, 3501-1-$l$, 3501-2-1, 3501-2-L, 3501-2-$l$ frequency domain band pass filter unit
3502-1-1, 3502-1-L, 3502-1-$l$, 3502-2-1, 3502-2-L, 3502-2-$l$ IFFT unit

The invention claimed is:

1. A coherent communication system comprising:
an optical signal transmission apparatus; and
an optical signal reception apparatus,
wherein the optical signal transmission apparatus comprises:
a training signal sequence generation unit that generates, as a plurality of training signal sequences, a plurality of signal sequences having power concentrated in a plurality of frequency bands, the power concentrated in different frequency bands;
a training signal sequence selection unit that selects at least one training signal sequence from among the plurality of training signal sequences generated by the training signal sequence generation unit;
a signal multiplexing unit that generates a signal sequence obtained by time-division multiplexing the training signal sequence selected by the training signal sequence selection unit with a transmission data sequence; and
an electrical-to-optical conversion unit that transmits the signal sequence generated by the signal multiplexing unit as an optical signal, and
the optical signal reception apparatus comprises:
an optical-to-electrical conversion unit that converts the optical signal transmitted from the optical signal transmission apparatus into an electrical signal;
an analog-to-digital conversion unit that converts the electrical signal converted by the optical-to-electrical conversion unit into a digital signal sequence;
a plurality of frequency band pass filter units that correspond to the plurality of signal sequences and pass part of frequency band components of the digital signal sequence converted by the analog-to-digital conversion unit; and
a plurality of power calculation units that are provided so as to correspond to the plurality of frequency band pass filter units and calculate power values of digital signal sequences output by the corresponding frequency band pass filter units,
wherein the training signal sequence generation unit generates at least one signal sequence in which power is concentrated at a frequency lower than a cut-off frequency in a band limit filter in the optical signal transmission apparatus, the optical signal reception apparatus, or a propagation path as a training signal sequence, and
the training signal sequence selection unit selects at least one training signal sequence from the plurality of the training signal sequences generated by the training signal sequence generation unit based on presence or absence of the band limit filter in the optical signal transmission apparatus, the optical signal reception apparatus, or the propagation path.

2. The coherent communication system according to claim 1,
wherein the training signal sequence generation unit generates a signal sequence in which an interval of frequencies at which power is concentrated is larger than a predetermined interval as a training signal sequence.

3. The coherent communication system according to claim 1,
wherein the training signal sequence selection unit selects a plurality of training signal sequences,
the signal multiplexing unit generates a signal sequence for each of the training signal sequences selected by the training signal sequence selection unit, and
the electrical-to-optical conversion unit transmits a plurality of signal sequences generated by the signal multiplexing unit in different polarization planes.

4. The coherent communication system according to claim 1,
wherein the signal multiplexing unit time-division multiplexes another training signal sequence before and after the training signal sequence to be time-division multiplexed with the transmission data sequence.

5. A coherent communication system comprising:
an optical signal transmission apparatus; and
an optical signal reception apparatus,
wherein the optical signal transmission apparatus comprises:
a training signal sequence generation unit that generates, as a plurality of training signal sequences, a plurality of signal sequences having power concentrated in a plurality of frequency bands, the power concentrated in different frequency bands;
a training signal sequence selection unit that selects at least one training signal sequence from among the plurality of training signal sequences generated by the training signal sequence generation unit;
a signal multiplexing unit that generates a signal sequence obtained by time-division multiplexing the training signal sequence selected by the training signal sequence selection unit with a transmission data sequence; and
an electrical-to-optical conversion unit that transmits the signal sequence generated by the signal multiplexing unit as an optical signal, and
the optical signal reception apparatus comprises:
an optical-to-electrical conversion unit that converts the optical signal transmitted from the optical signal transmission apparatus into an electrical signal;
an analog-to-digital conversion unit that converts the electrical signal converted by the optical-to-electrical conversion unit into a digital signal sequence;
a plurality of frequency band pass filter units that correspond to the plurality of signal sequences and pass part of frequency band components of the digital signal sequence converted by the analog-to-digital conversion unit; and
a plurality of power calculation units that are provided so as to correspond to the plurality of frequency band pass filter units and calculate power values of digital signal sequences output by the corresponding frequency band pass filter units,
wherein the training signal sequence selection unit selects at least one training signal sequence from the plurality of the training signal sequences generated by the training signal sequence generation unit based on at least one of frequency characteristics of the optical signal transmission apparatus or the optical signal reception apparatus, narrowing in a propagation path, frequency characteristics of a transmission channel of the propagation path, an amount of chromatic dispersion, a transmission distance, and estimation precision of the amount of chromatic dispersion.

6. A coherent communication system comprising:
an optical signal transmission apparatus; and
an optical signal reception apparatus,
wherein the optical signal transmission apparatus comprises:
a training signal sequence generation unit that generates, as a plurality of training signal sequences, a plurality of signal sequences having power concentrated in a plurality of frequency bands, the power concentrated in different frequency bands;
a training signal sequence selection unit that selects at least one training signal sequence from among the plurality of training signal sequences generated by the training signal sequence generation unit;
a signal multiplexing unit that generates a signal sequence obtained by time-division multiplexing the training signal sequence selected by the training signal sequence selection unit with a transmission data sequence; and
an electrical-to-optical conversion unit that transmits the signal sequence generated by the signal multiplexing unit as an optical signal, and
the optical signal reception apparatus comprises:
an optical-to-electrical conversion unit that converts the optical signal transmitted from the optical signal transmission apparatus into an electrical signal;
an analog-to-digital conversion unit that converts the electrical signal converted by the optical-to-electrical conversion unit into a digital signal sequence;
a plurality of frequency band pass filter units that correspond to the plurality of signal sequences and pass part of frequency band components of the digital signal sequence converted by the analog-to-digital conversion unit;
a plurality of power calculation units that are provided so as to correspond to the plurality of frequency band pass filter units and calculate power values of digital signal sequences output by the corresponding frequency band pass filter units;
a training signal switching unit that selects a maximum power value among the power values calculated by the power calculation unit; and
a training signal sequence detection unit that detects a training signal sequence in which power is concentrated in a frequency band passed by a frequency band pass filter unit corresponding to a power calculation unit that has calculated the maximum power value from the digital signal sequences based on the maximum power value selected by the training signal switching unit.

7. The coherent communication system according to claim 6,
wherein the optical signal reception apparatus shares information on the selected training signal sequence with the optical signal transmission apparatus in advance, and
the training signal switching unit selects and outputs only an input from a frequency band pass filter unit corresponding to the selected training signal sequence using the information.

8. The coherent communication system according to claim 6,
wherein the optical signal reception apparatus selects and extracts any one of a section including part of the detected training signal sequence, a section including all the detected training signal sequence, and a section not including the detected training signal sequence from the digital signal sequence based on position information of the training signal sequence detected by the training signal sequence detection unit.

9. The coherent communication system according to claim 8,
wherein the optical signal reception apparatus further comprises an offset amount calculation unit that calculates a frequency offset in a digital signal sequence in the section including part of the training signal sequence detected by the training signal sequence detection unit or the section including all the training signal sequence detected by the training signal sequence detection unit based on the training signal switching unit, the frequency band pass filter unit compensates for the frequency offset for the digital signal sequence based on the frequency offset calculated by the offset amount calculation unit, and then passes a frequency band component at which power of the training signal sequence is concentrated among frequency components included in the digital signal sequence, and the optical signal reception apparatus further comprises:

a plurality of power calculation units that are provided so as to correspond to the plurality of frequency band pass filter units, and calculate power values of digital signal sequences output by the corresponding frequency band pass filter units; and a transmission path information calculation unit that calculates an amount of chromatic dispersion based on the power values calculated by the plurality of power calculation units.

10. The coherent communication system according to claim 8, wherein the optical signal reception apparatus further comprises an offset amount calculation unit that calculates a frequency offset in a digital signal sequence in the section including part of the training signal sequence detected by the training signal sequence detection unit or the section including all the training signal sequence detected by the training signal sequence detection unit based on the training signal switching unit, the plurality of frequency band pass filter units compensate for the frequency offset for the digital signal sequence based on the frequency offset calculated by the offset amount calculation unit, and then pass a frequency band component other than a frequency band component at which the power of the training signal sequence is concentrated among frequency components included in the digital signal sequence, and the optical signal reception apparatus further comprises a transmission path information calculation unit that calculates noise power based on the power values calculated by the plurality of power calculation units.

11. The coherent communication system according to claim 8, wherein the optical signal reception apparatus further comprises a transmission path information calculation unit that calculates signal power in a digital signal sequence in the section that does not include the training signal sequence detected by the training signal sequence detection unit.

12. The coherent communication system according to claim 8, wherein at least one of the frequency band pass filter units and the power calculation units operate at an operation clock that is slower than an operating clock of the training signal sequence detection unit.

13. The coherent communication system according to claim 8, wherein in the plurality of frequency band pass filter units, a computation unit that performs an FFT computation when the digital signal sequence is converted into a signal in a frequency domain or a computation unit that performs an IFFT computation when a digital signal sequence in the frequency domain is inversely converted into a signal in a time domain are shared.

14. The coherent communication system according to claim 9, wherein the transmission path information calculation unit operates at an operating clock that is slower than an operating clock of the training signal sequence detection unit.

15. The coherent communication system according to claim 9, wherein the transmission path information calculation unit sorts a plurality of estimation values of the amount of chromatic dispersion obtained through a plurality of measurements in ascending or descending order, and removes any number of higher estimation values including a maximum estimation value and any number of lower estimation values including a minimum estimation value.

16. The coherent communication system according to claim 9, wherein the optical signal reception apparatus further comprises:

a chromatic dispersion compensation unit that compensates for distortion due to chromatic dispersion in the digital signal sequence based on the amount of chromatic dispersion calculated by the transmission path information calculation unit;

an adaptive equalization unit that equalizes a digital signal sequence compensated by the chromatic dispersion compensation unit; and a demodulation unit that demodulates a digital signal sequence equalized by the adaptive equalization unit.

17. The coherent communication system according to claim 10, wherein the offset amount calculation unit operates at an operating clock that is slower than an operating clock of the training signal sequence detection unit.

18. A communication method in a coherent communication system that includes an optical signal transmission apparatus and an optical signal reception apparatus, the communication method, comprising:

a training signal sequence generation step of generating, as a plurality of training signal sequences, a plurality of signal sequences having power concentrated in a plurality of frequency bands, the power concentrated at different frequency bands;

a training signal sequence selection step of selecting at least one training signal sequence from among the plurality of training signal sequences generated in the training signal sequence generation step;

a signal multiplexing step of generating a signal sequence obtained by time-division multiplexing the training signal sequence selected in the training signal sequence selection step with a transmission data sequence;

an electrical-to-optical conversion step of transmitting the signal sequence generated in the signal multiplexing step as an optical signal;

an optical-to-electrical conversion step of converting the optical signal transmitted in the electrical-to-optical conversion step into an electrical signal;

an analog-to-digital conversion step of converting the electrical signal converted in the optical-to-electrical conversion step into a digital signal sequence;

a frequency band pass filter step of passing part of frequency band components of the digital signal sequence converted in the analog-to-digital conversion step for the plurality of signal sequences; and a power calculation step of calculating a power value of each digital signal sequence obtained in the frequency band pass filter step, wherein the training signal sequence generation step generates at least one signal sequence in which power is concentrated at a frequency lower than a cut-off frequency in a band limit filter in the optical signal transmission apparatus, the optical signal reception apparatus, or a propagation path as a training signal sequence, and the training signal sequence selection step selects at least one training signal sequence from the plurality of the training signal sequences generated by the training signal sequence generation step based on presence or absence of the band limit filter in the optical signal transmission apparatus, the optical signal reception apparatus, or the propagation path.

19. A transmission method in a coherent communication system that includes an optical signal transmission apparatus and an optical signal reception apparatus, the transmission method comprising:

a training signal sequence generation step of generating, as a plurality of training signal sequences, a plurality of signal sequences having power concentrated in a plurality of frequency bands, the power concentrated at different frequency bands;

a training signal sequence selection step of selecting at least one training signal sequence from among the plurality of training signal sequences generated in the training signal sequence generation step;

a signal multiplexing step of generating a signal sequence obtained by time-division multiplexing the training signal sequence selected in the training signal sequence selection step with a transmission data sequence; and an electrical-to-optical conversion step of transmitting the signal sequence generated in the signal multiplexing step as an optical signal, wherein the training signal sequence generation step generates at least one signal sequence in which power is concentrated at a frequency lower than a cut-off frequency in a band limit filter in the optical signal transmission apparatus, the optical signal reception apparatus, or a propagation path as a training signal sequence, and the training signal sequence selection step selects at least one training signal sequence from the plurality of the training signal sequences generated by the training signal sequence generation step based on presence or absence of the band limit filter in the optical signal transmission apparatus, the optical signal reception apparatus, or the propagation path.

20. A communication method in a coherent communication system that includes an optical signal transmission apparatus and an optical signal reception apparatus, the communication method, comprising:

a training signal sequence generation step of generating, as a plurality of training signal sequences, a plurality of signal sequences having power concentrated in a plurality of frequency bands, the power concentrated at different frequency bands;

a training signal sequence selection step of selecting at least one training signal sequence from among the plurality of training signal sequences generated in the training signal sequence generation step;

a signal multiplexing step of generating a signal sequence obtained by time-division multiplexing the training signal sequence selected in the training signal sequence selection step with a transmission data sequence;

an electrical-to-optical conversion step of transmitting the signal sequence generated in the signal multiplexing step as an optical signal;

an optical-to-electrical conversion step of converting the optical signal transmitted in the electrical-to-optical conversion step into an electrical signal;

an analog-to-digital conversion step of converting the electrical signal converted in the optical-to-electrical conversion step into a digital signal sequence;

a frequency band pass filter step of passing part of frequency band components of the digital signal sequence converted in the analog-to-digital conversion step for the plurality of signal sequences; and a power calculation step of calculating a power value of each digital signal sequence obtained in the frequency band pass filter step, wherein the training signal sequence selection step selects at least one training signal sequence from the plurality of the training signal sequences generated by the training signal sequence generation step based on at least one of frequency characteristics of the optical signal transmission apparatus or the optical signal reception apparatus, narrowing in a propagation path, frequency characteristics of a transmission channel of the propagation path, an amount of chromatic dispersion, a transmission distance, and estimation precision of the amount of chromatic dispersion.

21. A communication method in a coherent communication system that includes an optical signal transmission apparatus and an optical signal reception apparatus, the communication method, comprising:

a training signal sequence generation step of generating, as a plurality of training signal sequences, a plurality of signal sequences having power concentrated in a plurality of frequency bands, the power concentrated at different frequency bands;

a training signal sequence selection step of selecting at least one training signal sequence from among the plurality of training signal sequences generated in the training signal sequence generation step;

a signal multiplexing step of generating a signal sequence obtained by time-division multiplexing the training signal sequence selected in the training signal sequence selection step with a transmission data sequence;

an electrical-to-optical conversion step of transmitting the signal sequence generated in the signal multiplexing step as an optical signal;

an optical-to-electrical conversion step of converting the optical signal transmitted in the electrical-to-optical conversion step into an electrical signal;

an analog-to-digital conversion step of converting the electrical signal converted in the optical-to-electrical conversion step into a digital signal sequence;

a frequency band pass filter step of passing part of frequency band components of the digital signal sequence converted in the analog-to-digital conversion step for the plurality of signal sequences; and a power calculation step of calculating a power value of each digital signal sequence obtained in the frequency band pass filter step, a training signal switching step that selects a maximum power value among the power values calculated by the power calculation step; and a training signal sequence detection step that detects a training signal sequence in which power is concentrated in a frequency band of a signal included in a digital signal sequence corresponding to the maximum power value, the frequency band being passed the frequency band pass filter step, from the digital signal sequences based on the maximum power value selected by the training signal switching step.

22. A transmission method in a coherent communication system that includes an optical signal transmission apparatus and an optical signal reception apparatus, the transmission method comprising:

a training signal sequence generation step of generating, as a plurality of training signal sequences, a plurality of signal sequences having power concentrated in a plurality of frequency bands, the power concentrated at different frequency bands;

a training signal sequence selection step of selecting at least one training signal sequence from among the plurality of training signal sequences generated in the training signal sequence generation step;

a signal multiplexing step of generating a signal sequence obtained by time-division multiplexing the training signal sequence selected in the training signal sequence selection step with a transmission data sequence; and an electrical-to-optical conversion step of transmitting the signal sequence generated in the signal multiplexing step as an optical signal, wherein the training signal sequence selection step selects at least one training signal sequence from the plurality of the training signal sequences generated by the training signal sequence generation step based on at least one of frequency characteristics of the optical signal transmission apparatus or the optical signal reception apparatus, narrowing in a propagation path, frequency characteristics of a transmission channel of the propagation path, an amount of chromatic dispersion, a transmission distance, and estimation precision of the amount of chromatic dispersion.

* * * * *